(12) United States Patent
Suhir

(10) Patent No.: US 6,327,411 B1
(45) Date of Patent: Dec. 4, 2001

(54) INTERCONNECTED OPTICAL DEVICES HAVING ENHANCED RELIABILITY

(75) Inventor: Ephraim Suhir, Randolph, NJ (US)

(73) Assignee: Agere Systems Optoelectronics Guardian Corp., Orlando, FL (US)

( * ) Notice: Subject to any disclaimer, the term of this patent is extended or adjusted under 35 U.S.C. 154(b) by 0 days.

(21) Appl. No.: 09/357,457

(22) Filed: Jul. 20, 1999

(51) Int. Cl.$^7$ .................................................. G02B 6/02
(52) U.S. Cl. ............................................. 385/123; 385/15
(58) Field of Search ................................. 385/123–128, 385/141–145, 100–108, 15

(56) References Cited

U.S. PATENT DOCUMENTS 4,113,350 * 9/1978 Haines .................................. 385/128
4,756,600 * 7/1988 Ramsay et al. ....................... 385/106

OTHER PUBLICATIONS

Workshop on Mechanical Reliability of Polymeric Materials and Plastic Packages of IC Devices, ASME 1998, EEP–vol. 25, 1998, "Coated Optical Fiber Interconnect Subjected to the Ends Off–Set and Axial Loading", E.Suhir, pp. 301–333.
Suhir, E., "Elastic stability, free vibrations, and bending of optical glass fibers: effect of the nonlinear stress–strain relationship", *Applied Optics*, vol. 31, No. 24, Aug. 20, 1992, pp. 5080–5085.
Suhir, E., "Stresses in Dual–Coated Optical Fibers", *Transactions of the ASME*, vol. 55, Dec. 1988, pp. 822–830.
Suhir, E., "Spring Constant in the Buckling of Dual–Coated Optical Fibers", *Journal of Lightwave Technology*, vol. 6, No. 7, Jul. 1988, pp. 1240–1244.
Suhir, E., "Effect of Initial Curvature on Low Temperature Microbending in Optical Fibers", *Journal of Lightwave Technology*, vol. 6, No. 8, Aug. 1988, pp. 1321–1327.
Shiue, Sham–Tsong and Lee, Sanboh, Thermal stresses in double–coated optical fibers at low temperature, *J. Appl. Phys.*, 72(1), Jul. 1, 1992, pp. 18–23.
Shiue, Sham–Tsong, "Axial strain–induced microbending losses in double–coated optical fibers", *J. Applied Phys.*, 73(2), Jan. 15, 1993, pp. 526–529.
Shiue, Sham–Tsong, "The Axial Strain–induced Stresses in Double–Coated Optical Fibers", *Journal of the Chinese Institute of Engineers*, vol. 17, No. 1, 1994, pp. 143–149.
Shiue, Sham–Tsong, "The spring constant in the buckling of tightly jacketed double–coated optical fibers", *J. Appl. Phys.* 81(8), Apr. 15, 1997, pp. 3363–3368.

* cited by examiner

Primary Examiner—Akm E. Ullah
Assistant Examiner—Michelle R. Connelly-Cushwa
(74) Attorney, Agent, or Firm—Lowenstein Sandler PC

(57) ABSTRACT

This invention is predicated on applicant's discovery that the conventional polymer coatings are often too thin to prevent buckling and subsequent bending of optical interconnection fiber, and that this buckling and the consequent induced bending can be eliminated by increasing the thickness of the fiber polymer coating. Applicant has further discovered that a thicker coating that might be insufficient to prevent buckling, reduces stress should buckling occur, thereby improving the reliability and quality of the waveguide. The optimal (minimum) polymer thickness for buckling prevention can be calculated in terms of the properties of the fiber and tube materials and the thermal history of the device. Increased thicknesses less than this optimal thickness can nonetheless reduce stress should buckling occur.

7 Claims, 40 Drawing Sheets

FIG. 3

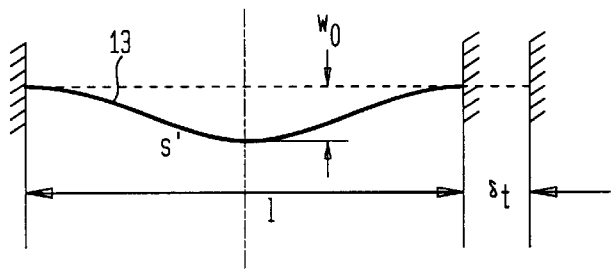

FIG. 4

| INTERCONNECT LENGTH, $l$, mm | 5.00 | | | 2.00 | | |
|---|---|---|---|---|---|---|
| COATING THICKNESS RATIO, $p = \frac{r_1}{r_0}$ | 1 | 2 | 4 | 1 | 2 | 4 |
| CRITICAL STRAIN, $\varepsilon_c$, $10^3$ | 1.5492 | 2.3610 | 12.3777 | 9.9172 | 15.2438 | 88.8207 |
| MAX. DEFLECTION $w_0 = \frac{2l}{\pi}\sqrt{\varepsilon_t - \varepsilon_c}$, $\mu m$ | 292.6166 | 278.2072 | — | 126.7957 | — | — |
| BENDING STRAIN IN THE FIBER, $\varepsilon_b = 2\pi^2 \frac{r_0 w_0}{l^2}$, $10^3$ | 14.4400 | 13.7290 | — | 39.1070 | — | — |
| BENDING STRESS IN THE FIBER, $\sigma_b = E_0 \left[ \varepsilon_b + \frac{1}{2}\alpha\varepsilon_b^2 \right]$, kpsi | 158.1882 | 150.0918 | — | 458.7982 | — | — |
| TOTAL STRESS IN THE FIBER, $\sigma_{tot.} = \sigma_b - \sigma_c$, kpsi | 141.5482 | 125.4769 | — | 357.7656 | — | — |

FIG. 5A

| | | | | | | |
|---|---|---|---|---|---|---|
| $\varepsilon =$ | 1 | e= | 0.05 | $\alpha =$ | 0.005 | $p =$ | 1.02358 |
| $\varepsilon =$ | 1 | e= | 0.05 | $\alpha =$ | 0.01 | $p =$ | 1.0448 |
| $\varepsilon =$ | 1 | e= | 0.05 | $\alpha =$ | 0.015 | $p =$ | 1.06417 |
| $\varepsilon =$ | 1 | e= | 0.05 | $\alpha =$ | 0.02 | $p =$ | 1.08204 |
| $\varepsilon =$ | 1 | e= | 0.05 | $\alpha =$ | 0.025 | $p =$ | 1.09868 |
| $\varepsilon =$ | 1 | e= | 0.05 | $\alpha =$ | 0.03 | $p =$ | 1.11428 |
| $\varepsilon =$ | 1 | e= | 0.05 | $\alpha =$ | 0.035 | $p =$ | 1.12898 |
| $\varepsilon =$ | 1 | e= | 0.05 | $\alpha =$ | 0.04 | $p =$ | 1.1429 |
| $\varepsilon =$ | 1 | e= | 0.05 | $\alpha =$ | 0.045 | $p =$ | 1.15614 |
| $\varepsilon =$ | 1 | e= | 0.05 | $\alpha =$ | 0.05 | $p =$ | 1.16877 |
| $\varepsilon =$ | 1 | e= | 0.05 | $\alpha =$ | 0.055 | $p =$ | 1.18086 |
| $\varepsilon =$ | 1 | e= | 0.05 | $\alpha =$ | 0.06 | $p =$ | 1.19246 |
| $\varepsilon =$ | 1 | e= | 0.05 | $\alpha =$ | 0.065 | $p =$ | 1.20361 |
| $\varepsilon =$ | 1 | e= | 0.05 | $\alpha =$ | 0.07 | $p =$ | 1.21436 |
| $\varepsilon =$ | 1 | e= | 0.05 | $\alpha =$ | 0.075 | $p =$ | 1.22474 |
| $\varepsilon =$ | 1 | e= | 0.05 | $\alpha =$ | 0.08 | $p =$ | 1.23479 |
| $\varepsilon =$ | 1 | e= | 0.05 | $\alpha =$ | 0.085 | $p =$ | 1.24451 |
| $\varepsilon =$ | 1 | e= | 0.05 | $\alpha =$ | 0.09 | $p =$ | 1.25395 |
| $\varepsilon =$ | 1 | e= | 0.05 | $\alpha =$ | 0.095 | $p =$ | 1.26311 |
| $\varepsilon =$ | 1 | e= | 0.05 | $\alpha =$ | 0.1 | $p =$ | 1.27202 |
| $\varepsilon =$ | 1 | e= | 0.1 | $\alpha =$ | 0.005 | $p =$ | 1.01213 |
| $\varepsilon =$ | 1 | e= | 0.1 | $\alpha =$ | 0.01 | $p =$ | 1.02358 |
| $\varepsilon =$ | 1 | e= | 0.1 | $\alpha =$ | 0.015 | $p =$ | 1.03445 |
| $\varepsilon =$ | 1 | e= | 0.1 | $\alpha =$ | 0.02 | $p =$ | 1.0448 |
| $\varepsilon =$ | 1 | e= | 0.1 | $\alpha =$ | 0.025 | $p =$ | 1.05469 |
| $\varepsilon =$ | 1 | e= | 0.1 | $\alpha =$ | 0.03 | $p =$ | 1.06417 |
| $\varepsilon =$ | 1 | e= | 0.1 | $\alpha =$ | 0.035 | $p =$ | 1.07328 |
| $\varepsilon =$ | 1 | e= | 0.1 | $\alpha =$ | 0.04 | $p =$ | 1.08204 |
| $\varepsilon =$ | 1 | e= | 0.1 | $\alpha =$ | 0.045 | $p =$ | 1.09051 |
| $\varepsilon =$ | 1 | e= | 0.1 | $\alpha =$ | 0.05 | $p =$ | 1.09868 |
| $\varepsilon =$ | 1 | e= | 0.1 | $\alpha =$ | 0.055 | $p =$ | 1.1066 |
| $\varepsilon =$ | 1 | e= | 0.1 | $\alpha =$ | 0.06 | $p =$ | 1.11428 |
| $\varepsilon =$ | 1 | e= | 0.1 | $\alpha =$ | 0.065 | $p =$ | 1.12173 |
| $\varepsilon =$ | 1 | e= | 0.1 | $\alpha =$ | 0.07 | $p =$ | 1.12898 |
| $\varepsilon =$ | 1 | e= | 0.1 | $\alpha =$ | 0.075 | $p =$ | 1.13603 |
| $\varepsilon =$ | 1 | e= | 0.1 | $\alpha =$ | 0.08 | $p =$ | 1.1429 |
| $\varepsilon =$ | 1 | e= | 0.1 | $\alpha =$ | 0.085 | $p =$ | 1.1496 |
| $\varepsilon =$ | 1 | e= | 0.1 | $\alpha =$ | 0.09 | $p =$ | 1.15614 |
| $\varepsilon =$ | 1 | e= | 0.1 | $\alpha =$ | 0.095 | $p =$ | 1.16253 |
| $\varepsilon =$ | 1 | e= | 0.1 | $\alpha =$ | 0.1 | $p =$ | 1.16877 |
| $\varepsilon =$ | 1 | e= | 0.15 | $\alpha =$ | 0.005 | $p =$ | 1.00817 |
| $\varepsilon =$ | 1 | e= | 0.15 | $\alpha =$ | 0.01 | $p =$ | 1.01602 |
| $\varepsilon =$ | 1 | e= | 0.15 | $\alpha =$ | 0.015 | $p =$ | 1.02358 |
| $\varepsilon =$ | 1 | e= | 0.15 | $\alpha =$ | 0.02 | $p =$ | 1.03089 |
| $\varepsilon =$ | 1 | e= | 0.15 | $\alpha =$ | 0.025 | $p =$ | 1.03795 |
| $\varepsilon =$ | 1 | e= | 0.15 | $\alpha =$ | 0.03 | $p =$ | 1.0448 |
| $\varepsilon =$ | 1 | e= | 0.15 | $\alpha =$ | 0.035 | $p =$ | 1.05144 |
| $\varepsilon =$ | 1 | e= | 0.15 | $\alpha =$ | 0.04 | $p =$ | 1.05789 |
| $\varepsilon =$ | 1 | e= | 0.15 | $\alpha =$ | 0.045 | $p =$ | 1.06417 |
| $\varepsilon =$ | 1 | e= | 0.15 | $\alpha =$ | 0.05 | $p =$ | 1.07028 |
| $\varepsilon =$ | 1 | e= | 0.15 | $\alpha =$ | 0.055 | $p =$ | 1.07623 |
| $\varepsilon =$ | 1 | e= | 0.15 | $\alpha =$ | 0.06 | $p =$ | 1.08204 |
| $\varepsilon =$ | 1 | e= | 0.15 | $\alpha =$ | 0.065 | $p =$ | 1.08772 |
| $\varepsilon =$ | 1 | e= | 0.15 | $\alpha =$ | 0.07 | $p =$ | 1.09326 |
| $\varepsilon =$ | 1 | e= | 0.15 | $\alpha =$ | 0.075 | $p =$ | 1.09868 |
| $\varepsilon =$ | 1 | e= | 0.15 | $\alpha =$ | 0.08 | $p =$ | 1.10399 |
| $\varepsilon =$ | 1 | e= | 0.15 | $\alpha =$ | 0.085 | $p =$ | 1.10919 |
| $\varepsilon =$ | 1 | e= | 0.15 | $\alpha =$ | 0.09 | $p =$ | 1.11428 |

FIG. 5B

| | | | | | | |
|---|---|---|---|---|---|---|
| $\varepsilon =$ | 1 | e= | 0.15 | $\alpha =$ | 0.095 | $\rho =$ | 1.11927 |
| $\varepsilon =$ | 1 | e= | 0.15 | $\alpha =$ | 0.1 | $\rho =$ | 1.12417 |
| $\varepsilon =$ | 1 | e= | 0.2 | $\alpha =$ | 0.005 | $\rho =$ | 1.00615 |
| $\varepsilon =$ | 1 | e= | 0.2 | $\alpha =$ | 0.01 | $\rho =$ | 1.01213 |
| $\varepsilon =$ | 1 | e= | 0.2 | $\alpha =$ | 0.015 | $\rho =$ | 1.01793 |
| $\varepsilon =$ | 1 | e= | 0.2 | $\alpha =$ | 0.02 | $\rho =$ | 1.02358 |
| $\varepsilon =$ | 1 | e= | 0.2 | $\alpha =$ | 0.025 | $\rho =$ | 1.02909 |
| $\varepsilon =$ | 1 | e= | 0.2 | $\alpha =$ | 0.03 | $\rho =$ | 1.03445 |
| $\varepsilon =$ | 1 | e= | 0.2 | $\alpha =$ | 0.035 | $\rho =$ | 1.03969 |
| $\varepsilon =$ | 1 | e= | 0.2 | $\alpha =$ | 0.04 | $\rho =$ | 1.0448 |
| $\varepsilon =$ | 1 | e= | 0.2 | $\alpha =$ | 0.045 | $\rho =$ | 1.0498 |
| $\varepsilon =$ | 1 | e= | 0.2 | $\alpha =$ | 0.05 | $\rho =$ | 1.05469 |
| $\varepsilon =$ | 1 | e= | 0.2 | $\alpha =$ | 0.055 | $\rho =$ | 1.05948 |
| $\varepsilon =$ | 1 | e= | 0.2 | $\alpha =$ | 0.06 | $\rho =$ | 1.06417 |
| $\varepsilon =$ | 1 | e= | 0.2 | $\alpha =$ | 0.065 | $\rho =$ | 1.06877 |
| $\varepsilon =$ | 1 | e= | 0.2 | $\alpha =$ | 0.07 | $\rho =$ | 1.07328 |
| $\varepsilon =$ | 1 | e= | 0.2 | $\alpha =$ | 0.075 | $\rho =$ | 1.0777 |
| $\varepsilon =$ | 1 | e= | 0.2 | $\alpha =$ | 0.08 | $\rho =$ | 1.08204 |
| $\varepsilon =$ | 1 | e= | 0.2 | $\alpha =$ | 0.085 | $\rho =$ | 1.08631 |
| $\varepsilon =$ | 1 | e= | 0.2 | $\alpha =$ | 0.09 | $\rho =$ | 1.09051 |
| $\varepsilon =$ | 1 | e= | 0.2 | $\alpha =$ | 0.095 | $\rho =$ | 1.09463 |
| $\varepsilon =$ | 1 | e= | 0.2 | $\alpha =$ | 0.1 | $\rho =$ | 1.09868 |
| $\varepsilon =$ | 1 | e= | 0.25 | $\alpha =$ | 0.005 | $\rho =$ | 1.00494 |
| $\varepsilon =$ | 1 | e= | 0.25 | $\alpha =$ | 0.01 | $\rho =$ | 1.00976 |
| $\varepsilon =$ | 1 | e= | 0.25 | $\alpha =$ | 0.015 | $\rho =$ | 1.01447 |
| $\varepsilon =$ | 1 | e= | 0.25 | $\alpha =$ | 0.02 | $\rho =$ | 1.01908 |
| $\varepsilon =$ | 1 | e= | 0.25 | $\alpha =$ | 0.025 | $\rho =$ | 1.02358 |
| $\varepsilon =$ | 1 | e= | 0.25 | $\alpha =$ | 0.03 | $\rho =$ | 1.028 |
| $\varepsilon =$ | 1 | e= | 0.25 | $\alpha =$ | 0.035 | $\rho =$ | 1.03232 |
| $\varepsilon =$ | 1 | e= | 0.25 | $\alpha =$ | 0.04 | $\rho =$ | 1.03656 |
| $\varepsilon =$ | 1 | e= | 0.25 | $\alpha =$ | 0.045 | $\rho =$ | 1.04072 |
| $\varepsilon =$ | 1 | e= | 0.25 | $\alpha =$ | 0.05 | $\rho =$ | 1.0448 |
| $\varepsilon =$ | 1 | e= | 0.25 | $\alpha =$ | 0.055 | $\rho =$ | 1.04881 |
| $\varepsilon =$ | 1 | e= | 0.25 | $\alpha =$ | 0.06 | $\rho =$ | 1.05275 |
| $\varepsilon =$ | 1 | e= | 0.25 | $\alpha =$ | 0.065 | $\rho =$ | 1.05662 |
| $\varepsilon =$ | 1 | e= | 0.25 | $\alpha =$ | 0.07 | $\rho =$ | 1.06042 |
| $\varepsilon =$ | 1 | e= | 0.25 | $\alpha =$ | 0.075 | $\rho =$ | 1.06417 |
| $\varepsilon =$ | 1 | e= | 0.25 | $\alpha =$ | 0.08 | $\rho =$ | 1.06785 |
| $\varepsilon =$ | 1 | e= | 0.25 | $\alpha =$ | 0.085 | $\rho =$ | 1.07148 |
| $\varepsilon =$ | 1 | e= | 0.25 | $\alpha =$ | 0.09 | $\rho =$ | 1.07506 |
| $\varepsilon =$ | 1 | e= | 0.25 | $\alpha =$ | 0.095 | $\rho =$ | 1.07858 |
| $\varepsilon =$ | 1 | e= | 0.25 | $\alpha =$ | 0.1 | $\rho =$ | 1.08204 |
| $\varepsilon =$ | 1 | e= | 0.3 | $\alpha =$ | 0.005 | $\rho =$ | 1.00412 |
| $\varepsilon =$ | 1 | e= | 0.3 | $\alpha =$ | 0.01 | $\rho =$ | 1.00817 |
| $\varepsilon =$ | 1 | e= | 0.3 | $\alpha =$ | 0.015 | $\rho =$ | 1.01213 |
| $\varepsilon =$ | 1 | e= | 0.3 | $\alpha =$ | 0.02 | $\rho =$ | 1.01602 |
| $\varepsilon =$ | 1 | e= | 0.3 | $\alpha =$ | 0.025 | $\rho =$ | 1.01983 |
| $\varepsilon =$ | 1 | e= | 0.3 | $\alpha =$ | 0.03 | $\rho =$ | 1.02358 |
| $\varepsilon =$ | 1 | e= | 0.3 | $\alpha =$ | 0.035 | $\rho =$ | 1.02727 |
| $\varepsilon =$ | 1 | e= | 0.3 | $\alpha =$ | 0.04 | $\rho =$ | 1.03089 |
| $\varepsilon =$ | 1 | e= | 0.3 | $\alpha =$ | 0.045 | $\rho =$ | 1.03445 |
| $\varepsilon =$ | 1 | e= | 0.3 | $\alpha =$ | 0.05 | $\rho =$ | 1.03795 |
| $\varepsilon =$ | 1 | e= | 0.3 | $\alpha =$ | 0.055 | $\rho =$ | 1.0414 |
| $\varepsilon =$ | 1 | e= | 0.3 | $\alpha =$ | 0.06 | $\rho =$ | 1.0448 |
| $\varepsilon =$ | 1 | e= | 0.3 | $\alpha =$ | 0.065 | $\rho =$ | 1.04815 |

FIG. 5C

| | | | | | | | |
|---|---|---|---|---|---|---|---|
| $\varepsilon =$ | 1 | e= | 0.45 | $\alpha =$ | 0.045 | $\rho =$ | 1.02358 |
| $\varepsilon =$ | 1 | e= | 0.45 | $\alpha =$ | 0.05 | $\rho =$ | 1.02605 |
| $\varepsilon =$ | 1 | e= | 0.45 | $\alpha =$ | 0.055 | $\rho =$ | 1.02848 |
| $\varepsilon =$ | 1 | e= | 0.45 | $\alpha =$ | 0.06 | $\rho =$ | 1.03089 |
| $\varepsilon =$ | 1 | e= | 0.45 | $\alpha =$ | 0.065 | $\rho =$ | 1.03327 |
| $\varepsilon =$ | 1 | e= | 0.45 | $\alpha =$ | 0.07 | $\rho =$ | 1.03562 |
| $\varepsilon =$ | 1 | e= | 0.45 | $\alpha =$ | 0.075 | $\rho =$ | 1.03795 |
| $\varepsilon =$ | 1 | e= | 0.45 | $\alpha =$ | 0.08 | $\rho =$ | 1.04026 |
| $\varepsilon =$ | 1 | e= | 0.45 | $\alpha =$ | 0.085 | $\rho =$ | 1.04254 |
| $\varepsilon =$ | 1 | e= | 0.45 | $\alpha =$ | 0.09 | $\rho =$ | 1.0448 |
| $\varepsilon =$ | 1 | e= | 0.45 | $\alpha =$ | 0.095 | $\rho =$ | 1.04704 |
| $\varepsilon =$ | 1 | e= | 0.45 | $\alpha =$ | 0.1 | $\rho =$ | 1.04925 |
| $\varepsilon =$ | 1 | e= | 0.5 | $\alpha =$ | 0.005 | $\rho =$ | 1.00248 |
| $\varepsilon =$ | 1 | e= | 0.5 | $\alpha =$ | 0.01 | $\rho =$ | 1.00494 |
| $\varepsilon =$ | 1 | e= | 0.5 | $\alpha =$ | 0.015 | $\rho =$ | 1.00736 |
| $\varepsilon =$ | 1 | e= | 0.5 | $\alpha =$ | 0.02 | $\rho =$ | 1.00976 |
| $\varepsilon =$ | 1 | e= | 0.5 | $\alpha =$ | 0.025 | $\rho =$ | 1.01213 |
| $\varepsilon =$ | 1 | e= | 0.5 | $\alpha =$ | 0.03 | $\rho =$ | 1.01447 |
| $\varepsilon =$ | 1 | e= | 0.5 | $\alpha =$ | 0.035 | $\rho =$ | 1.01679 |
| $\varepsilon =$ | 1 | e= | 0.5 | $\alpha =$ | 0.04 | $\rho =$ | 1.01908 |
| $\varepsilon =$ | 1 | e= | 0.5 | $\alpha =$ | 0.045 | $\rho =$ | 1.02134 |
| $\varepsilon =$ | 1 | e= | 0.5 | $\alpha =$ | 0.05 | $\rho =$ | 1.02358 |
| $\varepsilon =$ | 1 | e= | 0.5 | $\alpha =$ | 0.055 | $\rho =$ | 1.0258 |
| $\varepsilon =$ | 1 | e= | 0.5 | $\alpha =$ | 0.06 | $\rho =$ | 1.028 |
| $\varepsilon =$ | 1 | e= | 0.5 | $\alpha =$ | 0.065 | $\rho =$ | 1.03017 |
| $\varepsilon =$ | 1 | e= | 0.5 | $\alpha =$ | 0.07 | $\rho =$ | 1.03232 |
| $\varepsilon =$ | 1 | e= | 0.5 | $\alpha =$ | 0.075 | $\rho =$ | 1.03445 |
| $\varepsilon =$ | 1 | e= | 0.5 | $\alpha =$ | 0.08 | $\rho =$ | 1.03656 |
| $\varepsilon =$ | 1 | e= | 0.5 | $\alpha =$ | 0.085 | $\rho =$ | 1.03865 |
| $\varepsilon =$ | 1 | e= | 0.5 | $\alpha =$ | 0.09 | $\rho =$ | 1.04072 |
| $\varepsilon =$ | 1 | e= | 0.5 | $\alpha =$ | 0.095 | $\rho =$ | 1.04277 |
| $\varepsilon =$ | 1 | e= | 0.5 | $\alpha =$ | 0.1 | $\rho =$ | 1.0448 |
| $\varepsilon =$ | 5 | e= | 0.05 | $\alpha =$ | 0.005 | $\rho =$ | 3.40013 |
| $\varepsilon =$ | 5 | e= | 0.05 | $\alpha =$ | 0.01 | $\rho =$ | 3.39892 |
| $\varepsilon =$ | 5 | e= | 0.05 | $\alpha =$ | 0.015 | $\rho =$ | 3.3977 |
| $\varepsilon =$ | 5 | e= | 0.05 | $\alpha =$ | 0.02 | $\rho =$ | 3.39647 |
| $\varepsilon =$ | 5 | e= | 0.05 | $\alpha =$ | 0.025 | $\rho =$ | 3.39525 |
| $\varepsilon =$ | 5 | e= | 0.05 | $\alpha =$ | 0.03 | $\rho =$ | 3.39403 |
| $\varepsilon =$ | 5 | e= | 0.05 | $\alpha =$ | 0.035 | $\rho =$ | 3.3928 |
| $\varepsilon =$ | 5 | e= | 0.05 | $\alpha =$ | 0.04 | $\rho =$ | 3.39157 |
| $\varepsilon =$ | 5 | e= | 0.05 | $\alpha =$ | 0.045 | $\rho =$ | 3.39035 |
| $\varepsilon =$ | 5 | e= | 0.05 | $\alpha =$ | 0.05 | $\rho =$ | 3.38911 |
| $\varepsilon =$ | 5 | e= | 0.05 | $\alpha =$ | 0.055 | $\rho =$ | 3.38788 |
| $\varepsilon =$ | 5 | e= | 0.05 | $\alpha =$ | 0.06 | $\rho =$ | 3.38665 |
| $\varepsilon =$ | 5 | e= | 0.05 | $\alpha =$ | 0.065 | $\rho =$ | 3.38541 |
| $\varepsilon =$ | 5 | e= | 0.05 | $\alpha =$ | 0.07 | $\rho =$ | 3.38418 |
| $\varepsilon =$ | 5 | e= | 0.05 | $\alpha =$ | 0.075 | $\rho =$ | 3.38294 |
| $\varepsilon =$ | 5 | e= | 0.05 | $\alpha =$ | 0.08 | $\rho =$ | 3.3817 |
| $\varepsilon =$ | 5 | e= | 0.05 | $\alpha =$ | 0.085 | $\rho =$ | 3.38046 |
| $\varepsilon =$ | 5 | e= | 0.05 | $\alpha =$ | 0.09 | $\rho =$ | 3.37921 |
| $\varepsilon =$ | 5 | e= | 0.05 | $\alpha =$ | 0.095 | $\rho =$ | 3.37797 |
| $\varepsilon =$ | 5 | e= | 0.05 | $\alpha =$ | 0.1 | $\rho =$ | 3.37672 |
| $\varepsilon =$ | 5 | e= | 0.1 | $\alpha =$ | 0.005 | $\rho =$ | 2.99904 |
| $\varepsilon =$ | 5 | e= | 0.1 | $\alpha =$ | 0.01 | $\rho =$ | 2.99807 |
| $\varepsilon =$ | 5 | e= | 0.1 | $\alpha =$ | 0.015 | $\rho =$ | 2.99711 |

FIG. 5D

| | | | | | | |
|---|---|---|---|---|---|---|
| ε = | 5 | e = | 0.1 | ∝ = | 0.02 | ρ = | 2.99614 |
| ε = | 5 | e = | 0.1 | ∝ = | 0.025 | ρ = | 2.99518 |
| ε = | 5 | e = | 0.1 | ∝ = | 0.03 | ρ = | 2.99421 |
| ε = | 5 | e = | 0.1 | ∝ = | 0.035 | ρ = | 2.99324 |
| ε = | 5 | e = | 0.1 | ∝ = | 0.04 | ρ = | 2.99227 |
| ε = | 5 | e = | 0.1 | ∝ = | 0.045 | ρ = | 2.9913 |
| ε = | 5 | e = | 0.1 | ∝ = | 0.05 | ρ = | 2.99033 |
| ε = | 5 | e = | 0.1 | ∝ = | 0.055 | ρ = | 2.98935 |
| ε = | 5 | e = | 0.1 | ∝ = | 0.06 | ρ = | 2.98838 |
| ε = | 5 | e = | 0.1 | ∝ = | 0.065 | ρ = | 2.9874 |
| ε = | 5 | e = | 0.1 | ∝ = | 0.07 | ρ = | 2.98642 |
| ε = | 5 | e = | 0.1 | ∝ = | 0.075 | ρ = | 2.98544 |
| ε = | 5 | e = | 0.1 | ∝ = | 0.08 | ρ = | 2.98446 |
| ε = | 5 | e = | 0.1 | ∝ = | 0.085 | ρ = | 2.98348 |
| ε = | 5 | e = | 0.1 | ∝ = | 0.09 | ρ = | 2.9825 |
| ε = | 5 | e = | 0.1 | ∝ = | 0.095 | ρ = | 2.98152 |
| ε = | 5 | e = | 0.1 | ∝ = | 0.1 | ρ = | 2.98053 |
| ε = | 5 | e = | 0.15 | ∝ = | 0.005 | ρ = | 2.80585 |
| ε = | 5 | e = | 0.15 | ∝ = | 0.01 | ρ = | 2.80502 |
| ε = | 5 | e = | 0.15 | ∝ = | 0.015 | ρ = | 2.80419 |
| ε = | 5 | e = | 0.15 | ∝ = | 0.02 | ρ = | 2.80335 |
| ε = | 5 | e = | 0.15 | ∝ = | 0.025 | ρ = | 2.80252 |
| ε = | 5 | e = | 0.15 | ∝ = | 0.03 | ρ = | 2.80169 |
| ε = | 5 | e = | 0.15 | ∝ = | 0.035 | ρ = | 2.80085 |
| ε = | 5 | e = | 0.15 | ∝ = | 0.04 | ρ = | 2.80002 |
| ε = | 5 | e = | 0.15 | ∝ = | 0.045 | ρ = | 2.79918 |
| ε = | 5 | e = | 0.15 | ∝ = | 0.05 | ρ = | 2.79834 |
| ε = | 5 | e = | 0.15 | ∝ = | 0.055 | ρ = | 2.79751 |
| ε = | 5 | e = | 0.15 | ∝ = | 0.06 | ρ = | 2.79667 |
| ε = | 5 | e = | 0.15 | ∝ = | 0.065 | ρ = | 2.79583 |
| ε = | 5 | e = | 0.15 | ∝ = | 0.07 | ρ = | 2.79498 |
| ε = | 5 | e = | 0.15 | ∝ = | 0.075 | ρ = | 2.79414 |
| ε = | 5 | e = | 0.15 | ∝ = | 0.08 | ρ = | 2.7933 |
| ε = | 5 | e = | 0.15 | ∝ = | 0.085 | ρ = | 2.79245 |
| ε = | 5 | e = | 0.15 | ∝ = | 0.09 | ρ = | 2.79161 |
| ε = | 5 | e = | 0.15 | ∝ = | 0.095 | ρ = | 2.79076 |
| ε = | 5 | e = | 0.15 | ∝ = | 0.1 | ρ = | 2.78991 |
| ε = | 5 | e = | 0.2 | ∝ = | 0.005 | ρ = | 2.68571 |
| ε = | 5 | e = | 0.2 | ∝ = | 0.01 | ρ = | 2.68496 |
| ε = | 5 | e = | 0.2 | ∝ = | 0.015 | ρ = | 2.68422 |
| ε = | 5 | e = | 0.2 | ∝ = | 0.02 | ρ = | 2.68348 |
| ε = | 5 | e = | 0.2 | ∝ = | 0.025 | ρ = | 2.68274 |
| ε = | 5 | e = | 0.2 | ∝ = | 0.03 | ρ = | 2.68199 |
| ε = | 5 | e = | 0.2 | ∝ = | 0.035 | ρ = | 2.68125 |
| ε = | 5 | e = | 0.2 | ∝ = | 0.04 | ρ = | 2.6805 |
| ε = | 5 | e = | 0.2 | ∝ = | 0.045 | ρ = | 2.67975 |
| ε = | 5 | e = | 0.2 | ∝ = | 0.05 | ρ = | 2.67901 |
| ε = | 5 | e = | 0.2 | ∝ = | 0.055 | ρ = | 2.67826 |
| ε = | 5 | e = | 0.2 | ∝ = | 0.06 | ρ = | 2.67751 |
| ε = | 5 | e = | 0.2 | ∝ = | 0.065 | ρ = | 2.67676 |
| ε = | 5 | e = | 0.2 | ∝ = | 0.07 | ρ = | 2.67601 |
| ε = | 5 | e = | 0.2 | ∝ = | 0.075 | ρ = | 2.67525 |
| ε = | 5 | e = | 0.2 | ∝ = | 0.08 | ρ = | 2.6745 |
| ε = | 5 | e = | 0.2 | ∝ = | 0.085 | ρ = | 2.67375 |
| ε = | 5 | e = | 0.2 | ∝ = | 0.09 | ρ = | 2.67299 |

FIG. 5E

| | | | | | | | | | |
|---|---|---|---|---|---|---|---|---|---|
| $\varepsilon =$ | 5 | e= | 0.2  | $\alpha =$ | 0.095 | $\rho =$ | 2.67224 |
| $\varepsilon =$ | 5 | e= | 0.2  | $\alpha =$ | 0.1   | $\rho =$ | 2.67148 |
| $\varepsilon =$ | 5 | e= | 0.25 | $\alpha =$ | 0.005 | $\rho =$ | 2.60163 |
| $\varepsilon =$ | 5 | e= | 0.25 | $\alpha =$ | 0.01  | $\rho =$ | 2.60096 |
| $\varepsilon =$ | 5 | e= | 0.25 | $\alpha =$ | 0.015 | $\rho =$ | 2.60028 |
| $\varepsilon =$ | 5 | e= | 0.25 | $\alpha =$ | 0.02  | $\rho =$ | 2.5996  |
| $\varepsilon =$ | 5 | e= | 0.25 | $\alpha =$ | 0.025 | $\rho =$ | 2.59892 |
| $\varepsilon =$ | 5 | e= | 0.25 | $\alpha =$ | 0.03  | $\rho =$ | 2.59825 |
| $\varepsilon =$ | 5 | e= | 0.25 | $\alpha =$ | 0.035 | $\rho =$ | 2.59757 |
| $\varepsilon =$ | 5 | e= | 0.25 | $\alpha =$ | 0.04  | $\rho =$ | 2.59689 |
| $\varepsilon =$ | 5 | e= | 0.25 | $\alpha =$ | 0.045 | $\rho =$ | 2.59621 |
| $\varepsilon =$ | 5 | e= | 0.25 | $\alpha =$ | 0.05  | $\rho =$ | 2.59552 |
| $\varepsilon =$ | 5 | e= | 0.25 | $\alpha =$ | 0.055 | $\rho =$ | 2.59484 |
| $\varepsilon =$ | 5 | e= | 0.25 | $\alpha =$ | 0.06  | $\rho =$ | 2.59416 |
| $\varepsilon =$ | 5 | e= | 0.25 | $\alpha =$ | 0.065 | $\rho =$ | 2.59347 |
| $\varepsilon =$ | 5 | e= | 0.25 | $\alpha =$ | 0.07  | $\rho =$ | 2.59279 |
| $\varepsilon =$ | 5 | e= | 0.25 | $\alpha =$ | 0.075 | $\rho =$ | 2.5921  |
| $\varepsilon =$ | 5 | e= | 0.25 | $\alpha =$ | 0.08  | $\rho =$ | 2.59142 |
| $\varepsilon =$ | 5 | e= | 0.25 | $\alpha =$ | 0.085 | $\rho =$ | 2.59073 |
| $\varepsilon =$ | 5 | e= | 0.25 | $\alpha =$ | 0.09  | $\rho =$ | 2.59004 |
| $\varepsilon =$ | 5 | e= | 0.25 | $\alpha =$ | 0.095 | $\rho =$ | 2.58935 |
| $\varepsilon =$ | 5 | e= | 0.25 | $\alpha =$ | 0.1   | $\rho =$ | 2.58867 |
| $\varepsilon =$ | 5 | e= | 0.3  | $\alpha =$ | 0.005 | $\rho =$ | 2.53858 |
| $\varepsilon =$ | 5 | e= | 0.3  | $\alpha =$ | 0.01  | $\rho =$ | 2.53796 |
| $\varepsilon =$ | 5 | e= | 0.3  | $\alpha =$ | 0.015 | $\rho =$ | 2.53733 |
| $\varepsilon =$ | 5 | e= | 0.3  | $\alpha =$ | 0.02  | $\rho =$ | 2.53671 |
| $\varepsilon =$ | 5 | e= | 0.3  | $\alpha =$ | 0.025 | $\rho =$ | 2.53608 |
| $\varepsilon =$ | 5 | e= | 0.3  | $\alpha =$ | 0.03  | $\rho =$ | 2.53545 |
| $\varepsilon =$ | 5 | e= | 0.3  | $\alpha =$ | 0.035 | $\rho =$ | 2.53483 |
| $\varepsilon =$ | 5 | e= | 0.3  | $\alpha =$ | 0.04  | $\rho =$ | 2.5342  |
| $\varepsilon =$ | 5 | e= | 0.3  | $\alpha =$ | 0.045 | $\rho =$ | 2.53357 |
| $\varepsilon =$ | 5 | e= | 0.3  | $\alpha =$ | 0.05  | $\rho =$ | 2.53294 |
| $\varepsilon =$ | 5 | e= | 0.3  | $\alpha =$ | 0.055 | $\rho =$ | 2.53231 |
| $\varepsilon =$ | 5 | e= | 0.3  | $\alpha =$ | 0.06  | $\rho =$ | 2.53168 |
| $\varepsilon =$ | 5 | e= | 0.3  | $\alpha =$ | 0.065 | $\rho =$ | 2.53105 |
| $\varepsilon =$ | 5 | e= | 0.3  | $\alpha =$ | 0.07  | $\rho =$ | 2.53041 |
| $\varepsilon =$ | 5 | e= | 0.3  | $\alpha =$ | 0.075 | $\rho =$ | 2.52978 |
| $\varepsilon =$ | 5 | e= | 0.3  | $\alpha =$ | 0.08  | $\rho =$ | 2.52915 |
| $\varepsilon =$ | 5 | e= | 0.3  | $\alpha =$ | 0.085 | $\rho =$ | 2.52851 |
| $\varepsilon =$ | 5 | e= | 0.3  | $\alpha =$ | 0.09  | $\rho =$ | 2.52788 |
| $\varepsilon =$ | 5 | e= | 0.3  | $\alpha =$ | 0.095 | $\rho =$ | 2.52724 |
| $\varepsilon =$ | 5 | e= | 0.3  | $\alpha =$ | 0.1   | $\rho =$ | 2.5266  |
| $\varepsilon =$ | 5 | e= | 0.35 | $\alpha =$ | 0.005 | $\rho =$ | 2.48909 |
| $\varepsilon =$ | 5 | e= | 0.35 | $\alpha =$ | 0.01  | $\rho =$ | 2.4885  |
| $\varepsilon =$ | 5 | e= | 0.35 | $\alpha =$ | 0.015 | $\rho =$ | 2.48792 |
| $\varepsilon =$ | 5 | e= | 0.35 | $\alpha =$ | 0.02  | $\rho =$ | 2.48734 |
| $\varepsilon =$ | 5 | e= | 0.35 | $\alpha =$ | 0.025 | $\rho =$ | 2.48675 |
| $\varepsilon =$ | 5 | e= | 0.35 | $\alpha =$ | 0.03  | $\rho =$ | 2.48617 |
| $\varepsilon =$ | 5 | e= | 0.35 | $\alpha =$ | 0.035 | $\rho =$ | 2.48558 |
| $\varepsilon =$ | 5 | e= | 0.35 | $\alpha =$ | 0.04  | $\rho =$ | 2.485   |
| $\varepsilon =$ | 5 | e= | 0.35 | $\alpha =$ | 0.045 | $\rho =$ | 2.48441 |
| $\varepsilon =$ | 5 | e= | 0.35 | $\alpha =$ | 0.05  | $\rho =$ | 2.48382 |
| $\varepsilon =$ | 5 | e= | 0.35 | $\alpha =$ | 0.055 | $\rho =$ | 2.48323 |
| $\varepsilon =$ | 5 | e= | 0.35 | $\alpha =$ | 0.06  | $\rho =$ | 2.48265 |
| $\varepsilon =$ | 5 | e= | 0.35 | $\alpha =$ | 0.065 | $\rho =$ | 2.48206 |

FIG. 5F

| | | | | | | |
|---|---|---|---|---|---|---|
| $\varepsilon =$ | 5 | e= | 0.35 | $\alpha =$ | 0.07 | $\rho =$ | 2.48147 |
| $\varepsilon =$ | 5 | e= | 0.35 | $\alpha =$ | 0.075 | $\rho =$ | 2.48088 |
| $\varepsilon =$ | 5 | e= | 0.35 | $\alpha =$ | 0.08 | $\rho =$ | 2.48028 |
| $\varepsilon =$ | 5 | e= | 0.35 | $\alpha =$ | 0.085 | $\rho =$ | 2.47969 |
| $\varepsilon =$ | 5 | e= | 0.35 | $\alpha =$ | 0.09 | $\rho =$ | 2.4791 |
| $\varepsilon =$ | 5 | e= | 0.35 | $\alpha =$ | 0.095 | $\rho =$ | 2.47851 |
| $\varepsilon =$ | 5 | e= | 0.35 | $\alpha =$ | 0.1 | $\rho =$ | 2.47791 |
| $\varepsilon =$ | 5 | e= | 0.4 | $\alpha =$ | 0.005 | $\rho =$ | 2.44894 |
| $\varepsilon =$ | 5 | e= | 0.4 | $\alpha =$ | 0.01 | $\rho =$ | 2.4484 |
| $\varepsilon =$ | 5 | e= | 0.4 | $\alpha =$ | 0.015 | $\rho =$ | 2.44785 |
| $\varepsilon =$ | 5 | e= | 0.4 | $\alpha =$ | 0.02 | $\rho =$ | 2.4473 |
| $\varepsilon =$ | 5 | e= | 0.4 | $\alpha =$ | 0.025 | $\rho =$ | 2.44675 |
| $\varepsilon =$ | 5 | e= | 0.4 | $\alpha =$ | 0.03 | $\rho =$ | 2.4462 |
| $\varepsilon =$ | 5 | e= | 0.4 | $\alpha =$ | 0.035 | $\rho =$ | 2.44565 |
| $\varepsilon =$ | 5 | e= | 0.4 | $\alpha =$ | 0.04 | $\rho =$ | 2.4451 |
| $\varepsilon =$ | 5 | e= | 0.4 | $\alpha =$ | 0.045 | $\rho =$ | 2.44455 |
| $\varepsilon =$ | 5 | e= | 0.4 | $\alpha =$ | 0.05 | $\rho =$ | 2.44399 |
| $\varepsilon =$ | 5 | e= | 0.4 | $\alpha =$ | 0.055 | $\rho =$ | 2.44344 |
| $\varepsilon =$ | 5 | e= | 0.4 | $\alpha =$ | 0.06 | $\rho =$ | 2.44289 |
| $\varepsilon =$ | 5 | e= | 0.4 | $\alpha =$ | 0.065 | $\rho =$ | 2.44234 |
| $\varepsilon =$ | 5 | e= | 0.4 | $\alpha =$ | 0.07 | $\rho =$ | 2.44178 |
| $\varepsilon =$ | 5 | e= | 0.4 | $\alpha =$ | 0.075 | $\rho =$ | 2.44123 |
| $\varepsilon =$ | 5 | e= | 0.4 | $\alpha =$ | 0.08 | $\rho =$ | 2.44067 |
| $\varepsilon =$ | 5 | e= | 0.4 | $\alpha =$ | 0.085 | $\rho =$ | 2.44012 |
| $\varepsilon =$ | 5 | e= | 0.4 | $\alpha =$ | 0.09 | $\rho =$ | 2.43956 |
| $\varepsilon =$ | 5 | e= | 0.4 | $\alpha =$ | 0.095 | $\rho =$ | 2.439 |
| $\varepsilon =$ | 5 | e= | 0.4 | $\alpha =$ | 0.1 | $\rho =$ | 2.43844 |
| $\varepsilon =$ | 5 | e= | 0.45 | $\alpha =$ | 0.005 | $\rho =$ | 2.41557 |
| $\varepsilon =$ | 5 | e= | 0.45 | $\alpha =$ | 0.01 | $\rho =$ | 2.41506 |
| $\varepsilon =$ | 5 | e= | 0.45 | $\alpha =$ | 0.015 | $\rho =$ | 2.41454 |
| $\varepsilon =$ | 5 | e= | 0.45 | $\alpha =$ | 0.02 | $\rho =$ | 2.41402 |
| $\varepsilon =$ | 5 | e= | 0.45 | $\alpha =$ | 0.025 | $\rho =$ | 2.4135 |
| $\varepsilon =$ | 5 | e= | 0.45 | $\alpha =$ | 0.03 | $\rho =$ | 2.41298 |
| $\varepsilon =$ | 5 | e= | 0.45 | $\alpha =$ | 0.035 | $\rho =$ | 2.41246 |
| $\varepsilon =$ | 5 | e= | 0.45 | $\alpha =$ | 0.04 | $\rho =$ | 2.41194 |
| $\varepsilon =$ | 5 | e= | 0.45 | $\alpha =$ | 0.045 | $\rho =$ | 2.41142 |
| $\varepsilon =$ | 5 | e= | 0.45 | $\alpha =$ | 0.05 | $\rho =$ | 2.4109 |
| $\varepsilon =$ | 5 | e= | 0.45 | $\alpha =$ | 0.055 | $\rho =$ | 2.41038 |
| $\varepsilon =$ | 5 | e= | 0.45 | $\alpha =$ | 0.06 | $\rho =$ | 2.40985 |
| $\varepsilon =$ | 5 | e= | 0.45 | $\alpha =$ | 0.065 | $\rho =$ | 2.40933 |
| $\varepsilon =$ | 5 | e= | 0.45 | $\alpha =$ | 0.07 | $\rho =$ | 2.40881 |
| $\varepsilon =$ | 5 | e= | 0.45 | $\alpha =$ | 0.075 | $\rho =$ | 2.40828 |
| $\varepsilon =$ | 5 | e= | 0.45 | $\alpha =$ | 0.08 | $\rho =$ | 2.40776 |
| $\varepsilon =$ | 5 | e= | 0.45 | $\alpha =$ | 0.085 | $\rho =$ | 2.40723 |
| $\varepsilon =$ | 5 | e= | 0.45 | $\alpha =$ | 0.09 | $\rho =$ | 2.40671 |
| $\varepsilon =$ | 5 | e= | 0.45 | $\alpha =$ | 0.095 | $\rho =$ | 2.40618 |
| $\varepsilon =$ | 5 | e= | 0.45 | $\alpha =$ | 0.1 | $\rho =$ | 2.40566 |
| $\varepsilon =$ | 5 | e= | 0.5 | $\alpha =$ | 0.005 | $\rho =$ | 2.3873 |
| $\varepsilon =$ | 5 | e= | 0.5 | $\alpha =$ | 0.01 | $\rho =$ | 2.38681 |
| $\varepsilon =$ | 5 | e= | 0.5 | $\alpha =$ | 0.015 | $\rho =$ | 2.38632 |
| $\varepsilon =$ | 5 | e= | 0.5 | $\alpha =$ | 0.02 | $\rho =$ | 2.38583 |
| $\varepsilon =$ | 5 | e= | 0.5 | $\alpha =$ | 0.025 | $\rho =$ | 2.38534 |
| $\varepsilon =$ | 5 | e= | 0.5 | $\alpha =$ | 0.03 | $\rho =$ | 2.38484 |
| $\varepsilon =$ | 5 | e= | 0.5 | $\alpha =$ | 0.035 | $\rho =$ | 2.38435 |
| $\varepsilon =$ | 5 | e= | 0.5 | $\alpha =$ | 0.04 | $\rho =$ | 2.38386 |

FIG. 5G

| | | | | | | | |
|---|---|---|---|---|---|---|---|
| $\varepsilon=$ | 5 | $e=$ | 0.5 | $\alpha=$ | 0.045 | $\rho=$ | 2.38336 |
| $\varepsilon=$ | 5 | $e=$ | 0.5 | $\alpha=$ | 0.05 | $\rho=$ | 2.38287 |
| $\varepsilon=$ | 5 | $e=$ | 0.5 | $\alpha=$ | 0.055 | $\rho=$ | 2.38237 |
| $\varepsilon=$ | 5 | $e=$ | 0.5 | $\alpha=$ | 0.06 | $\rho=$ | 2.38187 |
| $\varepsilon=$ | 5 | $e=$ | 0.5 | $\alpha=$ | 0.065 | $\rho=$ | 2.38138 |
| $\varepsilon=$ | 5 | $e=$ | 0.5 | $\alpha=$ | 0.07 | $\rho=$ | 2.38088 |
| $\varepsilon=$ | 5 | $e=$ | 0.5 | $\alpha=$ | 0.075 | $\rho=$ | 2.38038 |
| $\varepsilon=$ | 5 | $e=$ | 0.5 | $\alpha=$ | 0.08 | $\rho=$ | 2.37989 |
| $\varepsilon=$ | 5 | $e=$ | 0.5 | $\alpha=$ | 0.085 | $\rho=$ | 2.37939 |
| $\varepsilon=$ | 5 | $e=$ | 0.5 | $\alpha=$ | 0.09 | $\rho=$ | 2.37889 |
| $\varepsilon=$ | 5 | $e=$ | 0.5 | $\alpha=$ | 0.095 | $\rho=$ | 2.37839 |
| $\varepsilon=$ | 5 | $e=$ | 0.5 | $\alpha=$ | 0.1 | $\rho=$ | 2.37789 |
| $\varepsilon=$ | 10 | $e=$ | 0.05 | $\alpha=$ | 0.005 | $\rho=$ | 4.35726 |
| $\varepsilon=$ | 10 | $e=$ | 0.05 | $\alpha=$ | 0.01 | $\rho=$ | 4.35562 |
| $\varepsilon=$ | 10 | $e=$ | 0.05 | $\alpha=$ | 0.015 | $\rho=$ | 4.35397 |
| $\varepsilon=$ | 10 | $e=$ | 0.05 | $\alpha=$ | 0.02 | $\rho=$ | 4.35233 |
| $\varepsilon=$ | 10 | $e=$ | 0.05 | $\alpha=$ | 0.025 | $\rho=$ | 4.35068 |
| $\varepsilon=$ | 10 | $e=$ | 0.05 | $\alpha=$ | 0.03 | $\rho=$ | 4.34903 |
| $\varepsilon=$ | 10 | $e=$ | 0.05 | $\alpha=$ | 0.035 | $\rho=$ | 4.34737 |
| $\varepsilon=$ | 10 | $e=$ | 0.05 | $\alpha=$ | 0.04 | $\rho=$ | 4.34572 |
| $\varepsilon=$ | 10 | $e=$ | 0.05 | $\alpha=$ | 0.045 | $\rho=$ | 4.34406 |
| $\varepsilon=$ | 10 | $e=$ | 0.05 | $\alpha=$ | 0.05 | $\rho=$ | 4.3424 |
| $\varepsilon=$ | 10 | $e=$ | 0.05 | $\alpha=$ | 0.055 | $\rho=$ | 4.34073 |
| $\varepsilon=$ | 10 | $e=$ | 0.05 | $\alpha=$ | 0.06 | $\rho=$ | 4.33907 |
| $\varepsilon=$ | 10 | $e=$ | 0.05 | $\alpha=$ | 0.065 | $\rho=$ | 4.3374 |
| $\varepsilon=$ | 10 | $e=$ | 0.05 | $\alpha=$ | 0.07 | $\rho=$ | 4.33573 |
| $\varepsilon=$ | 10 | $e=$ | 0.05 | $\alpha=$ | 0.075 | $\rho=$ | 4.33406 |
| $\varepsilon=$ | 10 | $e=$ | 0.05 | $\alpha=$ | 0.08 | $\rho=$ | 4.33238 |
| $\varepsilon=$ | 10 | $e=$ | 0.05 | $\alpha=$ | 0.085 | $\rho=$ | 4.3307 |
| $\varepsilon=$ | 10 | $e=$ | 0.05 | $\alpha=$ | 0.09 | $\rho=$ | 4.32902 |
| $\varepsilon=$ | 10 | $e=$ | 0.05 | $\alpha=$ | 0.095 | $\rho=$ | 4.32734 |
| $\varepsilon=$ | 10 | $e=$ | 0.05 | $\alpha=$ | 0.1 | $\rho=$ | 4.32566 |
| $\varepsilon=$ | 10 | $e=$ | 0.1 | $\alpha=$ | 0.005 | $\rho=$ | 3.90972 |
| $\varepsilon=$ | 10 | $e=$ | 0.1 | $\alpha=$ | 0.01 | $\rho=$ | 3.90848 |
| $\varepsilon=$ | 10 | $e=$ | 0.1 | $\alpha=$ | 0.015 | $\rho=$ | 3.90723 |
| $\varepsilon=$ | 10 | $e=$ | 0.1 | $\alpha=$ | 0.02 | $\rho=$ | 3.90598 |
| $\varepsilon=$ | 10 | $e=$ | 0.1 | $\alpha=$ | 0.025 | $\rho=$ | 3.90473 |
| $\varepsilon=$ | 10 | $e=$ | 0.1 | $\alpha=$ | 0.03 | $\rho=$ | 3.90348 |
| $\varepsilon=$ | 10 | $e=$ | 0.1 | $\alpha=$ | 0.035 | $\rho=$ | 3.90223 |
| $\varepsilon=$ | 10 | $e=$ | 0.1 | $\alpha=$ | 0.04 | $\rho=$ | 3.90098 |
| $\varepsilon=$ | 10 | $e=$ | 0.1 | $\alpha=$ | 0.045 | $\rho=$ | 3.89972 |
| $\varepsilon=$ | 10 | $e=$ | 0.1 | $\alpha=$ | 0.05 | $\rho=$ | 3.89847 |
| $\varepsilon=$ | 10 | $e=$ | 0.1 | $\alpha=$ | 0.055 | $\rho=$ | 3.89721 |
| $\varepsilon=$ | 10 | $e=$ | 0.1 | $\alpha=$ | 0.06 | $\rho=$ | 3.89595 |
| $\varepsilon=$ | 10 | $e=$ | 0.1 | $\alpha=$ | 0.065 | $\rho=$ | 3.89469 |
| $\varepsilon=$ | 10 | $e=$ | 0.1 | $\alpha=$ | 0.07 | $\rho=$ | 3.89342 |
| $\varepsilon=$ | 10 | $e=$ | 0.1 | $\alpha=$ | 0.075 | $\rho=$ | 3.89216 |
| $\varepsilon=$ | 10 | $e=$ | 0.1 | $\alpha=$ | 0.08 | $\rho=$ | 3.89089 |
| $\varepsilon=$ | 10 | $e=$ | 0.1 | $\alpha=$ | 0.085 | $\rho=$ | 3.88962 |
| $\varepsilon=$ | 10 | $e=$ | 0.1 | $\alpha=$ | 0.09 | $\rho=$ | 3.88835 |
| $\varepsilon=$ | 10 | $e=$ | 0.1 | $\alpha=$ | 0.095 | $\rho=$ | 3.88708 |
| $\varepsilon=$ | 10 | $e=$ | 0.1 | $\alpha=$ | 0.1 | $\rho=$ | 3.88581 |
| $\varepsilon=$ | 10 | $e=$ | 0.15 | $\alpha=$ | 0.005 | $\rho=$ | 3.70272 |
| $\varepsilon=$ | 10 | $e=$ | 0.15 | $\alpha=$ | 0.01 | $\rho=$ | 3.70169 |
| $\varepsilon=$ | 10 | $e=$ | 0.15 | $\alpha=$ | 0.015 | $\rho=$ | 3.70065 |

FIG. 5H

| | | | | | | | |
|---|---|---|---|---|---|---|---|
| $\varepsilon =$ | 10 | e= | 0.15 | $\alpha =$ | 0.02 | $\rho =$ | 3.69962 |
| $\varepsilon =$ | 10 | e= | 0.15 | $\alpha =$ | 0.025 | $\rho =$ | 3.69858 |
| $\varepsilon =$ | 10 | e= | 0.15 | $\alpha =$ | 0.03 | $\rho =$ | 3.69754 |
| $\varepsilon =$ | 10 | e= | 0.15 | $\alpha =$ | 0.035 | $\rho =$ | 3.6965 |
| $\varepsilon =$ | 10 | e= | 0.15 | $\alpha =$ | 0.04 | $\rho =$ | 3.69546 |
| $\varepsilon =$ | 10 | e= | 0.15 | $\alpha =$ | 0.045 | $\rho =$ | 3.69441 |
| $\varepsilon =$ | 10 | e= | 0.15 | $\alpha =$ | 0.05 | $\rho =$ | 3.69337 |
| $\varepsilon =$ | 10 | e= | 0.15 | $\alpha =$ | 0.055 | $\rho =$ | 3.69233 |
| $\varepsilon =$ | 10 | e= | 0.15 | $\alpha =$ | 0.06 | $\rho =$ | 3.69128 |
| $\varepsilon =$ | 10 | e= | 0.15 | $\alpha =$ | 0.065 | $\rho =$ | 3.69023 |
| $\varepsilon =$ | 10 | e= | 0.15 | $\alpha =$ | 0.07 | $\rho =$ | 3.68918 |
| $\varepsilon =$ | 10 | e= | 0.15 | $\alpha =$ | 0.075 | $\rho =$ | 3.68813 |
| $\varepsilon =$ | 10 | e= | 0.15 | $\alpha =$ | 0.08 | $\rho =$ | 3.68708 |
| $\varepsilon =$ | 10 | e= | 0.15 | $\alpha =$ | 0.085 | $\rho =$ | 3.68603 |
| $\varepsilon =$ | 10 | e= | 0.15 | $\alpha =$ | 0.09 | $\rho =$ | 3.68498 |
| $\varepsilon =$ | 10 | e= | 0.15 | $\alpha =$ | 0.095 | $\rho =$ | 3.68392 |
| $\varepsilon =$ | 10 | e= | 0.15 | $\alpha =$ | 0.1 | $\rho =$ | 3.68286 |
| $\varepsilon =$ | 10 | e= | 0.2 | $\alpha =$ | 0.005 | $\rho =$ | 3.57825 |
| $\varepsilon =$ | 10 | e= | 0.2 | $\alpha =$ | 0.01 | $\rho =$ | 3.57735 |
| $\varepsilon =$ | 10 | e= | 0.2 | $\alpha =$ | 0.015 | $\rho =$ | 3.57645 |
| $\varepsilon =$ | 10 | e= | 0.2 | $\alpha =$ | 0.02 | $\rho =$ | 3.57556 |
| $\varepsilon =$ | 10 | e= | 0.2 | $\alpha =$ | 0.025 | $\rho =$ | 3.57466 |
| $\varepsilon =$ | 10 | e= | 0.2 | $\alpha =$ | 0.03 | $\rho =$ | 3.57376 |
| $\varepsilon =$ | 10 | e= | 0.2 | $\alpha =$ | 0.035 | $\rho =$ | 3.57286 |
| $\varepsilon =$ | 10 | e= | 0.2 | $\alpha =$ | 0.04 | $\rho =$ | 3.57196 |
| $\varepsilon =$ | 10 | e= | 0.2 | $\alpha =$ | 0.045 | $\rho =$ | 3.57105 |
| $\varepsilon =$ | 10 | e= | 0.2 | $\alpha =$ | 0.05 | $\rho =$ | 3.57015 |
| $\varepsilon =$ | 10 | e= | 0.2 | $\alpha =$ | 0.055 | $\rho =$ | 3.56924 |
| $\varepsilon =$ | 10 | e= | 0.2 | $\alpha =$ | 0.06 | $\rho =$ | 3.56834 |
| $\varepsilon =$ | 10 | e= | 0.2 | $\alpha =$ | 0.065 | $\rho =$ | 3.56743 |
| $\varepsilon =$ | 10 | e= | 0.2 | $\alpha =$ | 0.07 | $\rho =$ | 3.56653 |
| $\varepsilon =$ | 10 | e= | 0.2 | $\alpha =$ | 0.075 | $\rho =$ | 3.56562 |
| $\varepsilon =$ | 10 | e= | 0.2 | $\alpha =$ | 0.08 | $\rho =$ | 3.56471 |
| $\varepsilon =$ | 10 | e= | 0.2 | $\alpha =$ | 0.085 | $\rho =$ | 3.5638 |
| $\varepsilon =$ | 10 | e= | 0.2 | $\alpha =$ | 0.09 | $\rho =$ | 3.56289 |
| $\varepsilon =$ | 10 | e= | 0.2 | $\alpha =$ | 0.095 | $\rho =$ | 3.56197 |
| $\varepsilon =$ | 10 | e= | 0.2 | $\alpha =$ | 0.1 | $\rho =$ | 3.56106 |
| $\varepsilon =$ | 10 | e= | 0.25 | $\alpha =$ | 0.005 | $\rho =$ | 3.49364 |
| $\varepsilon =$ | 10 | e= | 0.25 | $\alpha =$ | 0.01 | $\rho =$ | 3.49285 |
| $\varepsilon =$ | 10 | e= | 0.25 | $\alpha =$ | 0.015 | $\rho =$ | 3.49205 |
| $\varepsilon =$ | 10 | e= | 0.25 | $\alpha =$ | 0.02 | $\rho =$ | 3.49126 |
| $\varepsilon =$ | 10 | e= | 0.25 | $\alpha =$ | 0.025 | $\rho =$ | 3.49046 |
| $\varepsilon =$ | 10 | e= | 0.25 | $\alpha =$ | 0.03 | $\rho =$ | 3.48966 |
| $\varepsilon =$ | 10 | e= | 0.25 | $\alpha =$ | 0.035 | $\rho =$ | 3.48886 |
| $\varepsilon =$ | 10 | e= | 0.25 | $\alpha =$ | 0.04 | $\rho =$ | 3.48806 |
| $\varepsilon =$ | 10 | e= | 0.25 | $\alpha =$ | 0.045 | $\rho =$ | 3.48726 |
| $\varepsilon =$ | 10 | e= | 0.25 | $\alpha =$ | 0.05 | $\rho =$ | 3.48646 |
| $\varepsilon =$ | 10 | e= | 0.25 | $\alpha =$ | 0.055 | $\rho =$ | 3.48566 |
| $\varepsilon =$ | 10 | e= | 0.25 | $\alpha =$ | 0.06 | $\rho =$ | 3.48486 |
| $\varepsilon =$ | 10 | e= | 0.25 | $\alpha =$ | 0.065 | $\rho =$ | 3.48405 |
| $\varepsilon =$ | 10 | e= | 0.25 | $\alpha =$ | 0.07 | $\rho =$ | 3.48325 |
| $\varepsilon =$ | 10 | e= | 0.25 | $\alpha =$ | 0.075 | $\rho =$ | 3.48244 |
| $\varepsilon =$ | 10 | e= | 0.25 | $\alpha =$ | 0.08 | $\rho =$ | 3.48164 |
| $\varepsilon =$ | 10 | e= | 0.25 | $\alpha =$ | 0.085 | $\rho =$ | 3.48083 |
| $\varepsilon =$ | 10 | e= | 0.25 | $\alpha =$ | 0.09 | $\rho =$ | 3.48002 |

FIG. 5I

| | | | | | | | |
|---|---|---|---|---|---|---|---|
| $\varepsilon =$ | 10 | e= | 0.25 | $\alpha =$ | 0.095 | $\rho =$ | 3.47921 |
| $\varepsilon =$ | 10 | e= | 0.25 | $\alpha =$ | 0.1 | $\rho =$ | 3.4784 |
| $\varepsilon =$ | 10 | e= | 0.3 | $\alpha =$ | 0.005 | $\rho =$ | 3.43182 |
| $\varepsilon =$ | 10 | e= | 0.3 | $\alpha =$ | 0.01 | $\rho =$ | 3.43111 |
| $\varepsilon =$ | 10 | e= | 0.3 | $\alpha =$ | 0.015 | $\rho =$ | 3.43039 |
| $\varepsilon =$ | 10 | e= | 0.3 | $\alpha =$ | 0.02 | $\rho =$ | 3.42967 |
| $\varepsilon =$ | 10 | e= | 0.3 | $\alpha =$ | 0.025 | $\rho =$ | 3.42895 |
| $\varepsilon =$ | 10 | e= | 0.3 | $\alpha =$ | 0.03 | $\rho =$ | 3.42823 |
| $\varepsilon =$ | 10 | e= | 0.3 | $\alpha =$ | 0.035 | $\rho =$ | 3.42751 |
| $\varepsilon =$ | 10 | e= | 0.3 | $\alpha =$ | 0.04 | $\rho =$ | 3.42679 |
| $\varepsilon =$ | 10 | e= | 0.3 | $\alpha =$ | 0.045 | $\rho =$ | 3.42607 |
| $\varepsilon =$ | 10 | e= | 0.3 | $\alpha =$ | 0.05 | $\rho =$ | 3.42535 |
| $\varepsilon =$ | 10 | e= | 0.3 | $\alpha =$ | 0.055 | $\rho =$ | 3.42462 |
| $\varepsilon =$ | 10 | e= | 0.3 | $\alpha =$ | 0.06 | $\rho =$ | 3.4239 |
| $\varepsilon =$ | 10 | e= | 0.3 | $\alpha =$ | 0.065 | $\rho =$ | 3.42318 |
| $\varepsilon =$ | 10 | e= | 0.3 | $\alpha =$ | 0.07 | $\rho =$ | 3.42245 |
| $\varepsilon =$ | 10 | e= | 0.3 | $\alpha =$ | 0.075 | $\rho =$ | 3.42173 |
| $\varepsilon =$ | 10 | e= | 0.3 | $\alpha =$ | 0.08 | $\rho =$ | 3.421 |
| $\varepsilon =$ | 10 | e= | 0.3 | $\alpha =$ | 0.085 | $\rho =$ | 3.42027 |
| $\varepsilon =$ | 10 | e= | 0.3 | $\alpha =$ | 0.09 | $\rho =$ | 3.41954 |
| $\varepsilon =$ | 10 | e= | 0.3 | $\alpha =$ | 0.095 | $\rho =$ | 3.41882 |
| $\varepsilon =$ | 10 | e= | 0.3 | $\alpha =$ | 0.1 | $\rho =$ | 3.41809 |
| $\varepsilon =$ | 10 | e= | 0.35 | $\alpha =$ | 0.005 | $\rho =$ | 3.38441 |
| $\varepsilon =$ | 10 | e= | 0.35 | $\alpha =$ | 0.01 | $\rho =$ | 3.38376 |
| $\varepsilon =$ | 10 | e= | 0.35 | $\alpha =$ | 0.015 | $\rho =$ | 3.3831 |
| $\varepsilon =$ | 10 | e= | 0.35 | $\alpha =$ | 0.02 | $\rho =$ | 3.38245 |
| $\varepsilon =$ | 10 | e= | 0.35 | $\alpha =$ | 0.025 | $\rho =$ | 3.38179 |
| $\varepsilon =$ | 10 | e= | 0.35 | $\alpha =$ | 0.03 | $\rho =$ | 3.38113 |
| $\varepsilon =$ | 10 | e= | 0.35 | $\alpha =$ | 0.035 | $\rho =$ | 3.38048 |
| $\varepsilon =$ | 10 | e= | 0.35 | $\alpha =$ | 0.04 | $\rho =$ | 3.37982 |
| $\varepsilon =$ | 10 | e= | 0.35 | $\alpha =$ | 0.045 | $\rho =$ | 3.37916 |
| $\varepsilon =$ | 10 | e= | 0.35 | $\alpha =$ | 0.05 | $\rho =$ | 3.3785 |
| $\varepsilon =$ | 10 | e= | 0.35 | $\alpha =$ | 0.055 | $\rho =$ | 3.37784 |
| $\varepsilon =$ | 10 | e= | 0.35 | $\alpha =$ | 0.06 | $\rho =$ | 3.37718 |
| $\varepsilon =$ | 10 | e= | 0.35 | $\alpha =$ | 0.065 | $\rho =$ | 3.37652 |
| $\varepsilon =$ | 10 | e= | 0.35 | $\alpha =$ | 0.07 | $\rho =$ | 3.37586 |
| $\varepsilon =$ | 10 | e= | 0.35 | $\alpha =$ | 0.075 | $\rho =$ | 3.3752 |
| $\varepsilon =$ | 10 | e= | 0.35 | $\alpha =$ | 0.08 | $\rho =$ | 3.37454 |
| $\varepsilon =$ | 10 | e= | 0.35 | $\alpha =$ | 0.085 | $\rho =$ | 3.37387 |
| $\varepsilon =$ | 10 | e= | 0.35 | $\alpha =$ | 0.09 | $\rho =$ | 3.37321 |
| $\varepsilon =$ | 10 | e= | 0.35 | $\alpha =$ | 0.095 | $\rho =$ | 3.37254 |
| $\varepsilon =$ | 10 | e= | 0.35 | $\alpha =$ | 0.1 | $\rho =$ | 3.37188 |
| $\varepsilon =$ | 10 | e= | 0.4 | $\alpha =$ | 0.005 | $\rho =$ | 3.34676 |
| $\varepsilon =$ | 10 | e= | 0.4 | $\alpha =$ | 0.01 | $\rho =$ | 3.34616 |
| $\varepsilon =$ | 10 | e= | 0.4 | $\alpha =$ | 0.015 | $\rho =$ | 3.34555 |
| $\varepsilon =$ | 10 | e= | 0.4 | $\alpha =$ | 0.02 | $\rho =$ | 3.44495 |
| $\varepsilon =$ | 10 | e= | 0.4 | $\alpha =$ | 0.025 | $\rho =$ | 3.34435 |
| $\varepsilon =$ | 10 | e= | 0.4 | $\alpha =$ | 0.03 | $\rho =$ | 3.34974 |
| $\varepsilon =$ | 10 | e= | 0.4 | $\alpha =$ | 0.035 | $\rho =$ | 3.34314 |
| $\varepsilon =$ | 10 | e= | 0.4 | $\alpha =$ | 0.04 | $\rho =$ | 3.34253 |
| $\varepsilon =$ | 10 | e= | 0.4 | $\alpha =$ | 0.045 | $\rho =$ | 3.34193 |
| $\varepsilon =$ | 10 | e= | 0.4 | $\alpha =$ | 0.05 | $\rho =$ | 3.34132 |
| $\varepsilon =$ | 10 | e= | 0.4 | $\alpha =$ | 0.055 | $\rho =$ | 3.34071 |
| $\varepsilon =$ | 10 | e= | 0.4 | $\alpha =$ | 0.06 | $\rho =$ | 3.3401 |
| $\varepsilon =$ | 10 | e= | 0.4 | $\alpha =$ | 0.065 | $\rho =$ | 3.3395 |

FIG. 5J

| | | | | | | | |
|---|---|---|---|---|---|---|---|
| $\varepsilon =$ | 10 | e= | 0.4 | $\alpha =$ | 0.07 | $\rho =$ | 3.33889 |
| $\varepsilon =$ | 10 | e= | 0.4 | $\alpha =$ | 0.075 | $\rho =$ | 3.33828 |
| $\varepsilon =$ | 10 | e= | 0.4 | $\alpha =$ | 0.08 | $\rho =$ | 3.33767 |
| $\varepsilon =$ | 10 | e= | 0.4 | $\alpha =$ | 0.085 | $\rho =$ | 3.33706 |
| $\varepsilon =$ | 10 | e= | 0.4 | $\alpha =$ | 0.09 | $\rho =$ | 3.33645 |
| $\varepsilon =$ | 10 | e= | 0.4 | $\alpha =$ | 0.095 | $\rho =$ | 3.33584 |
| $\varepsilon =$ | 10 | e= | 0.4 | $\alpha =$ | 0.1 | $\rho =$ | 3.33522 |
| $\varepsilon =$ | 10 | e= | 0.45 | $\alpha =$ | 0.005 | $\rho =$ | 3.31607 |
| $\varepsilon =$ | 10 | e= | 0.45 | $\alpha =$ | 0.01 | $\rho =$ | 3.31551 |
| $\varepsilon =$ | 10 | e= | 0.45 | $\alpha =$ | 0.015 | $\rho =$ | 3.31495 |
| $\varepsilon =$ | 10 | e= | 0.45 | $\alpha =$ | 0.02 | $\rho =$ | 3.31439 |
| $\varepsilon =$ | 10 | e= | 0.45 | $\alpha =$ | 0.025 | $\rho =$ | 3.31383 |
| $\varepsilon =$ | 10 | e= | 0.45 | $\alpha =$ | 0.03 | $\rho =$ | 3.31327 |
| $\varepsilon =$ | 10 | e= | 0.45 | $\alpha =$ | 0.035 | $\rho =$ | 3.31271 |
| $\varepsilon =$ | 10 | e= | 0.45 | $\alpha =$ | 0.04 | $\rho =$ | 3.31214 |
| $\varepsilon =$ | 10 | e= | 0.45 | $\alpha =$ | 0.045 | $\rho =$ | 3.31158 |
| $\varepsilon =$ | 10 | e= | 0.45 | $\alpha =$ | 0.05 | $\rho =$ | 3.31102 |
| $\varepsilon =$ | 10 | e= | 0.45 | $\alpha =$ | 0.055 | $\rho =$ | 3.31046 |
| $\varepsilon =$ | 10 | e= | 0.45 | $\alpha =$ | 0.06 | $\rho =$ | 3.30989 |
| $\varepsilon =$ | 10 | e= | 0.45 | $\alpha =$ | 0.065 | $\rho =$ | 3.30933 |
| $\varepsilon =$ | 10 | e= | 0.45 | $\alpha =$ | 0.07 | $\rho =$ | 3.30876 |
| $\varepsilon =$ | 10 | e= | 0.45 | $\alpha =$ | 0.075 | $\rho =$ | 3.3082 |
| $\varepsilon =$ | 10 | e= | 0.45 | $\alpha =$ | 0.08 | $\rho =$ | 3.30763 |
| $\varepsilon =$ | 10 | e= | 0.45 | $\alpha =$ | 0.085 | $\rho =$ | 3.30707 |
| $\varepsilon =$ | 10 | e= | 0.45 | $\alpha =$ | 0.09 | $\rho =$ | 3.3065 |
| $\varepsilon =$ | 10 | e= | 0.45 | $\alpha =$ | 0.095 | $\rho =$ | 3.30594 |
| $\varepsilon =$ | 10 | e= | 0.45 | $\alpha =$ | 0.1 | $\rho =$ | 3.30537 |
| $\varepsilon =$ | 10 | e= | 0.5 | $\alpha =$ | 0.005 | $\rho =$ | 3.29052 |
| $\varepsilon =$ | 10 | e= | 0.5 | $\alpha =$ | 0.01 | $\rho =$ | 3.29 |
| $\varepsilon =$ | 10 | e= | 0.5 | $\alpha =$ | 0.015 | $\rho =$ | 3.28948 |
| $\varepsilon =$ | 10 | e= | 0.5 | $\alpha =$ | 0.02 | $\rho =$ | 3.28895 |
| $\varepsilon =$ | 10 | e= | 0.5 | $\alpha =$ | 0.025 | $\rho =$ | 3.28843 |
| $\varepsilon =$ | 10 | e= | 0.5 | $\alpha =$ | 0.03 | $\rho =$ | 3.28791 |
| $\varepsilon =$ | 10 | e= | 0.5 | $\alpha =$ | 0.035 | $\rho =$ | 3.28738 |
| $\varepsilon =$ | 10 | e= | 0.5 | $\alpha =$ | 0.04 | $\rho =$ | 3.28686 |
| $\varepsilon =$ | 10 | e= | 0.5 | $\alpha =$ | 0.045 | $\rho =$ | 3.28634 |
| $\varepsilon =$ | 10 | e= | 0.5 | $\alpha =$ | 0.05 | $\rho =$ | 3.28581 |
| $\varepsilon =$ | 10 | e= | 0.5 | $\alpha =$ | 0.055 | $\rho =$ | 3.28529 |
| $\varepsilon =$ | 10 | e= | 0.5 | $\alpha =$ | 0.06 | $\rho =$ | 3.28476 |
| $\varepsilon =$ | 10 | e= | 0.5 | $\alpha =$ | 0.065 | $\rho =$ | 3.28423 |
| $\varepsilon =$ | 10 | e= | 0.5 | $\alpha =$ | 0.07 | $\rho =$ | 3.28371 |
| $\varepsilon =$ | 10 | e= | 0.5 | $\alpha =$ | 0.075 | $\rho =$ | 3.28318 |
| $\varepsilon =$ | 10 | e= | 0.5 | $\alpha =$ | 0.08 | $\rho =$ | 3.28265 |
| $\varepsilon =$ | 10 | e= | 0.5 | $\alpha =$ | 0.085 | $\rho =$ | 3.28213 |
| $\varepsilon =$ | 10 | e= | 0.5 | $\alpha =$ | 0.09 | $\rho =$ | 3.2816 |
| $\varepsilon =$ | 10 | e= | 0.5 | $\alpha =$ | 0.095 | $\rho =$ | 3.28107 |
| $\varepsilon =$ | 10 | e= | 0.5 | $\alpha =$ | 0.1 | $\rho =$ | 3.28054 |
| $\varepsilon =$ | 15 | e= | 0.05 | $\alpha =$ | 0.005 | $\rho =$ | 5.04313 |
| $\varepsilon =$ | 15 | e= | 0.05 | $\alpha =$ | 0.01 | $\rho =$ | 5.04134 |
| $\varepsilon =$ | 15 | e= | 0.05 | $\alpha =$ | 0.015 | $\rho =$ | 5.03954 |
| $\varepsilon =$ | 15 | e= | 0.05 | $\alpha =$ | 0.02 | $\rho =$ | 5.03773 |
| $\varepsilon =$ | 15 | e= | 0.05 | $\alpha =$ | 0.025 | $\rho =$ | 5.03593 |
| $\varepsilon =$ | 15 | e= | 0.05 | $\alpha =$ | 0.03 | $\rho =$ | 5.03412 |
| $\varepsilon =$ | 15 | e= | 0.05 | $\alpha =$ | 0.035 | $\rho =$ | 5.03231 |
| $\varepsilon =$ | 15 | e= | 0.05 | $\alpha =$ | 0.04 | $\rho =$ | 5.0305 |

FIG. 5K

| | | | | | | |
|---|---|---|---|---|---|---|
| $\varepsilon =$ | 15 | e= | 0.05 | $\alpha =$ | 0.045 | $\rho =$ | 5.02868 |
| $\varepsilon =$ | 15 | e= | 0.05 | $\alpha =$ | 0.05 | $\rho =$ | 5.02686 |
| $\varepsilon =$ | 15 | e= | 0.05 | $\alpha =$ | 0.055 | $\rho =$ | 5.02504 |
| $\varepsilon =$ | 15 | e= | 0.05 | $\alpha =$ | 0.06 | $\rho =$ | 5.02322 |
| $\varepsilon =$ | 15 | e= | 0.05 | $\alpha =$ | 0.065 | $\rho =$ | 5.02139 |
| $\varepsilon =$ | 15 | e= | 0.05 | $\alpha =$ | 0.07 | $\rho =$ | 5.01957 |
| $\varepsilon =$ | 15 | e= | 0.05 | $\alpha =$ | 0.075 | $\rho =$ | 5.01774 |
| $\varepsilon =$ | 15 | e= | 0.05 | $\alpha =$ | 0.08 | $\rho =$ | 5.0159 |
| $\varepsilon =$ | 15 | e= | 0.05 | $\alpha =$ | 0.085 | $\rho =$ | 5.01407 |
| $\varepsilon =$ | 15 | e= | 0.05 | $\alpha =$ | 0.09 | $\rho =$ | 5.01223 |
| $\varepsilon =$ | 15 | e= | 0.05 | $\alpha =$ | 0.095 | $\rho =$ | 5.01039 |
| $\varepsilon =$ | 15 | e= | 0.05 | $\alpha =$ | 0.1 | $\rho =$ | 5.00854 |
| $\varepsilon =$ | 15 | e= | 0.1 | $\alpha =$ | 0.005 | $\rho =$ | 4.58126 |
| $\varepsilon =$ | 15 | e= | 0.1 | $\alpha =$ | 0.01 | $\rho =$ | 4.57995 |
| $\varepsilon =$ | 15 | e= | 0.1 | $\alpha =$ | 0.015 | $\rho =$ | 4.57863 |
| $\varepsilon =$ | 15 | e= | 0.1 | $\alpha =$ | 0.02 | $\rho =$ | 4.57731 |
| $\varepsilon =$ | 15 | e= | 0.1 | $\alpha =$ | 0.025 | $\rho =$ | 4.57599 |
| $\varepsilon =$ | 15 | e= | 0.1 | $\alpha =$ | 0.03 | $\rho =$ | 4.57467 |
| $\varepsilon =$ | 15 | e= | 0.1 | $\alpha =$ | 0.035 | $\rho =$ | 4.57334 |
| $\varepsilon =$ | 15 | e= | 0.1 | $\alpha =$ | 0.04 | $\rho =$ | 4.57202 |
| $\varepsilon =$ | 15 | e= | 0.1 | $\alpha =$ | 0.045 | $\rho =$ | 4.57069 |
| $\varepsilon =$ | 15 | e= | 0.1 | $\alpha =$ | 0.05 | $\rho =$ | 4.56936 |
| $\varepsilon =$ | 15 | e= | 0.1 | $\alpha =$ | 0.055 | $\rho =$ | 4.56803 |
| $\varepsilon =$ | 15 | e= | 0.1 | $\alpha =$ | 0.06 | $\rho =$ | 4.5667 |
| $\varepsilon =$ | 15 | e= | 0.1 | $\alpha =$ | 0.065 | $\rho =$ | 4.56537 |
| $\varepsilon =$ | 15 | e= | 0.1 | $\alpha =$ | 0.07 | $\rho =$ | 4.56404 |
| $\varepsilon =$ | 15 | e= | 0.1 | $\alpha =$ | 0.075 | $\rho =$ | 4.5627 |
| $\varepsilon =$ | 15 | e= | 0.1 | $\alpha =$ | 0.08 | $\rho =$ | 4.56136 |
| $\varepsilon =$ | 15 | e= | 0.1 | $\alpha =$ | 0.085 | $\rho =$ | 4.56002 |
| $\varepsilon =$ | 15 | e= | 0.1 | $\alpha =$ | 0.09 | $\rho =$ | 4.55868 |
| $\varepsilon =$ | 15 | e= | 0.1 | $\alpha =$ | 0.095 | $\rho =$ | 4.55734 |
| $\varepsilon =$ | 15 | e= | 0.1 | $\alpha =$ | 0.1 | $\rho =$ | 4.55599 |
| $\varepsilon =$ | 15 | e= | 0.15 | $\alpha =$ | 0.005 | $\rho =$ | 4.37432 |
| $\varepsilon =$ | 15 | e= | 0.15 | $\alpha =$ | 0.01 | $\rho =$ | 4.37326 |
| $\varepsilon =$ | 15 | e= | 0.15 | $\alpha =$ | 0.015 | $\rho =$ | 4.37219 |
| $\varepsilon =$ | 15 | e= | 0.15 | $\alpha =$ | 0.02 | $\rho =$ | 4.37113 |
| $\varepsilon =$ | 15 | e= | 0.15 | $\alpha =$ | 0.025 | $\rho =$ | 4.37006 |
| $\varepsilon =$ | 15 | e= | 0.15 | $\alpha =$ | 0.03 | $\rho =$ | 4.36899 |
| $\varepsilon =$ | 15 | e= | 0.15 | $\alpha =$ | 0.035 | $\rho =$ | 4.36792 |
| $\varepsilon =$ | 15 | e= | 0.15 | $\alpha =$ | 0.04 | $\rho =$ | 4.36685 |
| $\varepsilon =$ | 15 | e= | 0.15 | $\alpha =$ | 0.045 | $\rho =$ | 4.36577 |
| $\varepsilon =$ | 15 | e= | 0.15 | $\alpha =$ | 0.05 | $\rho =$ | 4.3647 |
| $\varepsilon =$ | 15 | e= | 0.15 | $\alpha =$ | 0.055 | $\rho =$ | 4.36363 |
| $\varepsilon =$ | 15 | e= | 0.15 | $\alpha =$ | 0.06 | $\rho =$ | 4.36255 |
| $\varepsilon =$ | 15 | e= | 0.15 | $\alpha =$ | 0.065 | $\rho =$ | 4.36147 |
| $\varepsilon =$ | 15 | e= | 0.15 | $\alpha =$ | 0.07 | $\rho =$ | 4.36039 |
| $\varepsilon =$ | 15 | e= | 0.15 | $\alpha =$ | 0.075 | $\rho =$ | 4.35931 |
| $\varepsilon =$ | 15 | e= | 0.15 | $\alpha =$ | 0.08 | $\rho =$ | 4.35823 |
| $\varepsilon =$ | 15 | e= | 0.15 | $\alpha =$ | 0.085 | $\rho =$ | 4.35715 |
| $\varepsilon =$ | 15 | e= | 0.15 | $\alpha =$ | 0.09 | $\rho =$ | 4.35607 |
| $\varepsilon =$ | 15 | e= | 0.15 | $\alpha =$ | 0.095 | $\rho =$ | 4.35498 |
| $\varepsilon =$ | 15 | e= | 0.15 | $\alpha =$ | 0.1 | $\rho =$ | 4.3539 |
| $\varepsilon =$ | 15 | e= | 0.2 | $\alpha =$ | 0.005 | $\rho =$ | 4.2529 |
| $\varepsilon =$ | 15 | e= | 0.2 | $\alpha =$ | 0.01 | $\rho =$ | 4.25199 |
| $\varepsilon =$ | 15 | e= | 0.2 | $\alpha =$ | 0.015 | $\rho =$ | 4.25109 |

FIG. 5L

| | | | | | | | |
|---|---|---|---|---|---|---|---|
| $\varepsilon =$ | 15 | e= | 0.2 | $\alpha =$ | 0.02 | $\rho =$ | 4.25019 |
| $\varepsilon =$ | 15 | e= | 0.2 | $\alpha =$ | 0.025 | $\rho =$ | 4.24928 |
| $\varepsilon =$ | 15 | e= | 0.2 | $\alpha =$ | 0.03 | $\rho =$ | 4.24838 |
| $\varepsilon =$ | 15 | e= | 0.2 | $\alpha =$ | 0.035 | $\rho =$ | 4.24747 |
| $\varepsilon =$ | 15 | e= | 0.2 | $\alpha =$ | 0.04 | $\rho =$ | 4.24656 |
| $\varepsilon =$ | 15 | e= | 0.2 | $\alpha =$ | 0.045 | $\rho =$ | 4.24565 |
| $\varepsilon =$ | 15 | e= | 0.2 | $\alpha =$ | 0.05 | $\rho =$ | 4.24474 |
| $\varepsilon =$ | 15 | e= | 0.2 | $\alpha =$ | 0.055 | $\rho =$ | 4.24383 |
| $\varepsilon =$ | 15 | e= | 0.2 | $\alpha =$ | 0.06 | $\rho =$ | 4.24292 |
| $\varepsilon =$ | 15 | e= | 0.2 | $\alpha =$ | 0.065 | $\rho =$ | 4.24201 |
| $\varepsilon =$ | 15 | e= | 0.2 | $\alpha =$ | 0.07 | $\rho =$ | 4.2411 |
| $\varepsilon =$ | 15 | e= | 0.2 | $\alpha =$ | 0.075 | $\rho =$ | 4.24018 |
| $\varepsilon =$ | 15 | e= | 0.2 | $\alpha =$ | 0.08 | $\rho =$ | 4.23927 |
| $\varepsilon =$ | 15 | e= | 0.2 | $\alpha =$ | 0.085 | $\rho =$ | 4.23835 |
| $\varepsilon =$ | 15 | e= | 0.2 | $\alpha =$ | 0.09 | $\rho =$ | 4.23744 |
| $\varepsilon =$ | 15 | e= | 0.2 | $\alpha =$ | 0.095 | $\rho =$ | 4.23652 |
| $\varepsilon =$ | 15 | e= | 0.2 | $\alpha =$ | 0.1 | $\rho =$ | 4.2356 |
| $\varepsilon =$ | 15 | e= | 0.25 | $\alpha =$ | 0.005 | $\rho =$ | 4.172 |
| $\varepsilon =$ | 15 | e= | 0.25 | $\alpha =$ | 0.01 | $\rho =$ | 4.17121 |
| $\varepsilon =$ | 15 | e= | 0.25 | $\alpha =$ | 0.015 | $\rho =$ | 4.17042 |
| $\varepsilon =$ | 15 | e= | 0.25 | $\alpha =$ | 0.02 | $\rho =$ | 4.16963 |
| $\varepsilon =$ | 15 | e= | 0.25 | $\alpha =$ | 0.025 | $\rho =$ | 4.16885 |
| $\varepsilon =$ | 15 | e= | 0.25 | $\alpha =$ | 0.03 | $\rho =$ | 4.16806 |
| $\varepsilon =$ | 15 | e= | 0.25 | $\alpha =$ | 0.035 | $\rho =$ | 4.16727 |
| $\varepsilon =$ | 15 | e= | 0.25 | $\alpha =$ | 0.04 | $\rho =$ | 4.16647 |
| $\varepsilon =$ | 15 | e= | 0.25 | $\alpha =$ | 0.045 | $\rho =$ | 4.16568 |
| $\varepsilon =$ | 15 | e= | 0.25 | $\alpha =$ | 0.05 | $\rho =$ | 4.16489 |
| $\varepsilon =$ | 15 | e= | 0.25 | $\alpha =$ | 0.055 | $\rho =$ | 4.1641 |
| $\varepsilon =$ | 15 | e= | 0.25 | $\alpha =$ | 0.06 | $\rho =$ | 4.1633 |
| $\varepsilon =$ | 15 | e= | 0.25 | $\alpha =$ | 0.065 | $\rho =$ | 4.16251 |
| $\varepsilon =$ | 15 | e= | 0.25 | $\alpha =$ | 0.07 | $\rho =$ | 4.16172 |
| $\varepsilon =$ | 15 | e= | 0.25 | $\alpha =$ | 0.075 | $\rho =$ | 4.16092 |
| $\varepsilon =$ | 15 | e= | 0.25 | $\alpha =$ | 0.08 | $\rho =$ | 4.16012 |
| $\varepsilon =$ | 15 | e= | 0.25 | $\alpha =$ | 0.085 | $\rho =$ | 4.15933 |
| $\varepsilon =$ | 15 | e= | 0.25 | $\alpha =$ | 0.09 | $\rho =$ | 4.15853 |
| $\varepsilon =$ | 15 | e= | 0.25 | $\alpha =$ | 0.095 | $\rho =$ | 4.15773 |
| $\varepsilon =$ | 15 | e= | 0.25 | $\alpha =$ | 0.1 | $\rho =$ | 4.15693 |
| $\varepsilon =$ | 15 | e= | 0.3 | $\alpha =$ | 0.005 | $\rho =$ | 4.11386 |
| $\varepsilon =$ | 15 | e= | 0.3 | $\alpha =$ | 0.01 | $\rho =$ | 4.11316 |
| $\varepsilon =$ | 15 | e= | 0.3 | $\alpha =$ | 0.015 | $\rho =$ | 4.11246 |
| $\varepsilon =$ | 15 | e= | 0.3 | $\alpha =$ | 0.02 | $\rho =$ | 4.11176 |
| $\varepsilon =$ | 15 | e= | 0.3 | $\alpha =$ | 0.025 | $\rho =$ | 4.11106 |
| $\varepsilon =$ | 15 | e= | 0.3 | $\alpha =$ | 0.03 | $\rho =$ | 4.11036 |
| $\varepsilon =$ | 15 | e= | 0.3 | $\alpha =$ | 0.035 | $\rho =$ | 4.10966 |
| $\varepsilon =$ | 15 | e= | 0.3 | $\alpha =$ | 0.04 | $\rho =$ | 4.10895 |
| $\varepsilon =$ | 15 | e= | 0.3 | $\alpha =$ | 0.045 | $\rho =$ | 4.10825 |
| $\varepsilon =$ | 15 | e= | 0.3 | $\alpha =$ | 0.05 | $\rho =$ | 4.10755 |
| $\varepsilon =$ | 15 | e= | 0.3 | $\alpha =$ | 0.055 | $\rho =$ | 4.10684 |
| $\varepsilon =$ | 15 | e= | 0.3 | $\alpha =$ | 0.06 | $\rho =$ | 4.10614 |
| $\varepsilon =$ | 15 | e= | 0.3 | $\alpha =$ | 0.065 | $\rho =$ | 4.10543 |
| $\varepsilon =$ | 15 | e= | 0.3 | $\alpha =$ | 0.07 | $\rho =$ | 4.10473 |
| $\varepsilon =$ | 15 | e= | 0.3 | $\alpha =$ | 0.075 | $\rho =$ | 4.10402 |
| $\varepsilon =$ | 15 | e= | 0.3 | $\alpha =$ | 0.08 | $\rho =$ | 4.10332 |
| $\varepsilon =$ | 15 | e= | 0.3 | $\alpha =$ | 0.085 | $\rho =$ | 4.10261 |
| $\varepsilon =$ | 15 | e= | 0.3 | $\alpha =$ | 0.09 | $\rho =$ | 4.1019 |

FIG. 5M

| | | | | | | | |
|---|---|---|---|---|---|---|---|
| $\varepsilon =$ | 15 | e= | 0.3 | $\alpha =$ | 0.095 | $\rho =$ | 4.10119 |
| $\varepsilon =$ | 15 | e= | 0.3 | $\alpha =$ | 0.1 | $\rho =$ | 4.10048 |
| $\varepsilon =$ | 15 | e= | 0.35 | $\alpha =$ | 0.005 | $\rho =$ | 4.0699 |
| $\varepsilon =$ | 15 | e= | 0.35 | $\alpha =$ | 0.01 | $\rho =$ | 4.06927 |
| $\varepsilon =$ | 15 | e= | 0.35 | $\alpha =$ | 0.015 | $\rho =$ | 4.06864 |
| $\varepsilon =$ | 15 | e= | 0.35 | $\alpha =$ | 0.02 | $\rho =$ | 4.06801 |
| $\varepsilon =$ | 15 | e= | 0.35 | $\alpha =$ | 0.025 | $\rho =$ | 4.06738 |
| $\varepsilon =$ | 15 | e= | 0.35 | $\alpha =$ | 0.03 | $\rho =$ | 4.06674 |
| $\varepsilon =$ | 15 | e= | 0.35 | $\alpha =$ | 0.035 | $\rho =$ | 4.06611 |
| $\varepsilon =$ | 15 | e= | 0.35 | $\alpha =$ | 0.04 | $\rho =$ | 4.06548 |
| $\varepsilon =$ | 15 | e= | 0.35 | $\alpha =$ | 0.045 | $\rho =$ | 4.06485 |
| $\varepsilon =$ | 15 | e= | 0.35 | $\alpha =$ | 0.05 | $\rho =$ | 4.06421 |
| $\varepsilon =$ | 15 | e= | 0.35 | $\alpha =$ | 0.055 | $\rho =$ | 4.06358 |
| $\varepsilon =$ | 15 | e= | 0.35 | $\alpha =$ | 0.06 | $\rho =$ | 4.06295 |
| $\varepsilon =$ | 15 | e= | 0.35 | $\alpha =$ | 0.065 | $\rho =$ | 4.06231 |
| $\varepsilon =$ | 15 | e= | 0.35 | $\alpha =$ | 0.07 | $\rho =$ | 4.06168 |
| $\varepsilon =$ | 15 | e= | 0.35 | $\alpha =$ | 0.075 | $\rho =$ | 4.06104 |
| $\varepsilon =$ | 15 | e= | 0.35 | $\alpha =$ | 0.08 | $\rho =$ | 4.06041 |
| $\varepsilon =$ | 15 | e= | 0.35 | $\alpha =$ | 0.085 | $\rho =$ | 4.05977 |
| $\varepsilon =$ | 15 | e= | 0.35 | $\alpha =$ | 0.09 | $\rho =$ | 4.05913 |
| $\varepsilon =$ | 15 | e= | 0.35 | $\alpha =$ | 0.095 | $\rho =$ | 4.0585 |
| $\varepsilon =$ | 15 | e= | 0.35 | $\alpha =$ | 0.1 | $\rho =$ | 4.05786 |
| $\varepsilon =$ | 15 | e= | 0.4 | $\alpha =$ | 0.005 | $\rho =$ | 4.03542 |
| $\varepsilon =$ | 15 | e= | 0.4 | $\alpha =$ | 0.01 | $\rho =$ | 4.03484 |
| $\varepsilon =$ | 15 | e= | 0.4 | $\alpha =$ | 0.015 | $\rho =$ | 4.03427 |
| $\varepsilon =$ | 15 | e= | 0.4 | $\alpha =$ | 0.02 | $\rho =$ | 4.03369 |
| $\varepsilon =$ | 15 | e= | 0.4 | $\alpha =$ | 0.025 | $\rho =$ | 4.03312 |
| $\varepsilon =$ | 15 | e= | 0.4 | $\alpha =$ | 0.03 | $\rho =$ | 4.03255 |
| $\varepsilon =$ | 15 | e= | 0.4 | $\alpha =$ | 0.035 | $\rho =$ | 4.03197 |
| $\varepsilon =$ | 15 | e= | 0.4 | $\alpha =$ | 0.04 | $\rho =$ | 4.03139 |
| $\varepsilon =$ | 15 | e= | 0.4 | $\alpha =$ | 0.045 | $\rho =$ | 4.03082 |
| $\varepsilon =$ | 15 | e= | 0.4 | $\alpha =$ | 0.05 | $\rho =$ | 4.03024 |
| $\varepsilon =$ | 15 | e= | 0.4 | $\alpha =$ | 0.055 | $\rho =$ | 4.02967 |
| $\varepsilon =$ | 15 | e= | 0.4 | $\alpha =$ | 0.06 | $\rho =$ | 4.02909 |
| $\varepsilon =$ | 15 | e= | 0.4 | $\alpha =$ | 0.065 | $\rho =$ | 4.02851 |
| $\varepsilon =$ | 15 | e= | 0.4 | $\alpha =$ | 0.07 | $\rho =$ | 4.02793 |
| $\varepsilon =$ | 15 | e= | 0.4 | $\alpha =$ | 0.075 | $\rho =$ | 4.02736 |
| $\varepsilon =$ | 15 | e= | 0.4 | $\alpha =$ | 0.08 | $\rho =$ | 4.02678 |
| $\varepsilon =$ | 15 | e= | 0.4 | $\alpha =$ | 0.085 | $\rho =$ | 4.0262 |
| $\varepsilon =$ | 15 | e= | 0.4 | $\alpha =$ | 0.09 | $\rho =$ | 4.02562 |
| $\varepsilon =$ | 15 | e= | 0.4 | $\alpha =$ | 0.095 | $\rho =$ | 4.02504 |
| $\varepsilon =$ | 15 | e= | 0.4 | $\alpha =$ | 0.1 | $\rho =$ | 4.02446 |
| $\varepsilon =$ | 15 | e= | 0.45 | $\alpha =$ | 0.005 | $\rho =$ | 4.0076 |
| $\varepsilon =$ | 15 | e= | 0.45 | $\alpha =$ | 0.01 | $\rho =$ | 4.00708 |
| $\varepsilon =$ | 15 | e= | 0.45 | $\alpha =$ | 0.015 | $\rho =$ | 4.00655 |
| $\varepsilon =$ | 15 | e= | 0.45 | $\alpha =$ | 0.02 | $\rho =$ | 4.00602 |
| $\varepsilon =$ | 15 | e= | 0.45 | $\alpha =$ | 0.025 | $\rho =$ | 4.0055 |
| $\varepsilon =$ | 15 | e= | 0.45 | $\alpha =$ | 0.03 | $\rho =$ | 4.00497 |
| $\varepsilon =$ | 15 | e= | 0.45 | $\alpha =$ | 0.035 | $\rho =$ | 4.00444 |
| $\varepsilon =$ | 15 | e= | 0.45 | $\alpha =$ | 0.04 | $\rho =$ | 4.00391 |
| $\varepsilon =$ | 15 | e= | 0.45 | $\alpha =$ | 0.045 | $\rho =$ | 4.00338 |
| $\varepsilon =$ | 15 | e= | 0.45 | $\alpha =$ | 0.05 | $\rho =$ | 4.00285 |
| $\varepsilon =$ | 15 | e= | 0.45 | $\alpha =$ | 0.055 | $\rho =$ | 4.00233 |
| $\varepsilon =$ | 15 | e= | 0.45 | $\alpha =$ | 0.06 | $\rho =$ | 4.0018 |
| $\varepsilon =$ | 15 | e= | 0.45 | $\alpha =$ | 0.065 | $\rho =$ | 4.00127 |

FIG. 5N

| | | | | | | | |
|---|---|---|---|---|---|---|---|
| $\varepsilon =$ | 15 | e= | 0.45 | $\alpha =$ | 0.07 | $\rho =$ | 4.00073 |
| $\varepsilon =$ | 15 | e= | 0.45 | $\alpha =$ | 0.075 | $\rho =$ | 4.0002 |
| $\varepsilon =$ | 15 | e= | 0.45 | $\alpha =$ | 0.08 | $\rho =$ | 3.99967 |
| $\varepsilon =$ | 15 | e= | 0.45 | $\alpha =$ | 0.085 | $\rho =$ | 3.99914 |
| $\varepsilon =$ | 15 | e= | 0.45 | $\alpha =$ | 0.09 | $\rho =$ | 3.99861 |
| $\varepsilon =$ | 15 | e= | 0.45 | $\alpha =$ | 0.095 | $\rho =$ | 3.99808 |
| $\varepsilon =$ | 15 | e= | 0.45 | $\alpha =$ | 0.1 | $\rho =$ | 3.99755 |
| $\varepsilon =$ | 15 | e= | 0.5 | $\alpha =$ | 0.005 | $\rho =$ | 3.98468 |
| $\varepsilon =$ | 15 | e= | 0.5 | $\alpha =$ | 0.01 | $\rho =$ | 3.98419 |
| $\varepsilon =$ | 15 | e= | 0.5 | $\alpha =$ | 0.015 | $\rho =$ | 3.9837 |
| $\varepsilon =$ | 15 | e= | 0.5 | $\alpha =$ | 0.02 | $\rho =$ | 3.98322 |
| $\varepsilon =$ | 15 | e= | 0.5 | $\alpha =$ | 0.025 | $\rho =$ | 3.98273 |
| $\varepsilon =$ | 15 | e= | 0.5 | $\alpha =$ | 0.03 | $\rho =$ | 3.98224 |
| $\varepsilon =$ | 15 | e= | 0.5 | $\alpha =$ | 0.035 | $\rho =$ | 3.98175 |
| $\varepsilon =$ | 15 | e= | 0.5 | $\alpha =$ | 0.04 | $\rho =$ | 3.98126 |
| $\varepsilon =$ | 15 | e= | 0.5 | $\alpha =$ | 0.045 | $\rho =$ | 3.98077 |
| $\varepsilon =$ | 15 | e= | 0.5 | $\alpha =$ | 0.05 | $\rho =$ | 3.98028 |
| $\varepsilon =$ | 15 | e= | 0.5 | $\alpha =$ | 0.055 | $\rho =$ | 3.97979 |
| $\varepsilon =$ | 15 | e= | 0.5 | $\alpha =$ | 0.06 | $\rho =$ | 3.9793 |
| $\varepsilon =$ | 15 | e= | 0.5 | $\alpha =$ | 0.065 | $\rho =$ | 3.97881 |
| $\varepsilon =$ | 15 | e= | 0.5 | $\alpha =$ | 0.07 | $\rho =$ | 3.97832 |
| $\varepsilon =$ | 15 | e= | 0.5 | $\alpha =$ | 0.075 | $\rho =$ | 3.97783 |
| $\varepsilon =$ | 15 | e= | 0.5 | $\alpha =$ | 0.08 | $\rho =$ | 3.97734 |
| $\varepsilon =$ | 15 | e= | 0.5 | $\alpha =$ | 0.085 | $\rho =$ | 3.97685 |
| $\varepsilon =$ | 15 | e= | 0.5 | $\alpha =$ | 0.09 | $\rho =$ | 3.97636 |
| $\varepsilon =$ | 15 | e= | 0.5 | $\alpha =$ | 0.095 | $\rho =$ | 3.97587 |
| $\varepsilon =$ | 15 | e= | 0.5 | $\alpha =$ | 0.1 | $\rho =$ | 3.97538 |
| $\varepsilon =$ | 20 | e= | 0.05 | $\alpha =$ | 0.005 | $\rho =$ | 5.60802 |
| $\varepsilon =$ | 20 | e= | 0.05 | $\alpha =$ | 0.01 | $\rho =$ | 5.60615 |
| $\varepsilon =$ | 20 | e= | 0.05 | $\alpha =$ | 0.015 | $\rho =$ | 5.60428 |
| $\varepsilon =$ | 20 | e= | 0.05 | $\alpha =$ | 0.02 | $\rho =$ | 5.6024 |
| $\varepsilon =$ | 20 | e= | 0.05 | $\alpha =$ | 0.025 | $\rho =$ | 5.60052 |
| $\varepsilon =$ | 20 | e= | 0.05 | $\alpha =$ | 0.03 | $\rho =$ | 5.59864 |
| $\varepsilon =$ | 20 | e= | 0.05 | $\alpha =$ | 0.035 | $\rho =$ | 5.59676 |
| $\varepsilon =$ | 20 | e= | 0.05 | $\alpha =$ | 0.04 | $\rho =$ | 5.59487 |
| $\varepsilon =$ | 20 | e= | 0.05 | $\alpha =$ | 0.045 | $\rho =$ | 5.59298 |
| $\varepsilon =$ | 20 | e= | 0.05 | $\alpha =$ | 0.05 | $\rho =$ | 5.59109 |
| $\varepsilon =$ | 20 | e= | 0.05 | $\alpha =$ | 0.055 | $\rho =$ | 5.5892 |
| $\varepsilon =$ | 20 | e= | 0.05 | $\alpha =$ | 0.06 | $\rho =$ | 5.5873 |
| $\varepsilon =$ | 20 | e= | 0.05 | $\alpha =$ | 0.065 | $\rho =$ | 5.5854 |
| $\varepsilon =$ | 20 | e= | 0.05 | $\alpha =$ | 0.07 | $\rho =$ | 5.5835 |
| $\varepsilon =$ | 20 | e= | 0.05 | $\alpha =$ | 0.075 | $\rho =$ | 5.58159 |
| $\varepsilon =$ | 20 | e= | 0.05 | $\alpha =$ | 0.08 | $\rho =$ | 5.57969 |
| $\varepsilon =$ | 20 | e= | 0.05 | $\alpha =$ | 0.085 | $\rho =$ | 5.77778 |
| $\varepsilon =$ | 20 | e= | 0.05 | $\alpha =$ | 0.09 | $\rho =$ | 5.57587 |
| $\varepsilon =$ | 20 | e= | 0.05 | $\alpha =$ | 0.095 | $\rho =$ | 5.57395 |
| $\varepsilon =$ | 20 | e= | 0.05 | $\alpha =$ | 0.1 | $\rho =$ | 5.57203 |
| $\varepsilon =$ | 20 | e= | 0.1 | $\alpha =$ | 0.005 | $\rho =$ | 5.1428 |
| $\varepsilon =$ | 20 | e= | 0.1 | $\alpha =$ | 0.01 | $\rho =$ | 5.14147 |
| $\varepsilon =$ | 20 | e= | 0.1 | $\alpha =$ | 0.015 | $\rho =$ | 5.14014 |
| $\varepsilon =$ | 20 | e= | 0.1 | $\alpha =$ | 0.02 | $\rho =$ | 5.1388 |
| $\varepsilon =$ | 20 | e= | 0.1 | $\alpha =$ | 0.025 | $\rho =$ | 5.13747 |
| $\varepsilon =$ | 20 | e= | 0.1 | $\alpha =$ | 0.03 | $\rho =$ | 5.13613 |
| $\varepsilon =$ | 20 | e= | 0.1 | $\alpha =$ | 0.035 | $\rho =$ | 5.1348 |
| $\varepsilon =$ | 20 | e= | 0.1 | $\alpha =$ | 0.04 | $\rho =$ | 5.13346 |

FIG. 50

| | | | | | | | |
|---|---|---|---|---|---|---|---|
| $\varepsilon =$ | 20 | e= | 0.1 | $\alpha =$ | 0.045 | $p =$ | 5.13212 |
| $\varepsilon =$ | 20 | e= | 0.1 | $\alpha =$ | 0.05 | $p =$ | 5.13077 |
| $\varepsilon =$ | 20 | e= | 0.1 | $\alpha =$ | 0.055 | $p =$ | 5.12943 |
| $\varepsilon =$ | 20 | e= | 0.1 | $\alpha =$ | 0.06 | $p =$ | 5.12808 |
| $\varepsilon =$ | 20 | e= | 0.1 | $\alpha =$ | 0.065 | $p =$ | 5.12674 |
| $\varepsilon =$ | 20 | e= | 0.1 | $\alpha =$ | 0.07 | $p =$ | 5.12539 |
| $\varepsilon =$ | 20 | e= | 0.1 | $\alpha =$ | 0.075 | $p =$ | 5.12404 |
| $\varepsilon =$ | 20 | e= | 0.1 | $\alpha =$ | 0.08 | $p =$ | 5.12269 |
| $\varepsilon =$ | 20 | e= | 0.1 | $\alpha =$ | 0.085 | $p =$ | 5.12133 |
| $\varepsilon =$ | 20 | e= | 0.1 | $\alpha =$ | 0.09 | $p =$ | 5.11998 |
| $\varepsilon =$ | 20 | e= | 0.1 | $\alpha =$ | 0.095 | $p =$ | 5.11862 |
| $\varepsilon =$ | 20 | e= | 0.1 | $\alpha =$ | 0.1 | $p =$ | 5.11727 |
| $\varepsilon =$ | 20 | e= | 0.15 | $\alpha =$ | 0.005 | $p =$ | 4.93966 |
| $\varepsilon =$ | 20 | e= | 0.15 | $\alpha =$ | 0.01 | $p =$ | 4.9386 |
| $\varepsilon =$ | 20 | e= | 0.15 | $\alpha =$ | 0.015 | $p =$ | 4.93755 |
| $\varepsilon =$ | 20 | e= | 0.15 | $\alpha =$ | 0.02 | $p =$ | 4.93649 |
| $\varepsilon =$ | 20 | e= | 0.15 | $\alpha =$ | 0.025 | $p =$ | 4.93543 |
| $\varepsilon =$ | 20 | e= | 0.15 | $\alpha =$ | 0.03 | $p =$ | 4.93437 |
| $\varepsilon =$ | 20 | e= | 0.15 | $\alpha =$ | 0.035 | $p =$ | 4.93331 |
| $\varepsilon =$ | 20 | e= | 0.15 | $\alpha =$ | 0.04 | $p =$ | 4.93225 |
| $\varepsilon =$ | 20 | e= | 0.15 | $\alpha =$ | 0.045 | $p =$ | 4.93119 |
| $\varepsilon =$ | 20 | e= | 0.15 | $\alpha =$ | 0.05 | $p =$ | 4.93013 |
| $\varepsilon =$ | 20 | e= | 0.15 | $\alpha =$ | 0.055 | $p =$ | 4.92907 |
| $\varepsilon =$ | 20 | e= | 0.15 | $\alpha =$ | 0.06 | $p =$ | 4.928 |
| $\varepsilon =$ | 20 | e= | 0.15 | $\alpha =$ | 0.065 | $p =$ | 4.92693 |
| $\varepsilon =$ | 20 | e= | 0.15 | $\alpha =$ | 0.07 | $p =$ | 4.92587 |
| $\varepsilon =$ | 20 | e= | 0.15 | $\alpha =$ | 0.075 | $p =$ | 4.9248 |
| $\varepsilon =$ | 20 | e= | 0.15 | $\alpha =$ | 0.08 | $p =$ | 4.92373 |
| $\varepsilon =$ | 20 | e= | 0.15 | $\alpha =$ | 0.085 | $p =$ | 4.92266 |
| $\varepsilon =$ | 20 | e= | 0.15 | $\alpha =$ | 0.09 | $p =$ | 4.92159 |
| $\varepsilon =$ | 20 | e= | 0.15 | $\alpha =$ | 0.095 | $p =$ | 4.92052 |
| $\varepsilon =$ | 20 | e= | 0.15 | $\alpha =$ | 0.1 | $p =$ | 4.91944 |
| $\varepsilon =$ | 20 | e= | 0.2 | $\alpha =$ | 0.005 | $p =$ | 4.82266 |
| $\varepsilon =$ | 20 | e= | 0.2 | $\alpha =$ | 0.01 | $p =$ | 4.82178 |
| $\varepsilon =$ | 20 | e= | 0.2 | $\alpha =$ | 0.015 | $p =$ | 4.8209 |
| $\varepsilon =$ | 20 | e= | 0.2 | $\alpha =$ | 0.02 | $p =$ | 4.82001 |
| $\varepsilon =$ | 20 | e= | 0.2 | $\alpha =$ | 0.025 | $p =$ | 4.81913 |
| $\varepsilon =$ | 20 | e= | 0.2 | $\alpha =$ | 0.03 | $p =$ | 4.81825 |
| $\varepsilon =$ | 20 | e= | 0.2 | $\alpha =$ | 0.035 | $p =$ | 4.81737 |
| $\varepsilon =$ | 20 | e= | 0.2 | $\alpha =$ | 0.04 | $p =$ | 4.81648 |
| $\varepsilon =$ | 20 | e= | 0.2 | $\alpha =$ | 0.045 | $p =$ | 4.8156 |
| $\varepsilon =$ | 20 | e= | 0.2 | $\alpha =$ | 0.05 | $p =$ | 4.81471 |
| $\varepsilon =$ | 20 | e= | 0.2 | $\alpha =$ | 0.055 | $p =$ | 4.81382 |
| $\varepsilon =$ | 20 | e= | 0.2 | $\alpha =$ | 0.06 | $p =$ | 4.81294 |
| $\varepsilon =$ | 20 | e= | 0.2 | $\alpha =$ | 0.065 | $p =$ | 4.81205 |
| $\varepsilon =$ | 20 | e= | 0.2 | $\alpha =$ | 0.07 | $p =$ | 4.81116 |
| $\varepsilon =$ | 20 | e= | 0.2 | $\alpha =$ | 0.075 | $p =$ | 4.81027 |
| $\varepsilon =$ | 20 | e= | 0.2 | $\alpha =$ | 0.08 | $p =$ | 4.80938 |
| $\varepsilon =$ | 20 | e= | 0.2 | $\alpha =$ | 0.085 | $p =$ | 4.80849 |
| $\varepsilon =$ | 20 | e= | 0.2 | $\alpha =$ | 0.09 | $p =$ | 4.8076 |
| $\varepsilon =$ | 20 | e= | 0.2 | $\alpha =$ | 0.095 | $p =$ | 4.8067 |
| $\varepsilon =$ | 20 | e= | 0.2 | $\alpha =$ | 0.1 | $p =$ | 4.80581 |
| $\varepsilon =$ | 20 | e= | 0.25 | $\alpha =$ | 0.005 | $p =$ | 4.74582 |
| $\varepsilon =$ | 20 | e= | 0.25 | $\alpha =$ | 0.01 | $p =$ | 4.74506 |
| $\varepsilon =$ | 20 | e= | 0.25 | $\alpha =$ | 0.015 | $p =$ | 4.7443 |

FIG. 5P

| | | | | | | | |
|---|---|---|---|---|---|---|---|
| $\varepsilon =$ | 20 | e= | 0.25 | $\alpha =$ | 0.02 | $\rho =$ | 4.74354 |
| $\varepsilon =$ | 20 | e= | 0.25 | $\alpha =$ | 0.025 | $\rho =$ | 4.74278 |
| $\varepsilon =$ | 20 | e= | 0.25 | $\alpha =$ | 0.03 | $\rho =$ | 4.74202 |
| $\varepsilon =$ | 20 | e= | 0.25 | $\alpha =$ | 0.035 | $\rho =$ | 4.74126 |
| $\varepsilon =$ | 20 | e= | 0.25 | $\alpha =$ | 0.04 | $\rho =$ | 4.7405 |
| $\varepsilon =$ | 20 | e= | 0.25 | $\alpha =$ | 0.045 | $\rho =$ | 4.73974 |
| $\varepsilon =$ | 20 | e= | 0.25 | $\alpha =$ | 0.05 | $\rho =$ | 4.73898 |
| $\varepsilon =$ | 20 | e= | 0.25 | $\alpha =$ | 0.055 | $\rho =$ | 4.73822 |
| $\varepsilon =$ | 20 | e= | 0.25 | $\alpha =$ | 0.06 | $\rho =$ | 4.73745 |
| $\varepsilon =$ | 20 | e= | 0.25 | $\alpha =$ | 0.065 | $\rho =$ | 4.73669 |
| $\varepsilon =$ | 20 | e= | 0.25 | $\alpha =$ | 0.07 | $\rho =$ | 4.73593 |
| $\varepsilon =$ | 20 | e= | 0.25 | $\alpha =$ | 0.075 | $\rho =$ | 4.73516 |
| $\varepsilon =$ | 20 | e= | 0.25 | $\alpha =$ | 0.08 | $\rho =$ | 4.7344 |
| $\varepsilon =$ | 20 | e= | 0.25 | $\alpha =$ | 0.085 | $\rho =$ | 4.73363 |
| $\varepsilon =$ | 20 | e= | 0.25 | $\alpha =$ | 0.09 | $\rho =$ | 4.73286 |
| $\varepsilon =$ | 20 | e= | 0.25 | $\alpha =$ | 0.095 | $\rho =$ | 4.7321 |
| $\varepsilon =$ | 20 | e= | 0.25 | $\alpha =$ | 0.1 | $\rho =$ | 4.73133 |
| $\varepsilon =$ | 20 | e= | 0.3 | $\alpha =$ | 0.005 | $\rho =$ | 4.69123 |
| $\varepsilon =$ | 20 | e= | 0.3 | $\alpha =$ | 0.01 | $\rho =$ | 4.69056 |
| $\varepsilon =$ | 20 | e= | 0.3 | $\alpha =$ | 0.015 | $\rho =$ | 4.6899 |
| $\varepsilon =$ | 20 | e= | 0.3 | $\alpha =$ | 0.02 | $\rho =$ | 4.68923 |
| $\varepsilon =$ | 20 | e= | 0.3 | $\alpha =$ | 0.025 | $\rho =$ | 4.68856 |
| $\varepsilon =$ | 20 | e= | 0.3 | $\alpha =$ | 0.03 | $\rho =$ | 4.6879 |
| $\varepsilon =$ | 20 | e= | 0.3 | $\alpha =$ | 0.035 | $\rho =$ | 4.68723 |
| $\varepsilon =$ | 20 | e= | 0.3 | $\alpha =$ | 0.04 | $\rho =$ | 4.68656 |
| $\varepsilon =$ | 20 | e= | 0.3 | $\alpha =$ | 0.045 | $\rho =$ | 4.68589 |
| $\varepsilon =$ | 20 | e= | 0.3 | $\alpha =$ | 0.05 | $\rho =$ | 4.68522 |
| $\varepsilon =$ | 20 | e= | 0.3 | $\alpha =$ | 0.055 | $\rho =$ | 4.68455 |
| $\varepsilon =$ | 20 | e= | 0.3 | $\alpha =$ | 0.06 | $\rho =$ | 4.68388 |
| $\varepsilon =$ | 20 | e= | 0.3 | $\alpha =$ | 0.065 | $\rho =$ | 4.68321 |
| $\varepsilon =$ | 20 | e= | 0.3 | $\alpha =$ | 0.07 | $\rho =$ | 4.68254 |
| $\varepsilon =$ | 20 | e= | 0.3 | $\alpha =$ | 0.075 | $\rho =$ | 4.68187 |
| $\varepsilon =$ | 20 | e= | 0.3 | $\alpha =$ | 0.08 | $\rho =$ | 4.68119 |
| $\varepsilon =$ | 20 | e= | 0.3 | $\alpha =$ | 0.085 | $\rho =$ | 4.68052 |
| $\varepsilon =$ | 20 | e= | 0.3 | $\alpha =$ | 0.09 | $\rho =$ | 4.67985 |
| $\varepsilon =$ | 20 | e= | 0.3 | $\alpha =$ | 0.095 | $\rho =$ | 4.67917 |
| $\varepsilon =$ | 20 | e= | 0.3 | $\alpha =$ | 0.1 | $\rho =$ | 4.6785 |
| $\varepsilon =$ | 20 | e= | 0.35 | $\alpha =$ | 0.005 | $\rho =$ | 4.65035 |
| $\varepsilon =$ | 20 | e= | 0.35 | $\alpha =$ | 0.01 | $\rho =$ | 4.64975 |
| $\varepsilon =$ | 20 | e= | 0.35 | $\alpha =$ | 0.015 | $\rho =$ | 4.64916 |
| $\varepsilon =$ | 20 | e= | 0.35 | $\alpha =$ | 0.02 | $\rho =$ | 4.64856 |
| $\varepsilon =$ | 20 | e= | 0.35 | $\alpha =$ | 0.025 | $\rho =$ | 4.64796 |
| $\varepsilon =$ | 20 | e= | 0.35 | $\alpha =$ | 0.03 | $\rho =$ | 4.64737 |
| $\varepsilon =$ | 20 | e= | 0.35 | $\alpha =$ | 0.035 | $\rho =$ | 4.64677 |
| $\varepsilon =$ | 20 | e= | 0.35 | $\alpha =$ | 0.04 | $\rho =$ | 4.64617 |
| $\varepsilon =$ | 20 | e= | 0.35 | $\alpha =$ | 0.045 | $\rho =$ | 4.64558 |
| $\varepsilon =$ | 20 | e= | 0.35 | $\alpha =$ | 0.05 | $\rho =$ | 4.64498 |
| $\varepsilon =$ | 20 | e= | 0.35 | $\alpha =$ | 0.055 | $\rho =$ | 4.64438 |
| $\varepsilon =$ | 20 | e= | 0.35 | $\alpha =$ | 0.06 | $\rho =$ | 4.64378 |
| $\varepsilon =$ | 20 | e= | 0.35 | $\alpha =$ | 0.065 | $\rho =$ | 4.64318 |
| $\varepsilon =$ | 20 | e= | 0.35 | $\alpha =$ | 0.07 | $\rho =$ | 4.64259 |
| $\varepsilon =$ | 20 | e= | 0.35 | $\alpha =$ | 0.075 | $\rho =$ | 4.64199 |
| $\varepsilon =$ | 20 | e= | 0.35 | $\alpha =$ | 0.08 | $\rho =$ | 4.64139 |
| $\varepsilon =$ | 20 | e= | 0.35 | $\alpha =$ | 0.085 | $\rho =$ | 4.64079 |
| $\varepsilon =$ | 20 | e= | 0.35 | $\alpha =$ | 0.09 | $\rho =$ | 4.64019 |

FIG. 5Q

| | | | | | | | |
|---|---|---|---|---|---|---|---|
| $\varepsilon =$ | 20 | e= | 0.35 | $\alpha =$ | 0.095 | $\rho =$ | 4.63958 |
| $\varepsilon =$ | 20 | e= | 0.35 | $\alpha =$ | 0.1 | $\rho =$ | 4.63898 |
| $\varepsilon =$ | 20 | e= | 0.4 | $\alpha =$ | 0.005 | $\rho =$ | 4.61853 |
| $\varepsilon =$ | 20 | e= | 0.4 | $\alpha =$ | 0.01 | $\rho =$ | 4.61799 |
| $\varepsilon =$ | 20 | e= | 0.4 | $\alpha =$ | 0.015 | $\rho =$ | 4.61745 |
| $\varepsilon =$ | 20 | e= | 0.4 | $\alpha =$ | 0.02 | $\rho =$ | 4.61692 |
| $\varepsilon =$ | 20 | e= | 0.4 | $\alpha =$ | 0.025 | $\rho =$ | 4.61638 |
| $\varepsilon =$ | 20 | e= | 0.4 | $\alpha =$ | 0.03 | $\rho =$ | 4.61584 |
| $\varepsilon =$ | 20 | e= | 0.4 | $\alpha =$ | 0.035 | $\rho =$ | 4.6153 |
| $\varepsilon =$ | 20 | e= | 0.4 | $\alpha =$ | 0.04 | $\rho =$ | 4.61476 |
| $\varepsilon =$ | 20 | e= | 0.4 | $\alpha =$ | 0.045 | $\rho =$ | 4.61422 |
| $\varepsilon =$ | 20 | e= | 0.4 | $\alpha =$ | 0.05 | $\rho =$ | 4.61368 |
| $\varepsilon =$ | 20 | e= | 0.4 | $\alpha =$ | 0.055 | $\rho =$ | 4.61314 |
| $\varepsilon =$ | 20 | e= | 0.4 | $\alpha =$ | 0.06 | $\rho =$ | 4.6126 |
| $\varepsilon =$ | 20 | e= | 0.4 | $\alpha =$ | 0.065 | $\rho =$ | 4.61206 |
| $\varepsilon =$ | 20 | e= | 0.4 | $\alpha =$ | 0.07 | $\rho =$ | 4.61152 |
| $\varepsilon =$ | 20 | e= | 0.4 | $\alpha =$ | 0.075 | $\rho =$ | 4.61098 |
| $\varepsilon =$ | 20 | e= | 0.4 | $\alpha =$ | 0.08 | $\rho =$ | 4.61043 |
| $\varepsilon =$ | 20 | e= | 0.4 | $\alpha =$ | 0.085 | $\rho =$ | 4.60989 |
| $\varepsilon =$ | 20 | e= | 0.4 | $\alpha =$ | 0.09 | $\rho =$ | 4.60935 |
| $\varepsilon =$ | 20 | e= | 0.4 | $\alpha =$ | 0.095 | $\rho =$ | 4.60881 |
| $\varepsilon =$ | 20 | e= | 0.4 | $\alpha =$ | 0.1 | $\rho =$ | 4.60826 |
| $\varepsilon =$ | 20 | e= | 0.45 | $\alpha =$ | 0.005 | $\rho =$ | 4.59304 |
| $\varepsilon =$ | 20 | e= | 0.45 | $\alpha =$ | 0.01 | $\rho =$ | 4.59255 |
| $\varepsilon =$ | 20 | e= | 0.45 | $\alpha =$ | 0.015 | $\rho =$ | 4.59206 |
| $\varepsilon =$ | 20 | e= | 0.45 | $\alpha =$ | 0.02 | $\rho =$ | 4.59157 |
| $\varepsilon =$ | 20 | e= | 0.45 | $\alpha =$ | 0.025 | $\rho =$ | 4.59108 |
| $\varepsilon =$ | 20 | e= | 0.45 | $\alpha =$ | 0.03 | $\rho =$ | 4.59059 |
| $\varepsilon =$ | 20 | e= | 0.45 | $\alpha =$ | 0.035 | $\rho =$ | 4.5901 |
| $\varepsilon =$ | 20 | e= | 0.45 | $\alpha =$ | 0.04 | $\rho =$ | 4.5896 |
| $\varepsilon =$ | 20 | e= | 0.45 | $\alpha =$ | 0.045 | $\rho =$ | 4.58911 |
| $\varepsilon =$ | 20 | e= | 0.45 | $\alpha =$ | 0.05 | $\rho =$ | 4.58862 |
| $\varepsilon =$ | 20 | e= | 0.45 | $\alpha =$ | 0.055 | $\rho =$ | 4.58813 |
| $\varepsilon =$ | 20 | e= | 0.45 | $\alpha =$ | 0.06 | $\rho =$ | 4.58763 |
| $\varepsilon =$ | 20 | e= | 0.45 | $\alpha =$ | 0.065 | $\rho =$ | 4.58714 |
| $\varepsilon =$ | 20 | e= | 0.45 | $\alpha =$ | 0.07 | $\rho =$ | 4.58664 |
| $\varepsilon =$ | 20 | e= | 0.45 | $\alpha =$ | 0.075 | $\rho =$ | 4.58615 |
| $\varepsilon =$ | 20 | e= | 0.45 | $\alpha =$ | 0.08 | $\rho =$ | 4.58566 |
| $\varepsilon =$ | 20 | e= | 0.45 | $\alpha =$ | 0.085 | $\rho =$ | 4.58516 |
| $\varepsilon =$ | 20 | e= | 0.45 | $\alpha =$ | 0.09 | $\rho =$ | 4.58467 |
| $\varepsilon =$ | 20 | e= | 0.45 | $\alpha =$ | 0.095 | $\rho =$ | 4.58417 |
| $\varepsilon =$ | 20 | e= | 0.45 | $\alpha =$ | 0.1 | $\rho =$ | 4.58368 |
| $\varepsilon =$ | 20 | e= | 0.5 | $\alpha =$ | 0.005 | $\rho =$ | 4.57215 |
| $\varepsilon =$ | 20 | e= | 0.5 | $\alpha =$ | 0.01 | $\rho =$ | 4.5717 |
| $\varepsilon =$ | 20 | e= | 0.5 | $\alpha =$ | 0.015 | $\rho =$ | 4.57125 |
| $\varepsilon =$ | 20 | e= | 0.5 | $\alpha =$ | 0.02 | $\rho =$ | 4.5708 |
| $\varepsilon =$ | 20 | e= | 0.5 | $\alpha =$ | 0.025 | $\rho =$ | 4.57035 |
| $\varepsilon =$ | 20 | e= | 0.5 | $\alpha =$ | 0.03 | $\rho =$ | 4.56989 |
| $\varepsilon =$ | 20 | e= | 0.5 | $\alpha =$ | 0.035 | $\rho =$ | 4.56944 |
| $\varepsilon =$ | 20 | e= | 0.5 | $\alpha =$ | 0.04 | $\rho =$ | 4.56899 |
| $\varepsilon =$ | 20 | e= | 0.5 | $\alpha =$ | 0.045 | $\rho =$ | 4.56854 |
| $\varepsilon =$ | 20 | e= | 0.5 | $\alpha =$ | 0.05 | $\rho =$ | 4.56808 |
| $\varepsilon =$ | 20 | e= | 0.5 | $\alpha =$ | 0.055 | $\rho =$ | 4.56763 |
| $\varepsilon =$ | 20 | e= | 0.5 | $\alpha =$ | 0.06 | $\rho =$ | 4.56718 |
| $\varepsilon =$ | 20 | e= | 0.5 | $\alpha =$ | 0.065 | $\rho =$ | 4.56672 |

FIG. 5R

| | | | | | | | | | |
|---|---|---|---|---|---|---|---|---|---|
| $\varepsilon =$ | 20 | $e=$ | 0.5 | $\alpha =$ | 0.07 | $\rho =$ | 4.56627 |
| $\varepsilon =$ | 20 | $e=$ | 0.5 | $\alpha =$ | 0.075 | $\rho =$ | 4.56581 |
| $\varepsilon =$ | 20 | $e=$ | 0.5 | $\alpha =$ | 0.08 | $\rho =$ | 4.56536 |
| $\varepsilon =$ | 20 | $e=$ | 0.5 | $\alpha =$ | 0.085 | $\rho =$ | 4.56491 |
| $\varepsilon =$ | 20 | $e=$ | 0.5 | $\alpha =$ | 0.09 | $\rho =$ | 4.56445 |
| $\varepsilon =$ | 20 | $e=$ | 0.5 | $\alpha =$ | 0.095 | $\rho =$ | 4.564 |
| $\varepsilon =$ | 20 | $e=$ | 0.5 | $\alpha =$ | 0.1 | $\rho =$ | 4.56354 |
| $\varepsilon =$ | 25 | $e=$ | 0.05 | $\alpha =$ | 0.005 | $\rho =$ | 6.10086 |
| $\varepsilon =$ | 25 | $e=$ | 0.05 | $\alpha =$ | 0.01 | $\rho =$ | 6.09895 |
| $\varepsilon =$ | 25 | $e=$ | 0.05 | $\alpha =$ | 0.015 | $\rho =$ | 6.09704 |
| $\varepsilon =$ | 25 | $e=$ | 0.05 | $\alpha =$ | 0.02 | $\rho =$ | 6.09513 |
| $\varepsilon =$ | 25 | $e=$ | 0.05 | $\alpha =$ | 0.025 | $\rho =$ | 6.09321 |
| $\varepsilon =$ | 25 | $e=$ | 0.05 | $\alpha =$ | 0.03 | $\rho =$ | 6.09129 |
| $\varepsilon =$ | 25 | $e=$ | 0.05 | $\alpha =$ | 0.035 | $\rho =$ | 6.08937 |
| $\varepsilon =$ | 25 | $e=$ | 0.05 | $\alpha =$ | 0.04 | $\rho =$ | 6.08745 |
| $\varepsilon =$ | 25 | $e=$ | 0.05 | $\alpha =$ | 0.045 | $\rho =$ | 6.08553 |
| $\varepsilon =$ | 25 | $e=$ | 0.05 | $\alpha =$ | 0.05 | $\rho =$ | 6.0836 |
| $\varepsilon =$ | 25 | $e=$ | 0.05 | $\alpha =$ | 0.055 | $\rho =$ | 6.08167 |
| $\varepsilon =$ | 25 | $e=$ | 0.05 | $\alpha =$ | 0.06 | $\rho =$ | 6.07974 |
| $\varepsilon =$ | 25 | $e=$ | 0.05 | $\alpha =$ | 0.065 | $\rho =$ | 6.07781 |
| $\varepsilon =$ | 25 | $e=$ | 0.05 | $\alpha =$ | 0.07 | $\rho =$ | 6.07587 |
| $\varepsilon =$ | 25 | $e=$ | 0.05 | $\alpha =$ | 0.075 | $\rho =$ | 6.07393 |
| $\varepsilon =$ | 25 | $e=$ | 0.05 | $\alpha =$ | 0.08 | $\rho =$ | 6.07199 |
| $\varepsilon =$ | 25 | $e=$ | 0.05 | $\alpha =$ | 0.085 | $\rho =$ | 6.07004 |
| $\varepsilon =$ | 25 | $e=$ | 0.05 | $\alpha =$ | 0.09 | $\rho =$ | 6.0681 |
| $\varepsilon =$ | 25 | $e=$ | 0.05 | $\alpha =$ | 0.095 | $\rho =$ | 6.06615 |
| $\varepsilon =$ | 25 | $e=$ | 0.05 | $\alpha =$ | 0.1 | $\rho =$ | 6.0642 |
| $\varepsilon =$ | 25 | $e=$ | 0.1 | $\alpha =$ | 0.005 | $\rho =$ | 5.63728 |
| $\varepsilon =$ | 25 | $e=$ | 0.1 | $\alpha =$ | 0.01 | $\rho =$ | 5.63595 |
| $\varepsilon =$ | 25 | $e=$ | 0.1 | $\alpha =$ | 0.015 | $\rho =$ | 5.63463 |
| $\varepsilon =$ | 25 | $e=$ | 0.1 | $\alpha =$ | 0.02 | $\rho =$ | 5.6333 |
| $\varepsilon =$ | 25 | $e=$ | 0.1 | $\alpha =$ | 0.025 | $\rho =$ | 5.63197 |
| $\varepsilon =$ | 25 | $e=$ | 0.1 | $\alpha =$ | 0.03 | $\rho =$ | 5.63065 |
| $\varepsilon =$ | 25 | $e=$ | 0.1 | $\alpha =$ | 0.035 | $\rho =$ | 5.62932 |
| $\varepsilon =$ | 25 | $e=$ | 0.1 | $\alpha =$ | 0.04 | $\rho =$ | 5.62798 |
| $\varepsilon =$ | 25 | $e=$ | 0.1 | $\alpha =$ | 0.045 | $\rho =$ | 5.62665 |
| $\varepsilon =$ | 25 | $e=$ | 0.1 | $\alpha =$ | 0.05 | $\rho =$ | 5.62532 |
| $\varepsilon =$ | 25 | $e=$ | 0.1 | $\alpha =$ | 0.055 | $\rho =$ | 5.62398 |
| $\varepsilon =$ | 25 | $e=$ | 0.1 | $\alpha =$ | 0.06 | $\rho =$ | 5.62264 |
| $\varepsilon =$ | 25 | $e=$ | 0.1 | $\alpha =$ | 0.065 | $\rho =$ | 5.62131 |
| $\varepsilon =$ | 25 | $e=$ | 0.1 | $\alpha =$ | 0.07 | $\rho =$ | 5.61997 |
| $\varepsilon =$ | 25 | $e=$ | 0.1 | $\alpha =$ | 0.075 | $\rho =$ | 5.61863 |
| $\varepsilon =$ | 25 | $e=$ | 0.1 | $\alpha =$ | 0.08 | $\rho =$ | 5.61728 |
| $\varepsilon =$ | 25 | $e=$ | 0.1 | $\alpha =$ | 0.085 | $\rho =$ | 5.61594 |
| $\varepsilon =$ | 25 | $e=$ | 0.1 | $\alpha =$ | 0.09 | $\rho =$ | 5.61459 |
| $\varepsilon =$ | 25 | $e=$ | 0.1 | $\alpha =$ | 0.095 | $\rho =$ | 5.61325 |
| $\varepsilon =$ | 25 | $e=$ | 0.1 | $\alpha =$ | 0.1 | $\rho =$ | 5.6119 |
| $\varepsilon =$ | 25 | $e=$ | 0.15 | $\alpha =$ | 0.005 | $\rho =$ | 5.43913 |
| $\varepsilon =$ | 25 | $e=$ | 0.15 | $\alpha =$ | 0.01 | $\rho =$ | 5.4381 |
| $\varepsilon =$ | 25 | $e=$ | 0.15 | $\alpha =$ | 0.015 | $\rho =$ | 5.43706 |
| $\varepsilon =$ | 25 | $e=$ | 0.15 | $\alpha =$ | 0.02 | $\rho =$ | 5.43603 |
| $\varepsilon =$ | 25 | $e=$ | 0.15 | $\alpha =$ | 0.025 | $\rho =$ | 5.43499 |
| $\varepsilon =$ | 25 | $e=$ | 0.15 | $\alpha =$ | 0.03 | $\rho =$ | 5.43396 |
| $\varepsilon =$ | 25 | $e=$ | 0.15 | $\alpha =$ | 0.035 | $\rho =$ | 5.43292 |
| $\varepsilon =$ | 25 | $e=$ | 0.15 | $\alpha =$ | 0.04 | $\rho =$ | 5.43189 |

FIG. 5S

| | | | | | | | |
|---|---|---|---|---|---|---|---|
| $\varepsilon =$ | 25 | e= | 0.15 | $\alpha =$ | 0.045 | $\rho =$ | 5.43085 |
| $\varepsilon =$ | 25 | e= | 0.15 | $\alpha =$ | 0.05 | $\rho =$ | 5.42981 |
| $\varepsilon =$ | 25 | e= | 0.15 | $\alpha =$ | 0.055 | $\rho =$ | 5.42877 |
| $\varepsilon =$ | 25 | e= | 0.15 | $\alpha =$ | 0.06 | $\rho =$ | 5.42773 |
| $\varepsilon =$ | 25 | e= | 0.15 | $\alpha =$ | 0.065 | $\rho =$ | 5.42669 |
| $\varepsilon =$ | 25 | e= | 0.15 | $\alpha =$ | 0.07 | $\rho =$ | 5.42565 |
| $\varepsilon =$ | 25 | e= | 0.15 | $\alpha =$ | 0.075 | $\rho =$ | 5.4246 |
| $\varepsilon =$ | 25 | e= | 0.15 | $\alpha =$ | 0.08 | $\rho =$ | 5.42356 |
| $\varepsilon =$ | 25 | e= | 0.15 | $\alpha =$ | 0.085 | $\rho =$ | 5.42251 |
| $\varepsilon =$ | 25 | e= | 0.15 | $\alpha =$ | 0.09 | $\rho =$ | 5.42147 |
| $\varepsilon =$ | 25 | e= | 0.15 | $\alpha =$ | 0.095 | $\rho =$ | 5.42042 |
| $\varepsilon =$ | 25 | e= | 0.15 | $\alpha =$ | 0.1 | $\rho =$ | 5.41937 |
| $\varepsilon =$ | 25 | e= | 0.2 | $\alpha =$ | 0.005 | $\rho =$ | 5.32666 |
| $\varepsilon =$ | 25 | e= | 0.2 | $\alpha =$ | 0.01 | $\rho =$ | 5.32581 |
| $\varepsilon =$ | 25 | e= | 0.2 | $\alpha =$ | 0.015 | $\rho =$ | 5.32496 |
| $\varepsilon =$ | 25 | e= | 0.2 | $\alpha =$ | 0.02 | $\rho =$ | 5.32411 |
| $\varepsilon =$ | 25 | e= | 0.2 | $\alpha =$ | 0.025 | $\rho =$ | 5.32326 |
| $\varepsilon =$ | 25 | e= | 0.2 | $\alpha =$ | 0.03 | $\rho =$ | 5.3224 |
| $\varepsilon =$ | 25 | e= | 0.2 | $\alpha =$ | 0.035 | $\rho =$ | 5.32155 |
| $\varepsilon =$ | 25 | e= | 0.2 | $\alpha =$ | 0.04 | $\rho =$ | 5.3207 |
| $\varepsilon =$ | 25 | e= | 0.2 | $\alpha =$ | 0.045 | $\rho =$ | 5.31984 |
| $\varepsilon =$ | 25 | e= | 0.2 | $\alpha =$ | 0.05 | $\rho =$ | 5.31899 |
| $\varepsilon =$ | 25 | e= | 0.2 | $\alpha =$ | 0.055 | $\rho =$ | 5.31813 |
| $\varepsilon =$ | 25 | e= | 0.2 | $\alpha =$ | 0.06 | $\rho =$ | 5.31727 |
| $\varepsilon =$ | 25 | e= | 0.2 | $\alpha =$ | 0.065 | $\rho =$ | 5.31642 |
| $\varepsilon =$ | 25 | e= | 0.2 | $\alpha =$ | 0.07 | $\rho =$ | 5.31556 |
| $\varepsilon =$ | 25 | e= | 0.2 | $\alpha =$ | 0.075 | $\rho =$ | 5.3147 |
| $\varepsilon =$ | 25 | e= | 0.2 | $\alpha =$ | 0.08 | $\rho =$ | 5.31384 |
| $\varepsilon =$ | 25 | e= | 0.2 | $\alpha =$ | 0.085 | $\rho =$ | 5.31298 |
| $\varepsilon =$ | 25 | e= | 0.2 | $\alpha =$ | 0.09 | $\rho =$ | 5.31212 |
| $\varepsilon =$ | 25 | e= | 0.2 | $\alpha =$ | 0.095 | $\rho =$ | 5.31126 |
| $\varepsilon =$ | 25 | e= | 0.2 | $\alpha =$ | 0.1 | $\rho =$ | 5.3104 |
| $\varepsilon =$ | 25 | e= | 0.25 | $\alpha =$ | 0.005 | $\rho =$ | 5.2536 |
| $\varepsilon =$ | 25 | e= | 0.25 | $\alpha =$ | 0.01 | $\rho =$ | 5.25288 |
| $\varepsilon =$ | 25 | e= | 0.25 | $\alpha =$ | 0.015 | $\rho =$ | 5.25215 |
| $\varepsilon =$ | 25 | e= | 0.25 | $\alpha =$ | 0.02 | $\rho =$ | 5.25143 |
| $\varepsilon =$ | 25 | e= | 0.25 | $\alpha =$ | 0.025 | $\rho =$ | 5.2507 |
| $\varepsilon =$ | 25 | e= | 0.25 | $\alpha =$ | 0.03 | $\rho =$ | 5.24997 |
| $\varepsilon =$ | 25 | e= | 0.25 | $\alpha =$ | 0.035 | $\rho =$ | 5.24924 |
| $\varepsilon =$ | 25 | e= | 0.25 | $\alpha =$ | 0.04 | $\rho =$ | 5.24852 |
| $\varepsilon =$ | 25 | e= | 0.25 | $\alpha =$ | 0.045 | $\rho =$ | 5.24779 |
| $\varepsilon =$ | 25 | e= | 0.25 | $\alpha =$ | 0.05 | $\rho =$ | 5.24706 |
| $\varepsilon =$ | 25 | e= | 0.25 | $\alpha =$ | 0.055 | $\rho =$ | 5.24633 |
| $\varepsilon =$ | 25 | e= | 0.25 | $\alpha =$ | 0.06 | $\rho =$ | 5.2456 |
| $\varepsilon =$ | 25 | e= | 0.25 | $\alpha =$ | 0.065 | $\rho =$ | 5.24487 |
| $\varepsilon =$ | 25 | e= | 0.25 | $\alpha =$ | 0.07 | $\rho =$ | 5.24414 |
| $\varepsilon =$ | 25 | e= | 0.25 | $\alpha =$ | 0.075 | $\rho =$ | 5.24341 |
| $\varepsilon =$ | 25 | e= | 0.25 | $\alpha =$ | 0.08 | $\rho =$ | 5.24268 |
| $\varepsilon =$ | 25 | e= | 0.25 | $\alpha =$ | 0.085 | $\rho =$ | 5.24194 |
| $\varepsilon =$ | 25 | e= | 0.25 | $\alpha =$ | 0.09 | $\rho =$ | 5.24121 |
| $\varepsilon =$ | 25 | e= | 0.25 | $\alpha =$ | 0.095 | $\rho =$ | 5.24048 |
| $\varepsilon =$ | 25 | e= | 0.25 | $\alpha =$ | 0.1 | $\rho =$ | 5.23975 |
| $\varepsilon =$ | 25 | e= | 0.3 | $\alpha =$ | 0.005 | $\rho =$ | 5.20214 |
| $\varepsilon =$ | 25 | e= | 0.3 | $\alpha =$ | 0.01 | $\rho =$ | 5.2015 |
| $\varepsilon =$ | 25 | e= | 0.3 | $\alpha =$ | 0.015 | $\rho =$ | 5.20087 |

FIG. 5T

| | | | | | | | |
|---|---|---|---|---|---|---|---|
| $\varepsilon =$ | 25 | $e =$ | 0.3 | $\alpha =$ | 0.02 | $\rho =$ | 5.20024 |
| $\varepsilon =$ | 25 | $e =$ | 0.3 | $\alpha =$ | 0.025 | $\rho =$ | 5.1996 |
| $\varepsilon =$ | 25 | $e =$ | 0.3 | $\alpha =$ | 0.03 | $\rho =$ | 5.19897 |
| $\varepsilon =$ | 25 | $e =$ | 0.3 | $\alpha =$ | 0.035 | $\rho =$ | 5.19833 |
| $\varepsilon =$ | 25 | $e =$ | 0.3 | $\alpha =$ | 0.04 | $\rho =$ | 5.1977 |
| $\varepsilon =$ | 25 | $e =$ | 0.3 | $\alpha =$ | 0.045 | $\rho =$ | 5.19706 |
| $\varepsilon =$ | 25 | $e =$ | 0.3 | $\alpha =$ | 0.05 | $\rho =$ | 5.19643 |
| $\varepsilon =$ | 25 | $e =$ | 0.3 | $\alpha =$ | 0.055 | $\rho =$ | 5.19579 |
| $\varepsilon =$ | 25 | $e =$ | 0.3 | $\alpha =$ | 0.06 | $\rho =$ | 5.19516 |
| $\varepsilon =$ | 25 | $e =$ | 0.3 | $\alpha =$ | 0.065 | $\rho =$ | 5.19452 |
| $\varepsilon =$ | 25 | $e =$ | 0.3 | $\alpha =$ | 0.07 | $\rho =$ | 5.19388 |
| $\varepsilon =$ | 25 | $e =$ | 0.3 | $\alpha =$ | 0.075 | $\rho =$ | 5.19325 |
| $\varepsilon =$ | 25 | $e =$ | 0.3 | $\alpha =$ | 0.08 | $\rho =$ | 5.19261 |
| $\varepsilon =$ | 25 | $e =$ | 0.3 | $\alpha =$ | 0.085 | $\rho =$ | 5.19197 |
| $\varepsilon =$ | 25 | $e =$ | 0.3 | $\alpha =$ | 0.09 | $\rho =$ | 5.19133 |
| $\varepsilon =$ | 25 | $e =$ | 0.3 | $\alpha =$ | 0.095 | $\rho =$ | 5.19069 |
| $\varepsilon =$ | 25 | $e =$ | 0.3 | $\alpha =$ | 0.1 | $\rho =$ | 5.19005 |
| $\varepsilon =$ | 25 | $e =$ | 0.35 | $\alpha =$ | 0.005 | $\rho =$ | 5.16385 |
| $\varepsilon =$ | 25 | $e =$ | 0.35 | $\alpha =$ | 0.01 | $\rho =$ | 5.16329 |
| $\varepsilon =$ | 25 | $e =$ | 0.35 | $\alpha =$ | 0.015 | $\rho =$ | 5.16273 |
| $\varepsilon =$ | 25 | $e =$ | 0.35 | $\alpha =$ | 0.02 | $\rho =$ | 5.16216 |
| $\varepsilon =$ | 25 | $e =$ | 0.35 | $\alpha =$ | 0.025 | $\rho =$ | 5.1616 |
| $\varepsilon =$ | 25 | $e =$ | 0.35 | $\alpha =$ | 0.03 | $\rho =$ | 5.16104 |
| $\varepsilon =$ | 25 | $e =$ | 0.35 | $\alpha =$ | 0.035 | $\rho =$ | 5.16048 |
| $\varepsilon =$ | 25 | $e =$ | 0.35 | $\alpha =$ | 0.04 | $\rho =$ | 5.15991 |
| $\varepsilon =$ | 25 | $e =$ | 0.35 | $\alpha =$ | 0.045 | $\rho =$ | 5.15935 |
| $\varepsilon =$ | 25 | $e =$ | 0.35 | $\alpha =$ | 0.05 | $\rho =$ | 5.15879 |
| $\varepsilon =$ | 25 | $e =$ | 0.35 | $\alpha =$ | 0.055 | $\rho =$ | 5.15822 |
| $\varepsilon =$ | 25 | $e =$ | 0.35 | $\alpha =$ | 0.06 | $\rho =$ | 5.15766 |
| $\varepsilon =$ | 25 | $e =$ | 0.35 | $\alpha =$ | 0.065 | $\rho =$ | 5.15709 |
| $\varepsilon =$ | 25 | $e =$ | 0.35 | $\alpha =$ | 0.07 | $\rho =$ | 5.15653 |
| $\varepsilon =$ | 25 | $e =$ | 0.35 | $\alpha =$ | 0.075 | $\rho =$ | 5.15596 |
| $\varepsilon =$ | 25 | $e =$ | 0.35 | $\alpha =$ | 0.08 | $\rho =$ | 5.1554 |
| $\varepsilon =$ | 25 | $e =$ | 0.35 | $\alpha =$ | 0.085 | $\rho =$ | 5.15483 |
| $\varepsilon =$ | 25 | $e =$ | 0.35 | $\alpha =$ | 0.09 | $\rho =$ | 5.15426 |
| $\varepsilon =$ | 25 | $e =$ | 0.35 | $\alpha =$ | 0.095 | $\rho =$ | 5.1537 |
| $\varepsilon =$ | 25 | $e =$ | 0.35 | $\alpha =$ | 0.1 | $\rho =$ | 5.15313 |
| $\varepsilon =$ | 25 | $e =$ | 0.4 | $\alpha =$ | 0.005 | $\rho =$ | 5.13422 |
| $\varepsilon =$ | 25 | $e =$ | 0.4 | $\alpha =$ | 0.01 | $\rho =$ | 5.13372 |
| $\varepsilon =$ | 25 | $e =$ | 0.4 | $\alpha =$ | 0.015 | $\rho =$ | 5.13321 |
| $\varepsilon =$ | 25 | $e =$ | 0.4 | $\alpha =$ | 0.02 | $\rho =$ | 5.13271 |
| $\varepsilon =$ | 25 | $e =$ | 0.4 | $\alpha =$ | 0.025 | $\rho =$ | 5.1322 |
| $\varepsilon =$ | 25 | $e =$ | 0.4 | $\alpha =$ | 0.03 | $\rho =$ | 5.13169 |
| $\varepsilon =$ | 25 | $e =$ | 0.4 | $\alpha =$ | 0.035 | $\rho =$ | 5.13119 |
| $\varepsilon =$ | 25 | $e =$ | 0.4 | $\alpha =$ | 0.04 | $\rho =$ | 5.13068 |
| $\varepsilon =$ | 25 | $e =$ | 0.4 | $\alpha =$ | 0.045 | $\rho =$ | 5.13017 |
| $\varepsilon =$ | 25 | $e =$ | 0.4 | $\alpha =$ | 0.05 | $\rho =$ | 5.12967 |
| $\varepsilon =$ | 25 | $e =$ | 0.4 | $\alpha =$ | 0.055 | $\rho =$ | 5.12916 |
| $\varepsilon =$ | 25 | $e =$ | 0.4 | $\alpha =$ | 0.06 | $\rho =$ | 5.12865 |
| $\varepsilon =$ | 25 | $e =$ | 0.4 | $\alpha =$ | 0.065 | $\rho =$ | 5.12815 |
| $\varepsilon =$ | 25 | $e =$ | 0.4 | $\alpha =$ | 0.07 | $\rho =$ | 5.12764 |
| $\varepsilon =$ | 25 | $e =$ | 0.4 | $\alpha =$ | 0.075 | $\rho =$ | 5.12713 |
| $\varepsilon =$ | 25 | $e =$ | 0.4 | $\alpha =$ | 0.08 | $\rho =$ | 5.12662 |
| $\varepsilon =$ | 25 | $e =$ | 0.4 | $\alpha =$ | 0.085 | $\rho =$ | 5.12611 |
| $\varepsilon =$ | 25 | $e =$ | 0.4 | $\alpha =$ | 0.09 | $\rho =$ | 5.1256 |

FIG. 5U

| | | | | | | | |
|---|---|---|---|---|---|---|---|
| $\varepsilon =$ | 25 | e= | 0.4 | $\alpha =$ | 0.095 | $\rho =$ | 5.12509 |
| $\varepsilon =$ | 25 | e= | 0.4 | $\alpha =$ | 0.1 | $\rho =$ | 5.12458 |
| $\varepsilon =$ | 25 | e= | 0.45 | $\alpha =$ | 0.005 | $\rho =$ | 5.1106 |
| $\varepsilon =$ | 25 | e= | 0.45 | $\alpha =$ | 0.01 | $\rho =$ | 5.11014 |
| $\varepsilon =$ | 25 | e= | 0.45 | $\alpha =$ | 0.015 | $\rho =$ | 5.10968 |
| $\varepsilon =$ | 25 | e= | 0.45 | $\alpha =$ | 0.02 | $\rho =$ | 5.10922 |
| $\varepsilon =$ | 25 | e= | 0.45 | $\alpha =$ | 0.025 | $\rho =$ | 5.10876 |
| $\varepsilon =$ | 25 | e= | 0.45 | $\alpha =$ | 0.03 | $\rho =$ | 5.1083 |
| $\varepsilon =$ | 25 | e= | 0.45 | $\alpha =$ | 0.035 | $\rho =$ | 5.10784 |
| $\varepsilon =$ | 25 | e= | 0.45 | $\alpha =$ | 0.04 | $\rho =$ | 5.10738 |
| $\varepsilon =$ | 25 | e= | 0.45 | $\alpha =$ | 0.045 | $\rho =$ | 5.10692 |
| $\varepsilon =$ | 25 | e= | 0.45 | $\alpha =$ | 0.05 | $\rho =$ | 5.10646 |
| $\varepsilon =$ | 25 | e= | 0.45 | $\alpha =$ | 0.055 | $\rho =$ | 5.106 |
| $\varepsilon =$ | 25 | e= | 0.45 | $\alpha =$ | 0.06 | $\rho =$ | 5.10554 |
| $\varepsilon =$ | 25 | e= | 0.45 | $\alpha =$ | 0.065 | $\rho =$ | 5.10508 |
| $\varepsilon =$ | 25 | e= | 0.45 | $\alpha =$ | 0.07 | $\rho =$ | 5.10461 |
| $\varepsilon =$ | 25 | e= | 0.45 | $\alpha =$ | 0.075 | $\rho =$ | 5.10415 |
| $\varepsilon =$ | 25 | e= | 0.45 | $\alpha =$ | 0.08 | $\rho =$ | 5.10369 |
| $\varepsilon =$ | 25 | e= | 0.45 | $\alpha =$ | 0.085 | $\rho =$ | 5.10323 |
| $\varepsilon =$ | 25 | e= | 0.45 | $\alpha =$ | 0.09 | $\rho =$ | 5.10277 |
| $\varepsilon =$ | 25 | e= | 0.45 | $\alpha =$ | 0.095 | $\rho =$ | 5.1023 |
| $\varepsilon =$ | 25 | e= | 0.45 | $\alpha =$ | 0.1 | $\rho =$ | 5.10184 |
| $\varepsilon =$ | 25 | e= | 0.5 | $\alpha =$ | 0.005 | $\rho =$ | 5.09131 |
| $\varepsilon =$ | 25 | e= | 0.5 | $\alpha =$ | 0.01 | $\rho =$ | 5.09089 |
| $\varepsilon =$ | 25 | e= | 0.5 | $\alpha =$ | 0.015 | $\rho =$ | 5.09047 |
| $\varepsilon =$ | 25 | e= | 0.5 | $\alpha =$ | 0.02 | $\rho =$ | 5.09005 |
| $\varepsilon =$ | 25 | e= | 0.5 | $\alpha =$ | 0.025 | $\rho =$ | 5.08963 |
| $\varepsilon =$ | 25 | e= | 0.5 | $\alpha =$ | 0.03 | $\rho =$ | 5.0892 |
| $\varepsilon =$ | 25 | e= | 0.5 | $\alpha =$ | 0.035 | $\rho =$ | 5.08878 |
| $\varepsilon =$ | 25 | e= | 0.5 | $\alpha =$ | 0.04 | $\rho =$ | 5.08836 |
| $\varepsilon =$ | 25 | e= | 0.5 | $\alpha =$ | 0.045 | $\rho =$ | 5.08794 |
| $\varepsilon =$ | 25 | e= | 0.5 | $\alpha =$ | 0.05 | $\rho =$ | 5.08752 |
| $\varepsilon =$ | 25 | e= | 0.5 | $\alpha =$ | 0.055 | $\rho =$ | 5.08709 |
| $\varepsilon =$ | 25 | e= | 0.5 | $\alpha =$ | 0.06 | $\rho =$ | 5.08667 |
| $\varepsilon =$ | 25 | e= | 0.5 | $\alpha =$ | 0.065 | $\rho =$ | 5.08625 |
| $\varepsilon =$ | 25 | e= | 0.5 | $\alpha =$ | 0.07 | $\rho =$ | 5.08583 |
| $\varepsilon =$ | 25 | e= | 0.5 | $\alpha =$ | 0.075 | $\rho =$ | 5.0854 |
| $\varepsilon =$ | 25 | e= | 0.5 | $\alpha =$ | 0.08 | $\rho =$ | 5.08498 |
| $\varepsilon =$ | 25 | e= | 0.5 | $\alpha =$ | 0.085 | $\rho =$ | 5.08456 |
| $\varepsilon =$ | 25 | e= | 0.5 | $\alpha =$ | 0.09 | $\rho =$ | 5.08413 |
| $\varepsilon =$ | 25 | e= | 0.5 | $\alpha =$ | 0.095 | $\rho =$ | 5.08371 |
| $\varepsilon =$ | 25 | e= | 0.5 | $\alpha =$ | 0.1 | $\rho =$ | 5.08329 |
| $\varepsilon =$ | 30 | e= | 0.05 | $\alpha =$ | 0.005 | $\rho =$ | 6.54459 |
| $\varepsilon =$ | 30 | e= | 0.05 | $\alpha =$ | 0.01 | $\rho =$ | 6.54267 |
| $\varepsilon =$ | 30 | e= | 0.05 | $\alpha =$ | 0.015 | $\rho =$ | 6.54074 |
| $\varepsilon =$ | 30 | e= | 0.05 | $\alpha =$ | 0.02 | $\rho =$ | 6.53881 |
| $\varepsilon =$ | 30 | e= | 0.05 | $\alpha =$ | 0.025 | $\rho =$ | 6.53688 |
| $\varepsilon =$ | 30 | e= | 0.05 | $\alpha =$ | 0.03 | $\rho =$ | 6.53495 |
| $\varepsilon =$ | 30 | e= | 0.05 | $\alpha =$ | 0.035 | $\rho =$ | 6.53302 |
| $\varepsilon =$ | 30 | e= | 0.05 | $\alpha =$ | 0.04 | $\rho =$ | 6.53108 |
| $\varepsilon =$ | 30 | e= | 0.05 | $\alpha =$ | 0.045 | $\rho =$ | 6.52914 |
| $\varepsilon =$ | 30 | e= | 0.05 | $\alpha =$ | 0.05 | $\rho =$ | 6.5272 |
| $\varepsilon =$ | 30 | e= | 0.05 | $\alpha =$ | 0.055 | $\rho =$ | 6.52526 |
| $\varepsilon =$ | 30 | e= | 0.05 | $\alpha =$ | 0.06 | $\rho =$ | 6.52331 |
| $\varepsilon =$ | 30 | e= | 0.05 | $\alpha =$ | 0.065 | $\rho =$ | 6.52136 |

FIG. 5V

| | | | | | | | |
|---|---|---|---|---|---|---|---|
| ε = | 30 | e = | 0.05 | ∝ = | 0.07 | ρ = | 6.51941 |
| ε = | 30 | e = | 0.05 | ∝ = | 0.075 | ρ = | 6.51746 |
| ε = | 30 | e = | 0.05 | ∝ = | 0.08 | ρ = | 6.5155 |
| ε = | 30 | e = | 0.05 | ∝ = | 0.085 | ρ = | 6.51354 |
| ε = | 30 | e = | 0.05 | ∝ = | 0.09 | ρ = | 6.51158 |
| ε = | 30 | e = | 0.05 | ∝ = | 0.095 | ρ = | 6.50962 |
| ε = | 30 | e = | 0.05 | ∝ = | 0.1 | ρ = | 6.50766 |
| ε = | 30 | e = | 0.1 | ∝ = | 0.005 | ρ = | 6.08519 |
| ε = | 30 | e = | 0.1 | ∝ = | 0.01 | ρ = | 6.08388 |
| ε = | 30 | e = | 0.1 | ∝ = | 0.015 | ρ = | 6.08258 |
| ε = | 30 | e = | 0.1 | ∝ = | 0.02 | ρ = | 6.08127 |
| ε = | 30 | e = | 0.1 | ∝ = | 0.025 | ρ = | 6.07996 |
| ε = | 30 | e = | 0.1 | ∝ = | 0.03 | ρ = | 6.07865 |
| ε = | 30 | e = | 0.1 | ∝ = | 0.035 | ρ = | 6.07733 |
| ε = | 30 | e = | 0.1 | ∝ = | 0.04 | ρ = | 6.07602 |
| ε = | 30 | e = | 0.1 | ∝ = | 0.045 | ρ = | 6.07471 |
| ε = | 30 | e = | 0.1 | ∝ = | 0.05 | ρ = | 6.07339 |
| ε = | 30 | e = | 0.1 | ∝ = | 0.055 | ρ = | 6.07207 |
| ε = | 30 | e = | 0.1 | ∝ = | 0.06 | ρ = | 6.07075 |
| ε = | 30 | e = | 0.1 | ∝ = | 0.065 | ρ = | 6.06943 |
| ε = | 30 | e = | 0.1 | ∝ = | 0.07 | ρ = | 6.06811 |
| ε = | 30 | e = | 0.1 | ∝ = | 0.075 | ρ = | 6.06679 |
| ε = | 30 | e = | 0.1 | ∝ = | 0.08 | ρ = | 6.06547 |
| ε = | 30 | e = | 0.1 | ∝ = | 0.085 | ρ = | 6.06414 |
| ε = | 30 | e = | 0.1 | ∝ = | 0.09 | ρ = | 6.06282 |
| ε = | 30 | e = | 0.1 | ∝ = | 0.095 | ρ = | 6.06149 |
| ε = | 30 | e = | 0.1 | ∝ = | 0.1 | ρ = | 6.06016 |
| ε = | 30 | e = | 0.15 | ∝ = | 0.005 | ρ = | 5.89234 |
| ε = | 30 | e = | 0.15 | ∝ = | 0.01 | ρ = | 5.89134 |
| ε = | 30 | e = | 0.15 | ∝ = | 0.015 | ρ = | 5.89033 |
| ε = | 30 | e = | 0.15 | ∝ = | 0.02 | ρ = | 5.88933 |
| ε = | 30 | e = | 0.15 | ∝ = | 0.025 | ρ = | 5.88832 |
| ε = | 30 | e = | 0.15 | ∝ = | 0.03 | ρ = | 5.88731 |
| ε = | 30 | e = | 0.15 | ∝ = | 0.035 | ρ = | 5.8863 |
| ε = | 30 | e = | 0.15 | ∝ = | 0.04 | ρ = | 5.8853 |
| ε = | 30 | e = | 0.15 | ∝ = | 0.045 | ρ = | 5.88429 |
| ε = | 30 | e = | 0.15 | ∝ = | 0.05 | ρ = | 5.88327 |
| ε = | 30 | e = | 0.15 | ∝ = | 0.055 | ρ = | 5.88226 |
| ε = | 30 | e = | 0.15 | ∝ = | 0.06 | ρ = | 5.88125 |
| ε = | 30 | e = | 0.15 | ∝ = | 0.065 | ρ = | 5.88024 |
| ε = | 30 | e = | 0.15 | ∝ = | 0.07 | ρ = | 5.87922 |
| ε = | 30 | e = | 0.15 | ∝ = | 0.075 | ρ = | 5.87821 |
| ε = | 30 | e = | 0.15 | ∝ = | 0.08 | ρ = | 5.87719 |
| ε = | 30 | e = | 0.15 | ∝ = | 0.085 | ρ = | 5.87618 |
| ε = | 30 | e = | 0.15 | ∝ = | 0.09 | ρ = | 5.87516 |
| ε = | 30 | e = | 0.15 | ∝ = | 0.095 | ρ = | 5.87414 |
| ε = | 30 | e = | 0.15 | ∝ = | 0.1 | ρ = | 5.87312 |
| ε = | 30 | e = | 0.2 | ∝ = | 0.005 | ρ = | 5.78418 |
| ε = | 30 | e = | 0.2 | ∝ = | 0.01 | ρ = | 5.78336 |
| ε = | 30 | e = | 0.2 | ∝ = | 0.015 | ρ = | 5.78254 |
| ε = | 30 | e = | 0.2 | ∝ = | 0.02 | ρ = | 5.78172 |
| ε = | 30 | e = | 0.2 | ∝ = | 0.025 | ρ = | 5.78089 |
| ε = | 30 | e = | 0.2 | ∝ = | 0.03 | ρ = | 5.78007 |
| ε = | 30 | e = | 0.2 | ∝ = | 0.035 | ρ = | 5.77925 |
| ε = | 30 | e = | 0.2 | ∝ = | 0.04 | ρ = | 5.77843 |

FIG. 5W

| | | | | | | | |
|---|---|---|---|---|---|---|---|
| $\varepsilon =$ | 30 | e= | 0.2 | $\alpha =$ | 0.045 | $\rho =$ | 5.7776 |
| $\varepsilon =$ | 30 | e= | 0.2 | $\alpha =$ | 0.05 | $\rho =$ | 5.77678 |
| $\varepsilon =$ | 30 | e= | 0.2 | $\alpha =$ | 0.055 | $\rho =$ | 5.77595 |
| $\varepsilon =$ | 30 | e= | 0.2 | $\alpha =$ | 0.06 | $\rho =$ | 5.77513 |
| $\varepsilon =$ | 30 | e= | 0.2 | $\alpha =$ | 0.065 | $\rho =$ | 5.7743 |
| $\varepsilon =$ | 30 | e= | 0.2 | $\alpha =$ | 0.07 | $\rho =$ | 5.77348 |
| $\varepsilon =$ | 30 | e= | 0.2 | $\alpha =$ | 0.075 | $\rho =$ | 5.77265 |
| $\varepsilon =$ | 30 | e= | 0.2 | $\alpha =$ | 0.08 | $\rho =$ | 5.77182 |
| $\varepsilon =$ | 30 | e= | 0.2 | $\alpha =$ | 0.085 | $\rho =$ | 5.77099 |
| $\varepsilon =$ | 30 | e= | 0.2 | $\alpha =$ | 0.09 | $\rho =$ | 5.77017 |
| $\varepsilon =$ | 30 | e= | 0.2 | $\alpha =$ | 0.095 | $\rho =$ | 5.76934 |
| $\varepsilon =$ | 30 | e= | 0.2 | $\alpha =$ | 0.1 | $\rho =$ | 5.76851 |
| $\varepsilon =$ | 30 | e= | 0.25 | $\alpha =$ | 0.005 | $\rho =$ | 5.71451 |
| $\varepsilon =$ | 30 | e= | 0.25 | $\alpha =$ | 0.01 | $\rho =$ | 5.71381 |
| $\varepsilon =$ | 30 | e= | 0.25 | $\alpha =$ | 0.015 | $\rho =$ | 5.71312 |
| $\varepsilon =$ | 30 | e= | 0.25 | $\alpha =$ | 0.02 | $\rho =$ | 5.71242 |
| $\varepsilon =$ | 30 | e= | 0.25 | $\alpha =$ | 0.025 | $\rho =$ | 5.71173 |
| $\varepsilon =$ | 30 | e= | 0.25 | $\alpha =$ | 0.03 | $\rho =$ | 5.71103 |
| $\varepsilon =$ | 30 | e= | 0.25 | $\alpha =$ | 0.035 | $\rho =$ | 5.71034 |
| $\varepsilon =$ | 30 | e= | 0.25 | $\alpha =$ | 0.04 | $\rho =$ | 5.70964 |
| $\varepsilon =$ | 30 | e= | 0.25 | $\alpha =$ | 0.045 | $\rho =$ | 5.70894 |
| $\varepsilon =$ | 30 | e= | 0.25 | $\alpha =$ | 0.05 | $\rho =$ | 5.70825 |
| $\varepsilon =$ | 30 | e= | 0.25 | $\alpha =$ | 0.055 | $\rho =$ | 5.70755 |
| $\varepsilon =$ | 30 | e= | 0.25 | $\alpha =$ | 0.06 | $\rho =$ | 5.70685 |
| $\varepsilon =$ | 30 | e= | 0.25 | $\alpha =$ | 0.065 | $\rho =$ | 5.70615 |
| $\varepsilon =$ | 30 | e= | 0.25 | $\alpha =$ | 0.07 | $\rho =$ | 5.70545 |
| $\varepsilon =$ | 30 | e= | 0.25 | $\alpha =$ | 0.075 | $\rho =$ | 5.70476 |
| $\varepsilon =$ | 30 | e= | 0.25 | $\alpha =$ | 0.08 | $\rho =$ | 5.70406 |
| $\varepsilon =$ | 30 | e= | 0.25 | $\alpha =$ | 0.085 | $\rho =$ | 5.70336 |
| $\varepsilon =$ | 30 | e= | 0.25 | $\alpha =$ | 0.09 | $\rho =$ | 5.70265 |
| $\varepsilon =$ | 30 | e= | 0.25 | $\alpha =$ | 0.095 | $\rho =$ | 5.70195 |
| $\varepsilon =$ | 30 | e= | 0.25 | $\alpha =$ | 0.1 | $\rho =$ | 5.70125 |
| $\varepsilon =$ | 30 | e= | 0.3 | $\alpha =$ | 0.005 | $\rho =$ | 5.66575 |
| $\varepsilon =$ | 30 | e= | 0.3 | $\alpha =$ | 0.01 | $\rho =$ | 5.66514 |
| $\varepsilon =$ | 30 | e= | 0.3 | $\alpha =$ | 0.015 | $\rho =$ | 5.66454 |
| $\varepsilon =$ | 30 | e= | 0.3 | $\alpha =$ | 0.02 | $\rho =$ | 5.66394 |
| $\varepsilon =$ | 30 | e= | 0.3 | $\alpha =$ | 0.025 | $\rho =$ | 5.66334 |
| $\varepsilon =$ | 30 | e= | 0.3 | $\alpha =$ | 0.03 | $\rho =$ | 5.66273 |
| $\varepsilon =$ | 30 | e= | 0.3 | $\alpha =$ | 0.035 | $\rho =$ | 5.66213 |
| $\varepsilon =$ | 30 | e= | 0.3 | $\alpha =$ | 0.04 | $\rho =$ | 5.66152 |
| $\varepsilon =$ | 30 | e= | 0.3 | $\alpha =$ | 0.045 | $\rho =$ | 5.66092 |
| $\varepsilon =$ | 30 | e= | 0.3 | $\alpha =$ | 0.05 | $\rho =$ | 5.66032 |
| $\varepsilon =$ | 30 | e= | 0.3 | $\alpha =$ | 0.055 | $\rho =$ | 5.65971 |
| $\varepsilon =$ | 30 | e= | 0.3 | $\alpha =$ | 0.06 | $\rho =$ | 5.65911 |
| $\varepsilon =$ | 30 | e= | 0.3 | $\alpha =$ | 0.065 | $\rho =$ | 5.6585 |
| $\varepsilon =$ | 30 | e= | 0.3 | $\alpha =$ | 0.07 | $\rho =$ | 5.65789 |
| $\varepsilon =$ | 30 | e= | 0.3 | $\alpha =$ | 0.075 | $\rho =$ | 5.65729 |
| $\varepsilon =$ | 30 | e= | 0.3 | $\alpha =$ | 0.08 | $\rho =$ | 5.65668 |
| $\varepsilon =$ | 30 | e= | 0.3 | $\alpha =$ | 0.085 | $\rho =$ | 5.65607 |
| $\varepsilon =$ | 30 | e= | 0.3 | $\alpha =$ | 0.09 | $\rho =$ | 5.65547 |
| $\varepsilon =$ | 30 | e= | 0.3 | $\alpha =$ | 0.095 | $\rho =$ | 5.65486 |
| $\varepsilon =$ | 30 | e= | 0.3 | $\alpha =$ | 0.1 | $\rho =$ | 5.65425 |
| $\varepsilon =$ | 30 | e= | 0.35 | $\alpha =$ | 0.005 | $\rho =$ | 5.62966 |
| $\varepsilon =$ | 30 | e= | 0.35 | $\alpha =$ | 0.01 | $\rho =$ | 5.62912 |
| $\varepsilon =$ | 30 | e= | 0.35 | $\alpha =$ | 0.015 | $\rho =$ | 5.62859 |

FIG. 5X

| | | | | | | | |
|---|---|---|---|---|---|---|---|
| $\varepsilon =$ | 30 | $e=$ | 0.35 | $\alpha =$ | 0.02 | $\rho =$ | 5.62806 |
| $\varepsilon =$ | 30 | $e=$ | 0.35 | $\alpha =$ | 0.025 | $\rho =$ | 5.62753 |
| $\varepsilon =$ | 30 | $e=$ | 0.35 | $\alpha =$ | 0.03 | $\rho =$ | 5.62699 |
| $\varepsilon =$ | 30 | $e=$ | 0.35 | $\alpha =$ | 0.035 | $\rho =$ | 5.62646 |
| $\varepsilon =$ | 30 | $e=$ | 0.35 | $\alpha =$ | 0.04 | $\rho =$ | 5.62593 |
| $\varepsilon =$ | 30 | $e=$ | 0.35 | $\alpha =$ | 0.045 | $\rho =$ | 5.62539 |
| $\varepsilon =$ | 30 | $e=$ | 0.35 | $\alpha =$ | 0.05 | $\rho =$ | 5.62486 |
| $\varepsilon =$ | 30 | $e=$ | 0.35 | $\alpha =$ | 0.055 | $\rho =$ | 5.62432 |
| $\varepsilon =$ | 30 | $e=$ | 0.35 | $\alpha =$ | 0.06 | $\rho =$ | 5.62379 |
| $\varepsilon =$ | 30 | $e=$ | 0.35 | $\alpha =$ | 0.065 | $\rho =$ | 5.62325 |
| $\varepsilon =$ | 30 | $e=$ | 0.35 | $\alpha =$ | 0.07 | $\rho =$ | 5.62272 |
| $\varepsilon =$ | 30 | $e=$ | 0.35 | $\alpha =$ | 0.075 | $\rho =$ | 5.62218 |
| $\varepsilon =$ | 30 | $e=$ | 0.35 | $\alpha =$ | 0.08 | $\rho =$ | 5.62165 |
| $\varepsilon =$ | 30 | $e=$ | 0.35 | $\alpha =$ | 0.085 | $\rho =$ | 5.62111 |
| $\varepsilon =$ | 30 | $e=$ | 0.35 | $\alpha =$ | 0.09 | $\rho =$ | 5.62058 |
| $\varepsilon =$ | 30 | $e=$ | 0.35 | $\alpha =$ | 0.095 | $\rho =$ | 5.62004 |
| $\varepsilon =$ | 30 | $e=$ | 0.35 | $\alpha =$ | 0.1 | $\rho =$ | 5.6195 |
| $\varepsilon =$ | 30 | $e=$ | 0.4 | $\alpha =$ | 0.005 | $\rho =$ | 5.60184 |
| $\varepsilon =$ | 30 | $e=$ | 0.4 | $\alpha =$ | 0.01 | $\rho =$ | 5.60136 |
| $\varepsilon =$ | 30 | $e=$ | 0.4 | $\alpha =$ | 0.015 | $\rho =$ | 5.60089 |
| $\varepsilon =$ | 30 | $e=$ | 0.4 | $\alpha =$ | 0.02 | $\rho =$ | 5.60041 |
| $\varepsilon =$ | 30 | $e=$ | 0.4 | $\alpha =$ | 0.025 | $\rho =$ | 5.59993 |
| $\varepsilon =$ | 30 | $e=$ | 0.4 | $\alpha =$ | 0.03 | $\rho =$ | 5.59946 |
| $\varepsilon =$ | 30 | $e=$ | 0.4 | $\alpha =$ | 0.035 | $\rho =$ | 5.59898 |
| $\varepsilon =$ | 30 | $e=$ | 0.4 | $\alpha =$ | 0.04 | $\rho =$ | 5.5985 |
| $\varepsilon =$ | 30 | $e=$ | 0.4 | $\alpha =$ | 0.045 | $\rho =$ | 5.59802 |
| $\varepsilon =$ | 30 | $e=$ | 0.4 | $\alpha =$ | 0.05 | $\rho =$ | 5.59754 |
| $\varepsilon =$ | 30 | $e=$ | 0.4 | $\alpha =$ | 0.055 | $\rho =$ | 5.59706 |
| $\varepsilon =$ | 30 | $e=$ | 0.4 | $\alpha =$ | 0.06 | $\rho =$ | 5.59659 |
| $\varepsilon =$ | 30 | $e=$ | 0.4 | $\alpha =$ | 0.065 | $\rho =$ | 5.59611 |
| $\varepsilon =$ | 30 | $e=$ | 0.4 | $\alpha =$ | 0.07 | $\rho =$ | 5.59563 |
| $\varepsilon =$ | 30 | $e=$ | 0.4 | $\alpha =$ | 0.075 | $\rho =$ | 5.59515 |
| $\varepsilon =$ | 30 | $e=$ | 0.4 | $\alpha =$ | 0.08 | $\rho =$ | 5.59467 |
| $\varepsilon =$ | 30 | $e=$ | 0.4 | $\alpha =$ | 0.085 | $\rho =$ | 5.59419 |
| $\varepsilon =$ | 30 | $e=$ | 0.4 | $\alpha =$ | 0.09 | $\rho =$ | 5.59371 |
| $\varepsilon =$ | 30 | $e=$ | 0.4 | $\alpha =$ | 0.095 | $\rho =$ | 5.59323 |
| $\varepsilon =$ | 30 | $e=$ | 0.4 | $\alpha =$ | 0.1 | $\rho =$ | 5.59275 |
| $\varepsilon =$ | 30 | $e=$ | 0.45 | $\alpha =$ | 0.005 | $\rho =$ | 5.57974 |
| $\varepsilon =$ | 30 | $e=$ | 0.45 | $\alpha =$ | 0.01 | $\rho =$ | 5.57931 |
| $\varepsilon =$ | 30 | $e=$ | 0.45 | $\alpha =$ | 0.015 | $\rho =$ | 5.57887 |
| $\varepsilon =$ | 30 | $e=$ | 0.45 | $\alpha =$ | 0.02 | $\rho =$ | 5.57844 |
| $\varepsilon =$ | 30 | $e=$ | 0.45 | $\alpha =$ | 0.025 | $\rho =$ | 5.57801 |
| $\varepsilon =$ | 30 | $e=$ | 0.45 | $\alpha =$ | 0.03 | $\rho =$ | 5.57758 |
| $\varepsilon =$ | 30 | $e=$ | 0.45 | $\alpha =$ | 0.035 | $\rho =$ | 5.57714 |
| $\varepsilon =$ | 30 | $e=$ | 0.45 | $\alpha =$ | 0.04 | $\rho =$ | 5.57671 |
| $\varepsilon =$ | 30 | $e=$ | 0.45 | $\alpha =$ | 0.045 | $\rho =$ | 5.57628 |
| $\varepsilon =$ | 30 | $e=$ | 0.45 | $\alpha =$ | 0.05 | $\rho =$ | 5.57584 |
| $\varepsilon =$ | 30 | $e=$ | 0.45 | $\alpha =$ | 0.055 | $\rho =$ | 5.57541 |
| $\varepsilon =$ | 30 | $e=$ | 0.45 | $\alpha =$ | 0.06 | $\rho =$ | 5.57498 |
| $\varepsilon =$ | 30 | $e=$ | 0.45 | $\alpha =$ | 0.065 | $\rho =$ | 5.57454 |
| $\varepsilon =$ | 30 | $e=$ | 0.45 | $\alpha =$ | 0.07 | $\rho =$ | 5.57411 |
| $\varepsilon =$ | 30 | $e=$ | 0.45 | $\alpha =$ | 0.075 | $\rho =$ | 5.57367 |
| $\varepsilon =$ | 30 | $e=$ | 0.45 | $\alpha =$ | 0.08 | $\rho =$ | 5.57324 |
| $\varepsilon =$ | 30 | $e=$ | 0.45 | $\alpha =$ | 0.085 | $\rho =$ | 5.5728 |
| $\varepsilon =$ | 30 | $e=$ | 0.45 | $\alpha =$ | 0.09 | $\rho =$ | 5.57237 |

FIG. 5Y

| | | | | | | | |
|---|---|---|---|---|---|---|---|
| $\varepsilon =$ | 30 | e= | 0.45 | $\alpha =$ | 0.095 | $p =$ | 5.57194 |
| $\varepsilon =$ | 30 | e= | 0.45 | $\alpha =$ | 0.1 | $p =$ | 5.5715 |
| $\varepsilon =$ | 30 | e= | 0.5 | $\alpha =$ | 0.005 | $p =$ | 5.56174 |
| $\varepsilon =$ | 30 | e= | 0.5 | $\alpha =$ | 0.01 | $p =$ | 5.56135 |
| $\varepsilon =$ | 30 | e= | 0.5 | $\alpha =$ | 0.015 | $p =$ | 5.56095 |
| $\varepsilon =$ | 30 | e= | 0.5 | $\alpha =$ | 0.02 | $p =$ | 5.56056 |
| $\varepsilon =$ | 30 | e= | 0.5 | $\alpha =$ | 0.025 | $p =$ | 5.56016 |
| $\varepsilon =$ | 30 | e= | 0.5 | $\alpha =$ | 0.03 | $p =$ | 5.55977 |
| $\varepsilon =$ | 30 | e= | 0.5 | $\alpha =$ | 0.035 | $p =$ | 5.55937 |
| $\varepsilon =$ | 30 | e= | 0.5 | $\alpha =$ | 0.04 | $p =$ | 5.55897 |
| $\varepsilon =$ | 30 | e= | 0.5 | $\alpha =$ | 0.045 | $p =$ | 5.55858 |
| $\varepsilon =$ | 30 | e= | 0.5 | $\alpha =$ | 0.05 | $p =$ | 5.55818 |
| $\varepsilon =$ | 30 | e= | 0.5 | $\alpha =$ | 0.055 | $p =$ | 5.55779 |
| $\varepsilon =$ | 30 | e= | 0.5 | $\alpha =$ | 0.06 | $p =$ | 5.55739 |
| $\varepsilon =$ | 30 | e= | 0.5 | $\alpha =$ | 0.065 | $p =$ | 5.55699 |
| $\varepsilon =$ | 30 | e= | 0.5 | $\alpha =$ | 0.07 | $p =$ | 5.5566 |
| $\varepsilon =$ | 30 | e= | 0.5 | $\alpha =$ | 0.075 | $p =$ | 5.5562 |
| $\varepsilon =$ | 30 | e= | 0.5 | $\alpha =$ | 0.08 | $p =$ | 5.5558 |
| $\varepsilon =$ | 30 | e= | 0.5 | $\alpha =$ | 0.085 | $p =$ | 5.55541 |
| $\varepsilon =$ | 30 | e= | 0.5 | $\alpha =$ | 0.09 | $p =$ | 5.55501 |
| $\varepsilon =$ | 30 | e= | 0.5 | $\alpha =$ | 0.095 | $p =$ | 5.55461 |
| $\varepsilon =$ | 30 | e= | 0.5 | $\alpha =$ | 0.1 | $p =$ | 5.55421 |
| $\varepsilon =$ | 35 | e= | 0.05 | $\alpha =$ | 0.005 | $p =$ | 6.95211 |
| $\varepsilon =$ | 35 | e= | 0.05 | $\alpha =$ | 0.01 | $p =$ | 6.95018 |
| $\varepsilon =$ | 35 | e= | 0.05 | $\alpha =$ | 0.015 | $p =$ | 6.94825 |
| $\varepsilon =$ | 35 | e= | 0.05 | $\alpha =$ | 0.02 | $p =$ | 6.94632 |
| $\varepsilon =$ | 35 | e= | 0.05 | $\alpha =$ | 0.025 | $p =$ | 6.94439 |
| $\varepsilon =$ | 35 | e= | 0.05 | $\alpha =$ | 0.03 | $p =$ | 6.94246 |
| $\varepsilon =$ | 35 | e= | 0.05 | $\alpha =$ | 0.035 | $p =$ | 6.94052 |
| $\varepsilon =$ | 35 | e= | 0.05 | $\alpha =$ | 0.04 | $p =$ | 6.93858 |
| $\varepsilon =$ | 35 | e= | 0.05 | $\alpha =$ | 0.045 | $p =$ | 6.93664 |
| $\varepsilon =$ | 35 | e= | 0.05 | $\alpha =$ | 0.05 | $p =$ | 6.9347 |
| $\varepsilon =$ | 35 | e= | 0.05 | $\alpha =$ | 0.055 | $p =$ | 6.93275 |
| $\varepsilon =$ | 35 | e= | 0.05 | $\alpha =$ | 0.06 | $p =$ | 6.9308 |
| $\varepsilon =$ | 35 | e= | 0.05 | $\alpha =$ | 0.065 | $p =$ | 6.92885 |
| $\varepsilon =$ | 35 | e= | 0.05 | $\alpha =$ | 0.07 | $p =$ | 6.9269 |
| $\varepsilon =$ | 35 | e= | 0.05 | $\alpha =$ | 0.075 | $p =$ | 6.92495 |
| $\varepsilon =$ | 35 | e= | 0.05 | $\alpha =$ | 0.08 | $p =$ | 6.92299 |
| $\varepsilon =$ | 35 | e= | 0.05 | $\alpha =$ | 0.085 | $p =$ | 6.92103 |
| $\varepsilon =$ | 35 | e= | 0.05 | $\alpha =$ | 0.09 | $p =$ | 6.91907 |
| $\varepsilon =$ | 35 | e= | 0.05 | $\alpha =$ | 0.095 | $p =$ | 6.9171 |
| $\varepsilon =$ | 35 | e= | 0.05 | $\alpha =$ | 0.1 | $p =$ | 6.91514 |
| $\varepsilon =$ | 35 | e= | 0.1 | $\alpha =$ | 0.005 | $p =$ | 6.49823 |
| $\varepsilon =$ | 35 | e= | 0.1 | $\alpha =$ | 0.01 | $p =$ | 6.49695 |
| $\varepsilon =$ | 35 | e= | 0.1 | $\alpha =$ | 0.015 | $p =$ | 6.49566 |
| $\varepsilon =$ | 35 | e= | 0.1 | $\alpha =$ | 0.02 | $p =$ | 6.49438 |
| $\varepsilon =$ | 35 | e= | 0.1 | $\alpha =$ | 0.025 | $p =$ | 6.49309 |
| $\varepsilon =$ | 35 | e= | 0.1 | $\alpha =$ | 0.03 | $p =$ | 6.4918 |
| $\varepsilon =$ | 35 | e= | 0.1 | $\alpha =$ | 0.035 | $p =$ | 6.49051 |
| $\varepsilon =$ | 35 | e= | 0.1 | $\alpha =$ | 0.04 | $p =$ | 6.48922 |
| $\varepsilon =$ | 35 | e= | 0.1 | $\alpha =$ | 0.045 | $p =$ | 6.48793 |
| $\varepsilon =$ | 35 | e= | 0.1 | $\alpha =$ | 0.05 | $p =$ | 6.48663 |
| $\varepsilon =$ | 35 | e= | 0.1 | $\alpha =$ | 0.055 | $p =$ | 6.48534 |
| $\varepsilon =$ | 35 | e= | 0.1 | $\alpha =$ | 0.06 | $p =$ | 6.48404 |
| $\varepsilon =$ | 35 | e= | 0.1 | $\alpha =$ | 0.065 | $p =$ | 6.48275 |

FIG. 5Z

| | | | | | | | |
|---|---|---|---|---|---|---|---|
| $\varepsilon =$ | 35 | e= | 0.1 | $\alpha =$ | 0.07 | $p=$ | 6.48145 |
| $\varepsilon =$ | 35 | e= | 0.1 | $\alpha =$ | 0.075 | $p=$ | 6.48015 |
| $\varepsilon =$ | 35 | e= | 0.1 | $\alpha =$ | 0.08 | $p=$ | 6.47885 |
| $\varepsilon =$ | 35 | e= | 0.1 | $\alpha =$ | 0.085 | $p=$ | 6.47755 |
| $\varepsilon =$ | 35 | e= | 0.1 | $\alpha =$ | 0.09 | $p=$ | 6.47625 |
| $\varepsilon =$ | 35 | e= | 0.1 | $\alpha =$ | 0.095 | $p=$ | 6.47494 |
| $\varepsilon =$ | 35 | e= | 0.1 | $\alpha =$ | 0.1 | $p=$ | 6.47364 |
| $\varepsilon =$ | 35 | e= | 0.15 | $\alpha =$ | 0.005 | $p=$ | 6.31064 |
| $\varepsilon =$ | 35 | e= | 0.15 | $\alpha =$ | 0.01 | $p=$ | 6.30966 |
| $\varepsilon =$ | 35 | e= | 0.15 | $\alpha =$ | 0.015 | $p=$ | 6.30868 |
| $\varepsilon =$ | 35 | e= | 0.15 | $\alpha =$ | 0.02 | $p=$ | 6.3077 |
| $\varepsilon =$ | 35 | e= | 0.15 | $\alpha =$ | 0.025 | $p=$ | 6.30673 |
| $\varepsilon =$ | 35 | e= | 0.15 | $\alpha =$ | 0.03 | $p=$ | 6.30575 |
| $\varepsilon =$ | 35 | e= | 0.15 | $\alpha =$ | 0.035 | $p=$ | 6.30477 |
| $\varepsilon =$ | 35 | e= | 0.15 | $\alpha =$ | 0.04 | $p=$ | 6.30379 |
| $\varepsilon =$ | 35 | e= | 0.15 | $\alpha =$ | 0.045 | $p=$ | 6.30281 |
| $\varepsilon =$ | 35 | e= | 0.15 | $\alpha =$ | 0.05 | $p=$ | 6.30182 |
| $\varepsilon =$ | 35 | e= | 0.15 | $\alpha =$ | 0.055 | $p=$ | 6.30084 |
| $\varepsilon =$ | 35 | e= | 0.15 | $\alpha =$ | 0.06 | $p=$ | 6.29986 |
| $\varepsilon =$ | 35 | e= | 0.15 | $\alpha =$ | 0.065 | $p=$ | 6.29887 |
| $\varepsilon =$ | 35 | e= | 0.15 | $\alpha =$ | 0.07 | $p=$ | 6.29789 |
| $\varepsilon =$ | 35 | e= | 0.15 | $\alpha =$ | 0.075 | $p=$ | 6.2969 |
| $\varepsilon =$ | 35 | e= | 0.15 | $\alpha =$ | 0.08 | $p=$ | 6.29592 |
| $\varepsilon =$ | 35 | e= | 0.15 | $\alpha =$ | 0.085 | $p=$ | 6.29493 |
| $\varepsilon =$ | 35 | e= | 0.15 | $\alpha =$ | 0.09 | $p=$ | 6.29394 |
| $\varepsilon =$ | 35 | e= | 0.15 | $\alpha =$ | 0.095 | $p=$ | 6.29295 |
| $\varepsilon =$ | 35 | e= | 0.15 | $\alpha =$ | 0.1 | $p=$ | 6.29197 |
| $\varepsilon =$ | 35 | e= | 0.2 | $\alpha =$ | 0.005 | $p=$ | 6.20644 |
| $\varepsilon =$ | 35 | e= | 0.2 | $\alpha =$ | 0.01 | $p=$ | 6.20565 |
| $\varepsilon =$ | 35 | e= | 0.2 | $\alpha =$ | 0.015 | $p=$ | 6.20486 |
| $\varepsilon =$ | 35 | e= | 0.2 | $\alpha =$ | 0.02 | $p=$ | 6.20407 |
| $\varepsilon =$ | 35 | e= | 0.2 | $\alpha =$ | 0.025 | $p=$ | 6.20328 |
| $\varepsilon =$ | 35 | e= | 0.2 | $\alpha =$ | 0.03 | $p=$ | 6.20248 |
| $\varepsilon =$ | 35 | e= | 0.2 | $\alpha =$ | 0.035 | $p=$ | 6.20169 |
| $\varepsilon =$ | 35 | e= | 0.2 | $\alpha =$ | 0.04 | $p=$ | 6.2009 |
| $\varepsilon =$ | 35 | e= | 0.2 | $\alpha =$ | 0.045 | $p=$ | 6.2001 |
| $\varepsilon =$ | 35 | e= | 0.2 | $\alpha =$ | 0.05 | $p=$ | 6.19931 |
| $\varepsilon =$ | 35 | e= | 0.2 | $\alpha =$ | 0.055 | $p=$ | 6.19851 |
| $\varepsilon =$ | 35 | e= | 0.2 | $\alpha =$ | 0.06 | $p=$ | 6.19772 |
| $\varepsilon =$ | 35 | e= | 0.2 | $\alpha =$ | 0.065 | $p=$ | 6.19692 |
| $\varepsilon =$ | 35 | e= | 0.2 | $\alpha =$ | 0.07 | $p=$ | 6.19613 |
| $\varepsilon =$ | 35 | e= | 0.2 | $\alpha =$ | 0.075 | $p=$ | 6.19533 |
| $\varepsilon =$ | 35 | e= | 0.2 | $\alpha =$ | 0.08 | $p=$ | 6.19453 |
| $\varepsilon =$ | 35 | e= | 0.2 | $\alpha =$ | 0.085 | $p=$ | 6.19373 |
| $\varepsilon =$ | 35 | e= | 0.2 | $\alpha =$ | 0.09 | $p=$ | 6.19294 |
| $\varepsilon =$ | 35 | e= | 0.2 | $\alpha =$ | 0.095 | $p=$ | 6.19214 |
| $\varepsilon =$ | 35 | e= | 0.2 | $\alpha =$ | 0.1 | $p=$ | 6.19134 |
| $\varepsilon =$ | 35 | e= | 0.25 | $\alpha =$ | 0.005 | $p=$ | 6.13979 |
| $\varepsilon =$ | 35 | e= | 0.25 | $\alpha =$ | 0.01 | $p=$ | 6.13913 |
| $\varepsilon =$ | 35 | e= | 0.25 | $\alpha =$ | 0.015 | $p=$ | 6.13846 |
| $\varepsilon =$ | 35 | e= | 0.25 | $\alpha =$ | 0.02 | $p=$ | 6.13779 |
| $\varepsilon =$ | 35 | e= | 0.25 | $\alpha =$ | 0.025 | $p=$ | 6.13713 |
| $\varepsilon =$ | 35 | e= | 0.25 | $\alpha =$ | 0.03 | $p=$ | 6.13646 |
| $\varepsilon =$ | 35 | e= | 0.25 | $\alpha =$ | 0.035 | $p=$ | 6.13579 |
| $\varepsilon =$ | 35 | e= | 0.25 | $\alpha =$ | 0.04 | $p=$ | 6.13513 |

FIG. 5AA

| | | | | | | | |
|---|---|---|---|---|---|---|---|
| $\varepsilon=$ | 35 | e= | 0.25 | $\alpha=$ | 0.045 | $\rho=$ | 6.13446 |
| $\varepsilon=$ | 35 | e= | 0.25 | $\alpha=$ | 0.05 | $\rho=$ | 6.13379 |
| $\varepsilon=$ | 35 | e= | 0.25 | $\alpha=$ | 0.055 | $\rho=$ | 6.13312 |
| $\varepsilon=$ | 35 | e= | 0.25 | $\alpha=$ | 0.06 | $\rho=$ | 6.13245 |
| $\varepsilon=$ | 35 | e= | 0.25 | $\alpha=$ | 0.065 | $\rho=$ | 6.13178 |
| $\varepsilon=$ | 35 | e= | 0.25 | $\alpha=$ | 0.07 | $\rho=$ | 6.13111 |
| $\varepsilon=$ | 35 | e= | 0.25 | $\alpha=$ | 0.075 | $\rho=$ | 6.13044 |
| $\varepsilon=$ | 35 | e= | 0.25 | $\alpha=$ | 0.08 | $\rho=$ | 6.12977 |
| $\varepsilon=$ | 35 | e= | 0.25 | $\alpha=$ | 0.085 | $\rho=$ | 6.1291 |
| $\varepsilon=$ | 35 | e= | 0.25 | $\alpha=$ | 0.09 | $\rho=$ | 6.12843 |
| $\varepsilon=$ | 35 | e= | 0.25 | $\alpha=$ | 0.095 | $\rho=$ | 6.12776 |
| $\varepsilon=$ | 35 | e= | 0.25 | $\alpha=$ | 0.1 | $\rho=$ | 6.12709 |
| $\varepsilon=$ | 35 | e= | 0.3 | $\alpha=$ | 0.005 | $\rho=$ | 6.09338 |
| $\varepsilon=$ | 35 | e= | 0.3 | $\alpha=$ | 0.01 | $\rho=$ | 6.0928 |
| $\varepsilon=$ | 35 | e= | 0.3 | $\alpha=$ | 0.015 | $\rho=$ | 6.09223 |
| $\varepsilon=$ | 35 | e= | 0.3 | $\alpha=$ | 0.02 | $\rho=$ | 6.09165 |
| $\varepsilon=$ | 35 | e= | 0.3 | $\alpha=$ | 0.025 | $\rho=$ | 6.09108 |
| $\varepsilon=$ | 35 | e= | 0.3 | $\alpha=$ | 0.03 | $\rho=$ | 6.0905 |
| $\varepsilon=$ | 35 | e= | 0.3 | $\alpha=$ | 0.035 | $\rho=$ | 6.08993 |
| $\varepsilon=$ | 35 | e= | 0.3 | $\alpha=$ | 0.04 | $\rho=$ | 6.08935 |
| $\varepsilon=$ | 35 | e= | 0.3 | $\alpha=$ | 0.045 | $\rho=$ | 6.08877 |
| $\varepsilon=$ | 35 | e= | 0.3 | $\alpha=$ | 0.05 | $\rho=$ | 6.0882 |
| $\varepsilon=$ | 35 | e= | 0.3 | $\alpha=$ | 0.055 | $\rho=$ | 6.08762 |
| $\varepsilon=$ | 35 | e= | 0.3 | $\alpha=$ | 0.06 | $\rho=$ | 6.08704 |
| $\varepsilon=$ | 35 | e= | 0.3 | $\alpha=$ | 0.065 | $\rho=$ | 6.08646 |
| $\varepsilon=$ | 35 | e= | 0.3 | $\alpha=$ | 0.07 | $\rho=$ | 6.08589 |
| $\varepsilon=$ | 35 | e= | 0.3 | $\alpha=$ | 0.075 | $\rho=$ | 6.08531 |
| $\varepsilon=$ | 35 | e= | 0.3 | $\alpha=$ | 0.08 | $\rho=$ | 6.08473 |
| $\varepsilon=$ | 35 | e= | 0.3 | $\alpha=$ | 0.085 | $\rho=$ | 6.08415 |
| $\varepsilon=$ | 35 | e= | 0.3 | $\alpha=$ | 0.09 | $\rho=$ | 6.08357 |
| $\varepsilon=$ | 35 | e= | 0.3 | $\alpha=$ | 0.095 | $\rho=$ | 6.08299 |
| $\varepsilon=$ | 35 | e= | 0.3 | $\alpha=$ | 0.1 | $\rho=$ | 6.08241 |
| $\varepsilon=$ | 35 | e= | 0.35 | $\alpha=$ | 0.005 | $\rho=$ | 6.05916 |
| $\varepsilon=$ | 35 | e= | 0.35 | $\alpha=$ | 0.01 | $\rho=$ | 6.05866 |
| $\varepsilon=$ | 35 | e= | 0.35 | $\alpha=$ | 0.015 | $\rho=$ | 6.05815 |
| $\varepsilon=$ | 35 | e= | 0.35 | $\alpha=$ | 0.02 | $\rho=$ | 6.05764 |
| $\varepsilon=$ | 35 | e= | 0.35 | $\alpha=$ | 0.025 | $\rho=$ | 6.05714 |
| $\varepsilon=$ | 35 | e= | 0.35 | $\alpha=$ | 0.03 | $\rho=$ | 6.05663 |
| $\varepsilon=$ | 35 | e= | 0.35 | $\alpha=$ | 0.035 | $\rho=$ | 6.05612 |
| $\varepsilon=$ | 35 | e= | 0.35 | $\alpha=$ | 0.04 | $\rho=$ | 6.05562 |
| $\varepsilon=$ | 35 | e= | 0.35 | $\alpha=$ | 0.045 | $\rho=$ | 6.05511 |
| $\varepsilon=$ | 35 | e= | 0.35 | $\alpha=$ | 0.05 | $\rho=$ | 6.0546 |
| $\varepsilon=$ | 35 | e= | 0.35 | $\alpha=$ | 0.055 | $\rho=$ | 6.05409 |
| $\varepsilon=$ | 35 | e= | 0.35 | $\alpha=$ | 0.06 | $\rho=$ | 6.05358 |
| $\varepsilon=$ | 35 | e= | 0.35 | $\alpha=$ | 0.065 | $\rho=$ | 6.05307 |
| $\varepsilon=$ | 35 | e= | 0.35 | $\alpha=$ | 0.07 | $\rho=$ | 6.05257 |
| $\varepsilon=$ | 35 | e= | 0.35 | $\alpha=$ | 0.075 | $\rho=$ | 6.05206 |
| $\varepsilon=$ | 35 | e= | 0.35 | $\alpha=$ | 0.08 | $\rho=$ | 6.05155 |
| $\varepsilon=$ | 35 | e= | 0.35 | $\alpha=$ | 0.085 | $\rho=$ | 6.05104 |
| $\varepsilon=$ | 35 | e= | 0.35 | $\alpha=$ | 0.09 | $\rho=$ | 6.05053 |
| $\varepsilon=$ | 35 | e= | 0.35 | $\alpha=$ | 0.095 | $\rho=$ | 6.05002 |
| $\varepsilon=$ | 35 | e= | 0.35 | $\alpha=$ | 0.1 | $\rho=$ | 6.04951 |
| $\varepsilon=$ | 35 | e= | 0.4 | $\alpha=$ | 0.005 | $\rho=$ | 6.03288 |
| $\varepsilon=$ | 35 | e= | 0.4 | $\alpha=$ | 0.01 | $\rho=$ | 6.03242 |
| $\varepsilon=$ | 35 | e= | 0.4 | $\alpha=$ | 0.015 | $\rho=$ | 6.03197 |

FIG. 5BB

| | | | | | | | |
|---|---|---|---|---|---|---|---|
| $\varepsilon =$ | 35 | $e =$ | 0.4 | $\alpha =$ | 0.02 | $\rho =$ | 6.03152 |
| $\varepsilon =$ | 35 | $e =$ | 0.4 | $\alpha =$ | 0.025 | $\rho =$ | 6.03107 |
| $\varepsilon =$ | 35 | $e =$ | 0.4 | $\alpha =$ | 0.03 | $\rho =$ | 6.03061 |
| $\varepsilon =$ | 35 | $e =$ | 0.4 | $\alpha =$ | 0.035 | $\rho =$ | 6.03016 |
| $\varepsilon =$ | 35 | $e =$ | 0.4 | $\alpha =$ | 0.04 | $\rho =$ | 6.02971 |
| $\varepsilon =$ | 35 | $e =$ | 0.4 | $\alpha =$ | 0.045 | $\rho =$ | 6.02925 |
| $\varepsilon =$ | 35 | $e =$ | 0.4 | $\alpha =$ | 0.05 | $\rho =$ | 6.0288 |
| $\varepsilon =$ | 35 | $e =$ | 0.4 | $\alpha =$ | 0.055 | $\rho =$ | 6.02835 |
| $\varepsilon =$ | 35 | $e =$ | 0.4 | $\alpha =$ | 0.06 | $\rho =$ | 6.02789 |
| $\varepsilon =$ | 35 | $e =$ | 0.4 | $\alpha =$ | 0.065 | $\rho =$ | 6.02744 |
| $\varepsilon =$ | 35 | $e =$ | 0.4 | $\alpha =$ | 0.07 | $\rho =$ | 6.02698 |
| $\varepsilon =$ | 35 | $e =$ | 0.4 | $\alpha =$ | 0.075 | $\rho =$ | 6.02653 |
| $\varepsilon =$ | 35 | $e =$ | 0.4 | $\alpha =$ | 0.08 | $\rho =$ | 6.02607 |
| $\varepsilon =$ | 35 | $e =$ | 0.4 | $\alpha =$ | 0.085 | $\rho =$ | 6.02562 |
| $\varepsilon =$ | 35 | $e =$ | 0.4 | $\alpha =$ | 0.09 | $\rho =$ | 6.02516 |
| $\varepsilon =$ | 35 | $e =$ | 0.4 | $\alpha =$ | 0.095 | $\rho =$ | 6.02471 |
| $\varepsilon =$ | 35 | $e =$ | 0.4 | $\alpha =$ | 0.1 | $\rho =$ | 6.02425 |
| $\varepsilon =$ | 35 | $e =$ | 0.45 | $\alpha =$ | 0.005 | $\rho =$ | 6.01204 |
| $\varepsilon =$ | 35 | $e =$ | 0.45 | $\alpha =$ | 0.01 | $\rho =$ | 6.01163 |
| $\varepsilon =$ | 35 | $e =$ | 0.45 | $\alpha =$ | 0.015 | $\rho =$ | 6.01122 |
| $\varepsilon =$ | 35 | $e =$ | 0.45 | $\alpha =$ | 0.02 | $\rho =$ | 6.01081 |
| $\varepsilon =$ | 35 | $e =$ | 0.45 | $\alpha =$ | 0.025 | $\rho =$ | 6.0104 |
| $\varepsilon =$ | 35 | $e =$ | 0.45 | $\alpha =$ | 0.03 | $\rho =$ | 6.00999 |
| $\varepsilon =$ | 35 | $e =$ | 0.45 | $\alpha =$ | 0.035 | $\rho =$ | 6.00958 |
| $\varepsilon =$ | 35 | $e =$ | 0.45 | $\alpha =$ | 0.04 | $\rho =$ | 6.00917 |
| $\varepsilon =$ | 35 | $e =$ | 0.45 | $\alpha =$ | 0.045 | $\rho =$ | 6.00876 |
| $\varepsilon =$ | 35 | $e =$ | 0.45 | $\alpha =$ | 0.05 | $\rho =$ | 6.00835 |
| $\varepsilon =$ | 35 | $e =$ | 0.45 | $\alpha =$ | 0.055 | $\rho =$ | 6.00794 |
| $\varepsilon =$ | 35 | $e =$ | 0.45 | $\alpha =$ | 0.06 | $\rho =$ | 6.00753 |
| $\varepsilon =$ | 35 | $e =$ | 0.45 | $\alpha =$ | 0.065 | $\rho =$ | 6.00712 |
| $\varepsilon =$ | 35 | $e =$ | 0.45 | $\alpha =$ | 0.07 | $\rho =$ | 6.00671 |
| $\varepsilon =$ | 35 | $e =$ | 0.45 | $\alpha =$ | 0.075 | $\rho =$ | 6.0063 |
| $\varepsilon =$ | 35 | $e =$ | 0.45 | $\alpha =$ | 0.08 | $\rho =$ | 6.00589 |
| $\varepsilon =$ | 35 | $e =$ | 0.45 | $\alpha =$ | 0.085 | $\rho =$ | 6.00548 |
| $\varepsilon =$ | 35 | $e =$ | 0.45 | $\alpha =$ | 0.09 | $\rho =$ | 6.00507 |
| $\varepsilon =$ | 35 | $e =$ | 0.45 | $\alpha =$ | 0.095 | $\rho =$ | 6.00466 |
| $\varepsilon =$ | 35 | $e =$ | 0.45 | $\alpha =$ | 0.1 | $\rho =$ | 6.00425 |
| $\varepsilon =$ | 35 | $e =$ | 0.5 | $\alpha =$ | 0.005 | $\rho =$ | 5.99511 |
| $\varepsilon =$ | 35 | $e =$ | 0.5 | $\alpha =$ | 0.01 | $\rho =$ | 5.99474 |
| $\varepsilon =$ | 35 | $e =$ | 0.5 | $\alpha =$ | 0.015 | $\rho =$ | 5.99437 |
| $\varepsilon =$ | 35 | $e =$ | 0.5 | $\alpha =$ | 0.02 | $\rho =$ | 5.99399 |
| $\varepsilon =$ | 35 | $e =$ | 0.5 | $\alpha =$ | 0.025 | $\rho =$ | 5.99362 |
| $\varepsilon =$ | 35 | $e =$ | 0.5 | $\alpha =$ | 0.03 | $\rho =$ | 5.99325 |
| $\varepsilon =$ | 35 | $e =$ | 0.5 | $\alpha =$ | 0.035 | $\rho =$ | 5.99287 |
| $\varepsilon =$ | 35 | $e =$ | 0.5 | $\alpha =$ | 0.04 | $\rho =$ | 5.9925 |
| $\varepsilon =$ | 35 | $e =$ | 0.5 | $\alpha =$ | 0.045 | $\rho =$ | 5.99213 |
| $\varepsilon =$ | 35 | $e =$ | 0.5 | $\alpha =$ | 0.05 | $\rho =$ | 5.99175 |
| $\varepsilon =$ | 35 | $e =$ | 0.5 | $\alpha =$ | 0.055 | $\rho =$ | 5.99138 |
| $\varepsilon =$ | 35 | $e =$ | 0.5 | $\alpha =$ | 0.06 | $\rho =$ | 5.991 |
| $\varepsilon =$ | 35 | $e =$ | 0.5 | $\alpha =$ | 0.065 | $\rho =$ | 5.99063 |
| $\varepsilon =$ | 35 | $e =$ | 0.5 | $\alpha =$ | 0.07 | $\rho =$ | 5.99025 |
| $\varepsilon =$ | 35 | $e =$ | 0.5 | $\alpha =$ | 0.075 | $\rho =$ | 5.98988 |
| $\varepsilon =$ | 35 | $e =$ | 0.5 | $\alpha =$ | 0.08 | $\rho =$ | 5.9895 |
| $\varepsilon =$ | 35 | $e =$ | 0.5 | $\alpha =$ | 0.085 | $\rho =$ | 5.98913 |
| $\varepsilon =$ | 35 | $e =$ | 0.5 | $\alpha =$ | 0.09 | $\rho =$ | 5.98875 |

FIG. 5CC

| | | | | | | | | |
|---|---|---|---|---|---|---|---|---|
| $\varepsilon =$ | 35 | e= | 0.5 | $\alpha =$ | 0.095 | $\rho =$ | 5.98838 |
| $\varepsilon =$ | 35 | e= | 0.5 | $\alpha =$ | 0.1 | $\rho =$ | 5.988 |
| $\varepsilon =$ | 40 | e= | 0.05 | $\alpha =$ | 0.005 | $\rho =$ | 7.33148 |
| $\varepsilon =$ | 40 | e= | 0.05 | $\alpha =$ | 0.01 | $\rho =$ | 7.32956 |
| $\varepsilon =$ | 40 | e= | 0.05 | $\alpha =$ | 0.015 | $\rho =$ | 7.32763 |
| $\varepsilon =$ | 40 | e= | 0.05 | $\alpha =$ | 0.02 | $\rho =$ | 7.32571 |
| $\varepsilon =$ | 40 | e= | 0.05 | $\alpha =$ | 0.025 | $\rho =$ | 7.32378 |
| $\varepsilon =$ | 40 | e= | 0.05 | $\alpha =$ | 0.03 | $\rho =$ | 7.32185 |
| $\varepsilon =$ | 40 | e= | 0.05 | $\alpha =$ | 0.035 | $\rho =$ | 7.31992 |
| $\varepsilon =$ | 40 | e= | 0.05 | $\alpha =$ | 0.04 | $\rho =$ | 7.31799 |
| $\varepsilon =$ | 40 | e= | 0.05 | $\alpha =$ | 0.045 | $\rho =$ | 7.31605 |
| $\varepsilon =$ | 40 | e= | 0.05 | $\alpha =$ | 0.05 | $\rho =$ | 7.31411 |
| $\varepsilon =$ | 40 | e= | 0.05 | $\alpha =$ | 0.055 | $\rho =$ | 7.31217 |
| $\varepsilon =$ | 40 | e= | 0.05 | $\alpha =$ | 0.06 | $\rho =$ | 7.31023 |
| $\varepsilon =$ | 40 | e= | 0.05 | $\alpha =$ | 0.065 | $\rho =$ | 7.30829 |
| $\varepsilon =$ | 40 | e= | 0.05 | $\alpha =$ | 0.07 | $\rho =$ | 7.30634 |
| $\varepsilon =$ | 40 | e= | 0.05 | $\alpha =$ | 0.075 | $\rho =$ | 7.30439 |
| $\varepsilon =$ | 40 | e= | 0.05 | $\alpha =$ | 0.08 | $\rho =$ | 7.30244 |
| $\varepsilon =$ | 40 | e= | 0.05 | $\alpha =$ | 0.085 | $\rho =$ | 7.30049 |
| $\varepsilon =$ | 40 | e= | 0.05 | $\alpha =$ | 0.09 | $\rho =$ | 7.29853 |
| $\varepsilon =$ | 40 | e= | 0.05 | $\alpha =$ | 0.095 | $\rho =$ | 7.29658 |
| $\varepsilon =$ | 40 | e= | 0.05 | $\alpha =$ | 0.1 | $\rho =$ | 7.29462 |
| $\varepsilon =$ | 40 | e= | 0.1 | $\alpha =$ | 0.005 | $\rho =$ | 6.88382 |
| $\varepsilon =$ | 40 | e= | 0.1 | $\alpha =$ | 0.01 | $\rho =$ | 6.88256 |
| $\varepsilon =$ | 40 | e= | 0.1 | $\alpha =$ | 0.015 | $\rho =$ | 6.8813 |
| $\varepsilon =$ | 40 | e= | 0.1 | $\alpha =$ | 0.02 | $\rho =$ | 6.88004 |
| $\varepsilon =$ | 40 | e= | 0.1 | $\alpha =$ | 0.025 | $\rho =$ | 6.87878 |
| $\varepsilon =$ | 40 | e= | 0.1 | $\alpha =$ | 0.03 | $\rho =$ | 6.87751 |
| $\varepsilon =$ | 40 | e= | 0.1 | $\alpha =$ | 0.035 | $\rho =$ | 6.87625 |
| $\varepsilon =$ | 40 | e= | 0.1 | $\alpha =$ | 0.04 | $\rho =$ | 6.87498 |
| $\varepsilon =$ | 40 | e= | 0.1 | $\alpha =$ | 0.045 | $\rho =$ | 6.87371 |
| $\varepsilon =$ | 40 | e= | 0.1 | $\alpha =$ | 0.05 | $\rho =$ | 6.87244 |
| $\varepsilon =$ | 40 | e= | 0.1 | $\alpha =$ | 0.055 | $\rho =$ | 6.87118 |
| $\varepsilon =$ | 40 | e= | 0.1 | $\alpha =$ | 0.06 | $\rho =$ | 6.8699 |
| $\varepsilon =$ | 40 | e= | 0.1 | $\alpha =$ | 0.065 | $\rho =$ | 6.86863 |
| $\varepsilon =$ | 40 | e= | 0.1 | $\alpha =$ | 0.07 | $\rho =$ | 6.86736 |
| $\varepsilon =$ | 40 | e= | 0.1 | $\alpha =$ | 0.075 | $\rho =$ | 6.86609 |
| $\varepsilon =$ | 40 | e= | 0.1 | $\alpha =$ | 0.08 | $\rho =$ | 6.86481 |
| $\varepsilon =$ | 40 | e= | 0.1 | $\alpha =$ | 0.085 | $\rho =$ | 6.86354 |
| $\varepsilon =$ | 40 | e= | 0.1 | $\alpha =$ | 0.09 | $\rho =$ | 6.86226 |
| $\varepsilon =$ | 40 | e= | 0.1 | $\alpha =$ | 0.095 | $\rho =$ | 6.86098 |
| $\varepsilon =$ | 40 | e= | 0.1 | $\alpha =$ | 0.1 | $\rho =$ | 6.8597 |
| $\varepsilon =$ | 40 | e= | 0.15 | $\alpha =$ | 0.005 | $\rho =$ | 6.70128 |
| $\varepsilon =$ | 40 | e= | 0.15 | $\alpha =$ | 0.01 | $\rho =$ | 6.70033 |
| $\varepsilon =$ | 40 | e= | 0.15 | $\alpha =$ | 0.015 | $\rho =$ | 6.69938 |
| $\varepsilon =$ | 40 | e= | 0.15 | $\alpha =$ | 0.02 | $\rho =$ | 6.69843 |
| $\varepsilon =$ | 40 | e= | 0.15 | $\alpha =$ | 0.025 | $\rho =$ | 6.69748 |
| $\varepsilon =$ | 40 | e= | 0.15 | $\alpha =$ | 0.03 | $\rho =$ | 6.69653 |
| $\varepsilon =$ | 40 | e= | 0.15 | $\alpha =$ | 0.035 | $\rho =$ | 6.69558 |
| $\varepsilon =$ | 40 | e= | 0.15 | $\alpha =$ | 0.04 | $\rho =$ | 6.69463 |
| $\varepsilon =$ | 40 | e= | 0.15 | $\alpha =$ | 0.045 | $\rho =$ | 6.69367 |
| $\varepsilon =$ | 40 | e= | 0.15 | $\alpha =$ | 0.05 | $\rho =$ | 6.69272 |
| $\varepsilon =$ | 40 | e= | 0.15 | $\alpha =$ | 0.055 | $\rho =$ | 6.69176 |
| $\varepsilon =$ | 40 | e= | 0.15 | $\alpha =$ | 0.06 | $\rho =$ | 6.69081 |
| $\varepsilon =$ | 40 | e= | 0.15 | $\alpha =$ | 0.065 | $\rho =$ | 6.68985 |

FIG. 5DD

| | | | | | | |
|---|---|---|---|---|---|---|
| $\varepsilon =$ | 40 | e= | 0.15 | $\alpha =$ | 0.07 | $\rho =$ | 6.6889 |
| $\varepsilon =$ | 40 | e= | 0.15 | $\alpha =$ | 0.075 | $\rho =$ | 6.68794 |
| $\varepsilon =$ | 40 | e= | 0.15 | $\alpha =$ | 0.08 | $\rho =$ | 6.68698 |
| $\varepsilon =$ | 40 | e= | 0.15 | $\alpha =$ | 0.085 | $\rho =$ | 6.68602 |
| $\varepsilon =$ | 40 | e= | 0.15 | $\alpha =$ | 0.09 | $\rho =$ | 6.68506 |
| $\varepsilon =$ | 40 | e= | 0.15 | $\alpha =$ | 0.095 | $\rho =$ | 6.6841 |
| $\varepsilon =$ | 40 | e= | 0.15 | $\alpha =$ | 0.1 | $\rho =$ | 6.68314 |
| $\varepsilon =$ | 40 | e= | 0.2 | $\alpha =$ | 0.005 | $\rho =$ | 6.60073 |
| $\varepsilon =$ | 40 | e= | 0.2 | $\alpha =$ | 0.01 | $\rho =$ | 6.59996 |
| $\varepsilon =$ | 40 | e= | 0.2 | $\alpha =$ | 0.015 | $\rho =$ | 6.5992 |
| $\varepsilon =$ | 40 | e= | 0.2 | $\alpha =$ | 0.02 | $\rho =$ | 6.59843 |
| $\varepsilon =$ | 40 | e= | 0.2 | $\alpha =$ | 0.025 | $\rho =$ | 6.59767 |
| $\varepsilon =$ | 40 | e= | 0.2 | $\alpha =$ | 0.03 | $\rho =$ | 6.5969 |
| $\varepsilon =$ | 40 | e= | 0.2 | $\alpha =$ | 0.035 | $\rho =$ | 6.59614 |
| $\varepsilon =$ | 40 | e= | 0.2 | $\alpha =$ | 0.04 | $\rho =$ | 6.59537 |
| $\varepsilon =$ | 40 | e= | 0.2 | $\alpha =$ | 0.045 | $\rho =$ | 6.59461 |
| $\varepsilon =$ | 40 | e= | 0.2 | $\alpha =$ | 0.05 | $\rho =$ | 6.59384 |
| $\varepsilon =$ | 40 | e= | 0.2 | $\alpha =$ | 0.055 | $\rho =$ | 6.59307 |
| $\varepsilon =$ | 40 | e= | 0.2 | $\alpha =$ | 0.06 | $\rho =$ | 6.5923 |
| $\varepsilon =$ | 40 | e= | 0.2 | $\alpha =$ | 0.065 | $\rho =$ | 6.59154 |
| $\varepsilon =$ | 40 | e= | 0.2 | $\alpha =$ | 0.07 | $\rho =$ | 6.59077 |
| $\varepsilon =$ | 40 | e= | 0.2 | $\alpha =$ | 0.075 | $\rho =$ | 6.59 |
| $\varepsilon =$ | 40 | e= | 0.2 | $\alpha =$ | 0.08 | $\rho =$ | 6.58923 |
| $\varepsilon =$ | 40 | e= | 0.2 | $\alpha =$ | 0.085 | $\rho =$ | 6.58846 |
| $\varepsilon =$ | 40 | e= | 0.2 | $\alpha =$ | 0.09 | $\rho =$ | 6.58769 |
| $\varepsilon =$ | 40 | e= | 0.2 | $\alpha =$ | 0.095 | $\rho =$ | 6.58692 |
| $\varepsilon =$ | 40 | e= | 0.2 | $\alpha =$ | 0.1 | $\rho =$ | 6.58615 |
| $\varepsilon =$ | 40 | e= | 0.25 | $\alpha =$ | 0.005 | $\rho =$ | 6.53676 |
| $\varepsilon =$ | 40 | e= | 0.25 | $\alpha =$ | 0.01 | $\rho =$ | 6.53612 |
| $\varepsilon =$ | 40 | e= | 0.25 | $\alpha =$ | 0.015 | $\rho =$ | 6.53548 |
| $\varepsilon =$ | 40 | e= | 0.25 | $\alpha =$ | 0.02 | $\rho =$ | 6.53484 |
| $\varepsilon =$ | 40 | e= | 0.25 | $\alpha =$ | 0.025 | $\rho =$ | 6.5342 |
| $\varepsilon =$ | 40 | e= | 0.25 | $\alpha =$ | 0.03 | $\rho =$ | 6.53356 |
| $\varepsilon =$ | 40 | e= | 0.25 | $\alpha =$ | 0.035 | $\rho =$ | 6.53292 |
| $\varepsilon =$ | 40 | e= | 0.25 | $\alpha =$ | 0.04 | $\rho =$ | 6.53228 |
| $\varepsilon =$ | 40 | e= | 0.25 | $\alpha =$ | 0.045 | $\rho =$ | 6.53164 |
| $\varepsilon =$ | 40 | e= | 0.25 | $\alpha =$ | 0.05 | $\rho =$ | 6.531 |
| $\varepsilon =$ | 40 | e= | 0.25 | $\alpha =$ | 0.055 | $\rho =$ | 6.53035 |
| $\varepsilon =$ | 40 | e= | 0.25 | $\alpha =$ | 0.06 | $\rho =$ | 6.52971 |
| $\varepsilon =$ | 40 | e= | 0.25 | $\alpha =$ | 0.065 | $\rho =$ | 6.52907 |
| $\varepsilon =$ | 40 | e= | 0.25 | $\alpha =$ | 0.07 | $\rho =$ | 6.52843 |
| $\varepsilon =$ | 40 | e= | 0.25 | $\alpha =$ | 0.075 | $\rho =$ | 6.52778 |
| $\varepsilon =$ | 40 | e= | 0.25 | $\alpha =$ | 0.08 | $\rho =$ | 6.52714 |
| $\varepsilon =$ | 40 | e= | 0.25 | $\alpha =$ | 0.085 | $\rho =$ | 6.52649 |
| $\varepsilon =$ | 40 | e= | 0.25 | $\alpha =$ | 0.09 | $\rho =$ | 6.52585 |
| $\varepsilon =$ | 40 | e= | 0.25 | $\alpha =$ | 0.095 | $\rho =$ | 6.52521 |
| $\varepsilon =$ | 40 | e= | 0.25 | $\alpha =$ | 0.1 | $\rho =$ | 6.52456 |
| $\varepsilon =$ | 40 | e= | 0.3 | $\alpha =$ | 0.005 | $\rho =$ | 6.49241 |
| $\varepsilon =$ | 40 | e= | 0.3 | $\alpha =$ | 0.01 | $\rho =$ | 6.49186 |
| $\varepsilon =$ | 40 | e= | 0.3 | $\alpha =$ | 0.015 | $\rho =$ | 6.49131 |
| $\varepsilon =$ | 40 | e= | 0.3 | $\alpha =$ | 0.02 | $\rho =$ | 6.49076 |
| $\varepsilon =$ | 40 | e= | 0.3 | $\alpha =$ | 0.025 | $\rho =$ | 6.49021 |
| $\varepsilon =$ | 40 | e= | 0.3 | $\alpha =$ | 0.03 | $\rho =$ | 6.48965 |
| $\varepsilon =$ | 40 | e= | 0.3 | $\alpha =$ | 0.035 | $\rho =$ | 6.4891 |
| $\varepsilon =$ | 40 | e= | 0.3 | $\alpha =$ | 0.04 | $\rho =$ | 6.48855 |

FIG. 5EE

| | | | | | | |
|---|---|---|---|---|---|---|
| $\varepsilon =$ | 40 | e= | 0.3 | $\alpha =$ | 0.045 | $\rho =$ | 6.488 |
| $\varepsilon =$ | 40 | e= | 0.3 | $\alpha =$ | 0.05 | $\rho =$ | 6.48745 |
| $\varepsilon =$ | 40 | e= | 0.3 | $\alpha =$ | 0.055 | $\rho =$ | 6.48689 |
| $\varepsilon =$ | 40 | e= | 0.3 | $\alpha =$ | 0.06 | $\rho =$ | 6.48634 |
| $\varepsilon =$ | 40 | e= | 0.3 | $\alpha =$ | 0.065 | $\rho =$ | 6.48579 |
| $\varepsilon =$ | 40 | e= | 0.3 | $\alpha =$ | 0.07 | $\rho =$ | 6.48523 |
| $\varepsilon =$ | 40 | e= | 0.3 | $\alpha =$ | 0.075 | $\rho =$ | 6.48468 |
| $\varepsilon =$ | 40 | e= | 0.3 | $\alpha =$ | 0.08 | $\rho =$ | 6.48413 |
| $\varepsilon =$ | 40 | e= | 0.3 | $\alpha =$ | 0.085 | $\rho =$ | 6.48357 |
| $\varepsilon =$ | 40 | e= | 0.3 | $\alpha =$ | 0.09 | $\rho =$ | 6.48302 |
| $\varepsilon =$ | 40 | e= | 0.3 | $\alpha =$ | 0.095 | $\rho =$ | 6.48246 |
| $\varepsilon =$ | 40 | e= | 0.3 | $\alpha =$ | 0.1 | $\rho =$ | 6.48191 |
| $\varepsilon =$ | 40 | e= | 0.35 | $\alpha =$ | 0.005 | $\rho =$ | 6.45981 |
| $\varepsilon =$ | 40 | e= | 0.35 | $\alpha =$ | 0.01 | $\rho =$ | 6.45933 |
| $\varepsilon =$ | 40 | e= | 0.35 | $\alpha =$ | 0.015 | $\rho =$ | 6.45885 |
| $\varepsilon =$ | 40 | e= | 0.35 | $\alpha =$ | 0.02 | $\rho =$ | 6.45836 |
| $\varepsilon =$ | 40 | e= | 0.35 | $\alpha =$ | 0.025 | $\rho =$ | 6.45788 |
| $\varepsilon =$ | 40 | e= | 0.35 | $\alpha =$ | 0.03 | $\rho =$ | 6.45739 |
| $\varepsilon =$ | 40 | e= | 0.35 | $\alpha =$ | 0.035 | $\rho =$ | 6.45691 |
| $\varepsilon =$ | 40 | e= | 0.35 | $\alpha =$ | 0.04 | $\rho =$ | 6.45642 |
| $\varepsilon =$ | 40 | e= | 0.35 | $\alpha =$ | 0.045 | $\rho =$ | 6.45594 |
| $\varepsilon =$ | 40 | e= | 0.35 | $\alpha =$ | 0.05 | $\rho =$ | 6.45545 |
| $\varepsilon =$ | 40 | e= | 0.35 | $\alpha =$ | 0.055 | $\rho =$ | 6.45497 |
| $\varepsilon =$ | 40 | e= | 0.35 | $\alpha =$ | 0.06 | $\rho =$ | 6.45448 |
| $\varepsilon =$ | 40 | e= | 0.35 | $\alpha =$ | 0.065 | $\rho =$ | 6.454 |
| $\varepsilon =$ | 40 | e= | 0.35 | $\alpha =$ | 0.07 | $\rho =$ | 6.45351 |
| $\varepsilon =$ | 40 | e= | 0.35 | $\alpha =$ | 0.075 | $\rho =$ | 6.45303 |
| $\varepsilon =$ | 40 | e= | 0.35 | $\alpha =$ | 0.08 | $\rho =$ | 6.45254 |
| $\varepsilon =$ | 40 | e= | 0.35 | $\alpha =$ | 0.085 | $\rho =$ | 6.45206 |
| $\varepsilon =$ | 40 | e= | 0.35 | $\alpha =$ | 0.09 | $\rho =$ | 6.45157 |
| $\varepsilon =$ | 40 | e= | 0.35 | $\alpha =$ | 0.095 | $\rho =$ | 6.45108 |
| $\varepsilon =$ | 40 | e= | 0.35 | $\alpha =$ | 0.1 | $\rho =$ | 6.4506 |
| $\varepsilon =$ | 40 | e= | 0.4 | $\alpha =$ | 0.005 | $\rho =$ | 6.43483 |
| $\varepsilon =$ | 40 | e= | 0.4 | $\alpha =$ | 0.01 | $\rho =$ | 6.4344 |
| $\varepsilon =$ | 40 | e= | 0.4 | $\alpha =$ | 0.015 | $\rho =$ | 6.43397 |
| $\varepsilon =$ | 40 | e= | 0.4 | $\alpha =$ | 0.02 | $\rho =$ | 6.43354 |
| $\varepsilon =$ | 40 | e= | 0.4 | $\alpha =$ | 0.025 | $\rho =$ | 6.43311 |
| $\varepsilon =$ | 40 | e= | 0.4 | $\alpha =$ | 0.03 | $\rho =$ | 6.43268 |
| $\varepsilon =$ | 40 | e= | 0.4 | $\alpha =$ | 0.035 | $\rho =$ | 6.43224 |
| $\varepsilon =$ | 40 | e= | 0.4 | $\alpha =$ | 0.04 | $\rho =$ | 6.43181 |
| $\varepsilon =$ | 40 | e= | 0.4 | $\alpha =$ | 0.045 | $\rho =$ | 6.43138 |
| $\varepsilon =$ | 40 | e= | 0.4 | $\alpha =$ | 0.05 | $\rho =$ | 6.43095 |
| $\varepsilon =$ | 40 | e= | 0.4 | $\alpha =$ | 0.055 | $\rho =$ | 6.43051 |
| $\varepsilon =$ | 40 | e= | 0.4 | $\alpha =$ | 0.06 | $\rho =$ | 6.43008 |
| $\varepsilon =$ | 40 | e= | 0.4 | $\alpha =$ | 0.065 | $\rho =$ | 6.42965 |
| $\varepsilon =$ | 40 | e= | 0.4 | $\alpha =$ | 0.07 | $\rho =$ | 6.42922 |
| $\varepsilon =$ | 40 | e= | 0.4 | $\alpha =$ | 0.075 | $\rho =$ | 6.42878 |
| $\varepsilon =$ | 40 | e= | 0.4 | $\alpha =$ | 0.08 | $\rho =$ | 6.42835 |
| $\varepsilon =$ | 40 | e= | 0.4 | $\alpha =$ | 0.085 | $\rho =$ | 6.42792 |
| $\varepsilon =$ | 40 | e= | 0.4 | $\alpha =$ | 0.09 | $\rho =$ | 6.42748 |
| $\varepsilon =$ | 40 | e= | 0.4 | $\alpha =$ | 0.095 | $\rho =$ | 6.42705 |
| $\varepsilon =$ | 40 | e= | 0.4 | $\alpha =$ | 0.1 | $\rho =$ | 6.42662 |
| $\varepsilon =$ | 40 | e= | 0.45 | $\alpha =$ | 0.005 | $\rho =$ | 6.41507 |
| $\varepsilon =$ | 40 | e= | 0.45 | $\alpha =$ | 0.01 | $\rho =$ | 6.41468 |
| $\varepsilon =$ | 40 | e= | 0.45 | $\alpha =$ | 0.015 | $\rho =$ | 6.41429 |

FIG. 5FF

| | | | | | | |
|---|---|---|---|---|---|---|
| $\varepsilon =$ | 40 | e= | 0.45 | $\alpha =$ | 0.02 | $\rho =$ | 6.4139 |
| $\varepsilon =$ | 40 | e= | 0.45 | $\alpha =$ | 0.025 | $\rho =$ | 6.41352 |
| $\varepsilon =$ | 40 | e= | 0.45 | $\alpha =$ | 0.03 | $\rho =$ | 6.41313 |
| $\varepsilon =$ | 40 | e= | 0.45 | $\alpha =$ | 0.035 | $\rho =$ | 6.41274 |
| $\varepsilon =$ | 40 | e= | 0.45 | $\alpha =$ | 0.04 | $\rho =$ | 6.41235 |
| $\varepsilon =$ | 40 | e= | 0.45 | $\alpha =$ | 0.045 | $\rho =$ | 6.41196 |
| $\varepsilon =$ | 40 | e= | 0.45 | $\alpha =$ | 0.05 | $\rho =$ | 6.41157 |
| $\varepsilon =$ | 40 | e= | 0.45 | $\alpha =$ | 0.055 | $\rho =$ | 6.41118 |
| $\varepsilon =$ | 40 | e= | 0.45 | $\alpha =$ | 0.06 | $\rho =$ | 6.41079 |
| $\varepsilon =$ | 40 | e= | 0.45 | $\alpha =$ | 0.065 | $\rho =$ | 6.4104 |
| $\varepsilon =$ | 40 | e= | 0.45 | $\alpha =$ | 0.07 | $\rho =$ | 6.41001 |
| $\varepsilon =$ | 40 | e= | 0.45 | $\alpha =$ | 0.075 | $\rho =$ | 6.40962 |
| $\varepsilon =$ | 40 | e= | 0.45 | $\alpha =$ | 0.08 | $\rho =$ | 6.40922 |
| $\varepsilon =$ | 40 | e= | 0.45 | $\alpha =$ | 0.085 | $\rho =$ | 6.40883 |
| $\varepsilon =$ | 40 | e= | 0.45 | $\alpha =$ | 0.09 | $\rho =$ | 6.40844 |
| $\varepsilon =$ | 40 | e= | 0.45 | $\alpha =$ | 0.095 | $\rho =$ | 6.40805 |
| $\varepsilon =$ | 40 | e= | 0.45 | $\alpha =$ | 0.1 | $\rho =$ | 6.40766 |
| $\varepsilon =$ | 40 | e= | 0.5 | $\alpha =$ | 0.005 | $\rho =$ | 6.39905 |
| $\varepsilon =$ | 40 | e= | 0.5 | $\alpha =$ | 0.01 | $\rho =$ | 6.39869 |
| $\varepsilon =$ | 40 | e= | 0.5 | $\alpha =$ | 0.015 | $\rho =$ | 6.39834 |
| $\varepsilon =$ | 40 | e= | 0.5 | $\alpha =$ | 0.02 | $\rho =$ | 6.39798 |
| $\varepsilon =$ | 40 | e= | 0.5 | $\alpha =$ | 0.025 | $\rho =$ | 6.39763 |
| $\varepsilon =$ | 40 | e= | 0.5 | $\alpha =$ | 0.03 | $\rho =$ | 6.39727 |
| $\varepsilon =$ | 40 | e= | 0.5 | $\alpha =$ | 0.035 | $\rho =$ | 6.39692 |
| $\varepsilon =$ | 40 | e= | 0.5 | $\alpha =$ | 0.04 | $\rho =$ | 6.39656 |
| $\varepsilon =$ | 40 | e= | 0.5 | $\alpha =$ | 0.045 | $\rho =$ | 6.39621 |
| $\varepsilon =$ | 40 | e= | 0.5 | $\alpha =$ | 0.05 | $\rho =$ | 6.39585 |
| $\varepsilon =$ | 40 | e= | 0.5 | $\alpha =$ | 0.055 | $\rho =$ | 6.3955 |
| $\varepsilon =$ | 40 | e= | 0.5 | $\alpha =$ | 0.06 | $\rho =$ | 6.39514 |
| $\varepsilon =$ | 40 | e= | 0.5 | $\alpha =$ | 0.065 | $\rho =$ | 6.39479 |
| $\varepsilon =$ | 40 | e= | 0.5 | $\alpha =$ | 0.07 | $\rho =$ | 6.39443 |
| $\varepsilon =$ | 40 | e= | 0.5 | $\alpha =$ | 0.075 | $\rho =$ | 6.39408 |
| $\varepsilon =$ | 40 | e= | 0.5 | $\alpha =$ | 0.08 | $\rho =$ | 6.39372 |
| $\varepsilon =$ | 40 | e= | 0.5 | $\alpha =$ | 0.085 | $\rho =$ | 6.39336 |
| $\varepsilon =$ | 40 | e= | 0.5 | $\alpha =$ | 0.09 | $\rho =$ | 6.39301 |
| $\varepsilon =$ | 40 | e= | 0.5 | $\alpha =$ | 0.095 | $\rho =$ | 6.39265 |
| $\varepsilon =$ | 40 | e= | 0.5 | $\alpha =$ | 0.1 | $\rho =$ | 6.3923 |
| $\varepsilon =$ | 45 | e= | 0.05 | $\alpha =$ | 0.005 | $\rho =$ | 7.68813 |
| $\varepsilon =$ | 45 | e= | 0.05 | $\alpha =$ | 0.01 | $\rho =$ | 7.68622 |
| $\varepsilon =$ | 45 | e= | 0.05 | $\alpha =$ | 0.015 | $\rho =$ | 7.68431 |
| $\varepsilon =$ | 45 | e= | 0.05 | $\alpha =$ | 0.02 | $\rho =$ | 7.68239 |
| $\varepsilon =$ | 45 | e= | 0.05 | $\alpha =$ | 0.025 | $\rho =$ | 7.68048 |
| $\varepsilon =$ | 45 | e= | 0.05 | $\alpha =$ | 0.03 | $\rho =$ | 7.67856 |
| $\varepsilon =$ | 45 | e= | 0.05 | $\alpha =$ | 0.035 | $\rho =$ | 7.67664 |
| $\varepsilon =$ | 45 | e= | 0.05 | $\alpha =$ | 0.04 | $\rho =$ | 7.67471 |
| $\varepsilon =$ | 45 | e= | 0.05 | $\alpha =$ | 0.045 | $\rho =$ | 7.67279 |
| $\varepsilon =$ | 45 | e= | 0.05 | $\alpha =$ | 0.05 | $\rho =$ | 7.67086 |
| $\varepsilon =$ | 45 | e= | 0.05 | $\alpha =$ | 0.055 | $\rho =$ | 7.66893 |
| $\varepsilon =$ | 45 | e= | 0.05 | $\alpha =$ | 0.06 | $\rho =$ | 7.667 |
| $\varepsilon =$ | 45 | e= | 0.05 | $\alpha =$ | 0.065 | $\rho =$ | 7.66507 |
| $\varepsilon =$ | 45 | e= | 0.05 | $\alpha =$ | 0.07 | $\rho =$ | 7.66313 |
| $\varepsilon =$ | 45 | e= | 0.05 | $\alpha =$ | 0.075 | $\rho =$ | 7.6612 |
| $\varepsilon =$ | 45 | e= | 0.05 | $\alpha =$ | 0.08 | $\rho =$ | 7.65926 |
| $\varepsilon =$ | 45 | e= | 0.05 | $\alpha =$ | 0.085 | $\rho =$ | 7.65731 |
| $\varepsilon =$ | 45 | e= | 0.05 | $\alpha =$ | 0.09 | $\rho =$ | 7.65537 |

FIG. 5GG

| | | | | | | |
|---|---|---|---|---|---|---|
| ε = | 45 | e = | 0.05 | ∝ = | 0.095 | ρ = | 7.65343 |
| ε = | 45 | e = | 0.05 | ∝ = | 0.1 | ρ = | 7.65148 |
| ε = | 45 | e = | 0.1 | ∝ = | 0.005 | ρ = | 7.24704 |
| ε = | 45 | e = | 0.1 | ∝ = | 0.01 | ρ = | 7.2458 |
| ε = | 45 | e = | 0.1 | ∝ = | 0.015 | ρ = | 7.24457 |
| ε = | 45 | e = | 0.1 | ∝ = | 0.02 | ρ = | 7.24333 |
| ε = | 45 | e = | 0.1 | ∝ = | 0.025 | ρ = | 7.24209 |
| ε = | 45 | e = | 0.1 | ∝ = | 0.03 | ρ = | 7.24085 |
| ε = | 45 | e = | 0.1 | ∝ = | 0.035 | ρ = | 7.23961 |
| ε = | 45 | e = | 0.1 | ∝ = | 0.04 | ρ = | 7.23837 |
| ε = | 45 | e = | 0.1 | ∝ = | 0.045 | ρ = | 7.23713 |
| ε = | 45 | e = | 0.1 | ∝ = | 0.05 | ρ = | 7.23588 |
| ε = | 45 | e = | 0.1 | ∝ = | 0.055 | ρ = | 7.23464 |
| ε = | 45 | e = | 0.1 | ∝ = | 0.06 | ρ = | 7.23339 |
| ε = | 45 | e = | 0.1 | ∝ = | 0.065 | ρ = | 7.23215 |
| ε = | 45 | e = | 0.1 | ∝ = | 0.07 | ρ = | 7.2309 |
| ε = | 45 | e = | 0.1 | ∝ = | 0.075 | ρ = | 7.22965 |
| ε = | 45 | e = | 0.1 | ∝ = | 0.08 | ρ = | 7.2284 |
| ε = | 45 | e = | 0.1 | ∝ = | 0.085 | ρ = | 7.22715 |
| ε = | 45 | e = | 0.1 | ∝ = | 0.09 | ρ = | 7.2259 |
| ε = | 45 | e = | 0.1 | ∝ = | 0.095 | ρ = | 7.22465 |
| ε = | 45 | e = | 0.1 | ∝ = | 0.1 | ρ = | 7.22339 |
| ε = | 45 | e = | 0.15 | ∝ = | 0.005 | ρ = | 7.06929 |
| ε = | 45 | e = | 0.15 | ∝ = | 0.01 | ρ = | 7.06837 |
| ε = | 45 | e = | 0.15 | ∝ = | 0.015 | ρ = | 7.06744 |
| ε = | 45 | e = | 0.15 | ∝ = | 0.02 | ρ = | 7.06652 |
| ε = | 45 | e = | 0.15 | ∝ = | 0.025 | ρ = | 7.06559 |
| ε = | 45 | e = | 0.15 | ∝ = | 0.03 | ρ = | 7.06467 |
| ε = | 45 | e = | 0.15 | ∝ = | 0.035 | ρ = | 7.06374 |
| ε = | 45 | e = | 0.15 | ∝ = | 0.04 | ρ = | 7.06282 |
| ε = | 45 | e = | 0.15 | ∝ = | 0.045 | ρ = | 7.06189 |
| ε = | 45 | e = | 0.15 | ∝ = | 0.05 | ρ = | 7.06096 |
| ε = | 45 | e = | 0.15 | ∝ = | 0.055 | ρ = | 7.06004 |
| ε = | 45 | e = | 0.15 | ∝ = | 0.06 | ρ = | 7.05911 |
| ε = | 45 | e = | 0.15 | ∝ = | 0.065 | ρ = | 7.05818 |
| ε = | 45 | e = | 0.15 | ∝ = | 0.07 | ρ = | 7.05725 |
| ε = | 45 | e = | 0.15 | ∝ = | 0.075 | ρ = | 7.05632 |
| ε = | 45 | e = | 0.15 | ∝ = | 0.08 | ρ = | 7.05539 |
| ε = | 45 | e = | 0.15 | ∝ = | 0.085 | ρ = | 7.05446 |
| ε = | 45 | e = | 0.15 | ∝ = | 0.09 | ρ = | 7.05353 |
| ε = | 45 | e = | 0.15 | ∝ = | 0.095 | ρ = | 7.05259 |
| ε = | 45 | e = | 0.15 | ∝ = | 0.1 | ρ = | 7.05166 |
| ε = | 45 | e = | 0.2 | ∝ = | 0.005 | ρ = | 6.97206 |
| ε = | 45 | e = | 0.2 | ∝ = | 0.01 | ρ = | 6.97132 |
| ε = | 45 | e = | 0.2 | ∝ = | 0.015 | ρ = | 6.97058 |
| ε = | 45 | e = | 0.2 | ∝ = | 0.02 | ρ = | 6.96984 |
| ε = | 45 | e = | 0.2 | ∝ = | 0.025 | ρ = | 6.9691 |
| ε = | 45 | e = | 0.2 | ∝ = | 0.03 | ρ = | 6.96836 |
| ε = | 45 | e = | 0.2 | ∝ = | 0.035 | ρ = | 6.96762 |
| ε = | 45 | e = | 0.2 | ∝ = | 0.04 | ρ = | 6.96688 |
| ε = | 45 | e = | 0.2 | ∝ = | 0.045 | ρ = | 6.96614 |
| ε = | 45 | e = | 0.2 | ∝ = | 0.05 | ρ = | 6.9654 |
| ε = | 45 | e = | 0.2 | ∝ = | 0.055 | ρ = | 6.96466 |
| ε = | 45 | e = | 0.2 | ∝ = | 0.06 | ρ = | 6.96392 |
| ε = | 45 | e = | 0.2 | ∝ = | 0.065 | ρ = | 6.96318 |

FIG. 5HH

| | | | | | | |
|---|---|---|---|---|---|---|
| $\varepsilon =$ | 45 | $e =$ | 0.2 | $\alpha =$ | 0.07 | $\rho =$ | 6.96243 |
| $\varepsilon =$ | 45 | $e =$ | 0.2 | $\alpha =$ | 0.075 | $\rho =$ | 6.96169 |
| $\varepsilon =$ | 45 | $e =$ | 0.2 | $\alpha =$ | 0.08 | $\rho =$ | 6.96095 |
| $\varepsilon =$ | 45 | $e =$ | 0.2 | $\alpha =$ | 0.085 | $\rho =$ | 6.9602 |
| $\varepsilon =$ | 45 | $e =$ | 0.2 | $\alpha =$ | 0.09 | $\rho =$ | 6.95946 |
| $\varepsilon =$ | 45 | $e =$ | 0.2 | $\alpha =$ | 0.095 | $\rho =$ | 6.95871 |
| $\varepsilon =$ | 45 | $e =$ | 0.2 | $\alpha =$ | 0.1 | $\rho =$ | 6.95797 |
| $\varepsilon =$ | 45 | $e =$ | 0.25 | $\alpha =$ | 0.005 | $\rho =$ | 6.91051 |
| $\varepsilon =$ | 45 | $e =$ | 0.25 | $\alpha =$ | 0.01 | $\rho =$ | 6.90989 |
| $\varepsilon =$ | 45 | $e =$ | 0.25 | $\alpha =$ | 0.015 | $\rho =$ | 6.90927 |
| $\varepsilon =$ | 45 | $e =$ | 0.25 | $\alpha =$ | 0.02 | $\rho =$ | 6.90866 |
| $\varepsilon =$ | 45 | $e =$ | 0.25 | $\alpha =$ | 0.025 | $\rho =$ | 6.90804 |
| $\varepsilon =$ | 45 | $e =$ | 0.25 | $\alpha =$ | 0.03 | $\rho =$ | 6.90742 |
| $\varepsilon =$ | 45 | $e =$ | 0.25 | $\alpha =$ | 0.035 | $\rho =$ | 6.90681 |
| $\varepsilon =$ | 45 | $e =$ | 0.25 | $\alpha =$ | 0.04 | $\rho =$ | 6.90619 |
| $\varepsilon =$ | 45 | $e =$ | 0.25 | $\alpha =$ | 0.045 | $\rho =$ | 6.90557 |
| $\varepsilon =$ | 45 | $e =$ | 0.25 | $\alpha =$ | 0.05 | $\rho =$ | 6.90495 |
| $\varepsilon =$ | 45 | $e =$ | 0.25 | $\alpha =$ | 0.055 | $\rho =$ | 6.90433 |
| $\varepsilon =$ | 45 | $e =$ | 0.25 | $\alpha =$ | 0.06 | $\rho =$ | 6.90371 |
| $\varepsilon =$ | 45 | $e =$ | 0.25 | $\alpha =$ | 0.065 | $\rho =$ | 6.9031 |
| $\varepsilon =$ | 45 | $e =$ | 0.25 | $\alpha =$ | 0.07 | $\rho =$ | 6.90248 |
| $\varepsilon =$ | 45 | $e =$ | 0.25 | $\alpha =$ | 0.075 | $\rho =$ | 6.90186 |
| $\varepsilon =$ | 45 | $e =$ | 0.25 | $\alpha =$ | 0.08 | $\rho =$ | 6.90124 |
| $\varepsilon =$ | 45 | $e =$ | 0.25 | $\alpha =$ | 0.085 | $\rho =$ | 6.90062 |
| $\varepsilon =$ | 45 | $e =$ | 0.25 | $\alpha =$ | 0.09 | $\rho =$ | 6.9 |
| $\varepsilon =$ | 45 | $e =$ | 0.25 | $\alpha =$ | 0.095 | $\rho =$ | 6.89938 |
| $\varepsilon =$ | 45 | $e =$ | 0.25 | $\alpha =$ | 0.1 | $\rho =$ | 6.89876 |
| $\varepsilon =$ | 45 | $e =$ | 0.3 | $\alpha =$ | 0.005 | $\rho =$ | 6.86797 |
| $\varepsilon =$ | 45 | $e =$ | 0.3 | $\alpha =$ | 0.01 | $\rho =$ | 6.86744 |
| $\varepsilon =$ | 45 | $e =$ | 0.3 | $\alpha =$ | 0.015 | $\rho =$ | 6.86691 |
| $\varepsilon =$ | 45 | $e =$ | 0.3 | $\alpha =$ | 0.02 | $\rho =$ | 6.86638 |
| $\varepsilon =$ | 45 | $e =$ | 0.3 | $\alpha =$ | 0.025 | $\rho =$ | 6.86585 |
| $\varepsilon =$ | 45 | $e =$ | 0.3 | $\alpha =$ | 0.03 | $\rho =$ | 6.86532 |
| $\varepsilon =$ | 45 | $e =$ | 0.3 | $\alpha =$ | 0.035 | $\rho =$ | 6.86479 |
| $\varepsilon =$ | 45 | $e =$ | 0.3 | $\alpha =$ | 0.04 | $\rho =$ | 6.86426 |
| $\varepsilon =$ | 45 | $e =$ | 0.3 | $\alpha =$ | 0.045 | $\rho =$ | 6.86373 |
| $\varepsilon =$ | 45 | $e =$ | 0.3 | $\alpha =$ | 0.05 | $\rho =$ | 6.8632 |
| $\varepsilon =$ | 45 | $e =$ | 0.3 | $\alpha =$ | 0.055 | $\rho =$ | 6.86267 |
| $\varepsilon =$ | 45 | $e =$ | 0.3 | $\alpha =$ | 0.06 | $\rho =$ | 6.86214 |
| $\varepsilon =$ | 45 | $e =$ | 0.3 | $\alpha =$ | 0.065 | $\rho =$ | 6.86161 |
| $\varepsilon =$ | 45 | $e =$ | 0.3 | $\alpha =$ | 0.07 | $\rho =$ | 6.86108 |
| $\varepsilon =$ | 45 | $e =$ | 0.3 | $\alpha =$ | 0.075 | $\rho =$ | 6.86055 |
| $\varepsilon =$ | 45 | $e =$ | 0.3 | $\alpha =$ | 0.08 | $\rho =$ | 6.86001 |
| $\varepsilon =$ | 45 | $e =$ | 0.3 | $\alpha =$ | 0.085 | $\rho =$ | 6.85948 |
| $\varepsilon =$ | 45 | $e =$ | 0.3 | $\alpha =$ | 0.09 | $\rho =$ | 6.85895 |
| $\varepsilon =$ | 45 | $e =$ | 0.3 | $\alpha =$ | 0.095 | $\rho =$ | 6.85842 |
| $\varepsilon =$ | 45 | $e =$ | 0.3 | $\alpha =$ | 0.1 | $\rho =$ | 6.85789 |
| $\varepsilon =$ | 45 | $e =$ | 0.35 | $\alpha =$ | 0.005 | $\rho =$ | 6.83679 |
| $\varepsilon =$ | 45 | $e =$ | 0.35 | $\alpha =$ | 0.01 | $\rho =$ | 6.83632 |
| $\varepsilon =$ | 45 | $e =$ | 0.35 | $\alpha =$ | 0.015 | $\rho =$ | 6.83586 |
| $\varepsilon =$ | 45 | $e =$ | 0.35 | $\alpha =$ | 0.02 | $\rho =$ | 6.8354 |
| $\varepsilon =$ | 45 | $e =$ | 0.35 | $\alpha =$ | 0.025 | $\rho =$ | 6.83493 |
| $\varepsilon =$ | 45 | $e =$ | 0.35 | $\alpha =$ | 0.03 | $\rho =$ | 6.83447 |
| $\varepsilon =$ | 45 | $e =$ | 0.35 | $\alpha =$ | 0.035 | $\rho =$ | 6.834 |
| $\varepsilon =$ | 45 | $e =$ | 0.35 | $\alpha =$ | 0.04 | $\rho =$ | 6.83354 |

FIG. 5II

| | | | | | | | |
|---|---|---|---|---|---|---|---|
| ε= | 45 | e= | 0.35 | ∝= | 0.045 | ρ= | 6.83307 |
| ε= | 45 | e= | 0.35 | ∝= | 0.05 | ρ= | 6.83261 |
| ε= | 45 | e= | 0.35 | ∝= | 0.055 | ρ= | 6.83215 |
| ε= | 45 | e= | 0.35 | ∝= | 0.06 | ρ= | 6.83168 |
| ε= | 45 | e= | 0.35 | ∝= | 0.065 | ρ= | 6.83122 |
| ε= | 45 | e= | 0.35 | ∝= | 0.07 | ρ= | 6.83075 |
| ε= | 45 | e= | 0.35 | ∝= | 0.075 | ρ= | 6.83028 |
| ε= | 45 | e= | 0.35 | ∝= | 0.08 | ρ= | 6.82982 |
| ε= | 45 | e= | 0.35 | ∝= | 0.085 | ρ= | 6.82935 |
| ε= | 45 | e= | 0.35 | ∝= | 0.09 | ρ= | 6.82889 |
| ε= | 45 | e= | 0.35 | ∝= | 0.095 | ρ= | 6.82842 |
| ε= | 45 | e= | 0.35 | ∝= | 0.1 | ρ= | 6.82796 |
| ε= | 45 | e= | 0.4 | ∝= | 0.005 | ρ= | 6.81294 |
| ε= | 45 | e= | 0.4 | ∝= | 0.01 | ρ= | 6.81253 |
| ε= | 45 | e= | 0.4 | ∝= | 0.015 | ρ= | 6.81211 |
| ε= | 45 | e= | 0.4 | ∝= | 0.02 | ρ= | 6.8117 |
| ε= | 45 | e= | 0.4 | ∝= | 0.025 | ρ= | 6.81129 |
| ε= | 45 | e= | 0.4 | ∝= | 0.03 | ρ= | 6.81088 |
| ε= | 45 | e= | 0.4 | ∝= | 0.035 | ρ= | 6.81046 |
| ε= | 45 | e= | 0.4 | ∝= | 0.04 | ρ= | 6.81005 |
| ε= | 45 | e= | 0.4 | ∝= | 0.045 | ρ= | 6.80964 |
| ε= | 45 | e= | 0.4 | ∝= | 0.05 | ρ= | 6.80922 |
| ε= | 45 | e= | 0.4 | ∝= | 0.055 | ρ= | 6.80881 |
| ε= | 45 | e= | 0.4 | ∝= | 0.06 | ρ= | 6.8084 |
| ε= | 45 | e= | 0.4 | ∝= | 0.065 | ρ= | 6.80798 |
| ε= | 45 | e= | 0.4 | ∝= | 0.07 | ρ= | 6.80757 |
| ε= | 45 | e= | 0.4 | ∝= | 0.075 | ρ= | 6.80715 |
| ε= | 45 | e= | 0.4 | ∝= | 0.08 | ρ= | 6.80674 |
| ε= | 45 | e= | 0.4 | ∝= | 0.085 | ρ= | 6.80633 |
| ε= | 45 | e= | 0.4 | ∝= | 0.09 | ρ= | 6.80591 |
| ε= | 45 | e= | 0.4 | ∝= | 0.095 | ρ= | 6.8055 |
| ε= | 45 | e= | 0.4 | ∝= | 0.1 | ρ= | 6.80508 |
| ε= | 45 | e= | 0.45 | ∝= | 0.005 | ρ= | 6.7941 |
| ε= | 45 | e= | 0.45 | ∝= | 0.01 | ρ= | 6.79373 |
| ε= | 45 | e= | 0.45 | ∝= | 0.015 | ρ= | 6.79336 |
| ε= | 45 | e= | 0.45 | ∝= | 0.02 | ρ= | 6.79299 |
| ε= | 45 | e= | 0.45 | ∝= | 0.025 | ρ= | 6.79262 |
| ε= | 45 | e= | 0.45 | ∝= | 0.03 | ρ= | 6.79225 |
| ε= | 45 | e= | 0.45 | ∝= | 0.035 | ρ= | 6.79187 |
| ε= | 45 | e= | 0.45 | ∝= | 0.04 | ρ= | 6.7915 |
| ε= | 45 | e= | 0.45 | ∝= | 0.045 | ρ= | 6.79113 |
| ε= | 45 | e= | 0.45 | ∝= | 0.05 | ρ= | 6.79076 |
| ε= | 45 | e= | 0.45 | ∝= | 0.055 | ρ= | 6.79038 |
| ε= | 45 | e= | 0.45 | ∝= | 0.06 | ρ= | 6.79001 |
| ε= | 45 | e= | 0.45 | ∝= | 0.065 | ρ= | 6.78964 |
| ε= | 45 | e= | 0.45 | ∝= | 0.07 | ρ= | 6.78927 |
| ε= | 45 | e= | 0.45 | ∝= | 0.075 | ρ= | 6.78889 |
| ε= | 45 | e= | 0.45 | ∝= | 0.08 | ρ= | 6.78852 |
| ε= | 45 | e= | 0.45 | ∝= | 0.085 | ρ= | 6.78815 |
| ε= | 45 | e= | 0.45 | ∝= | 0.09 | ρ= | 6.78777 |
| ε= | 45 | e= | 0.45 | ∝= | 0.095 | ρ= | 6.7874 |
| ε= | 45 | e= | 0.45 | ∝= | 0.1 | ρ= | 6.78703 |
| ε= | 45 | e= | 0.5 | ∝= | 0.005 | ρ= | 6.77885 |
| ε= | 45 | e= | 0.5 | ∝= | 0.01 | ρ= | 6.77851 |
| ε= | 45 | e= | 0.5 | ∝= | 0.015 | ρ= | 6.77817 |

FIG. 5JJ

| | | | | | | | |
|---|---|---|---|---|---|---|---|
| $\varepsilon =$ | 45 | e= | 0.5 | $\alpha =$ | 0.02 | $\rho =$ | 6.77784 |
| $\varepsilon =$ | 45 | e= | 0.5 | $\alpha =$ | 0.025 | $\rho =$ | 6.7775 |
| $\varepsilon =$ | 45 | e= | 0.5 | $\alpha =$ | 0.03 | $\rho =$ | 6.77716 |
| $\varepsilon =$ | 45 | e= | 0.5 | $\alpha =$ | 0.035 | $\rho =$ | 6.77682 |
| $\varepsilon =$ | 45 | e= | 0.5 | $\alpha =$ | 0.04 | $\rho =$ | 6.77648 |
| $\varepsilon =$ | 45 | e= | 0.5 | $\alpha =$ | 0.045 | $\rho =$ | 6.77614 |
| $\varepsilon =$ | 45 | e= | 0.5 | $\alpha =$ | 0.05 | $\rho =$ | 6.77581 |
| $\varepsilon =$ | 45 | e= | 0.5 | $\alpha =$ | 0.055 | $\rho =$ | 6.77547 |
| $\varepsilon =$ | 45 | e= | 0.5 | $\alpha =$ | 0.06 | $\rho =$ | 6.77513 |
| $\varepsilon =$ | 45 | e= | 0.5 | $\alpha =$ | 0.065 | $\rho =$ | 6.77479 |
| $\varepsilon =$ | 45 | e= | 0.5 | $\alpha =$ | 0.07 | $\rho =$ | 6.77445 |
| $\varepsilon =$ | 45 | e= | 0.5 | $\alpha =$ | 0.075 | $\rho =$ | 6.77411 |
| $\varepsilon =$ | 45 | e= | 0.5 | $\alpha =$ | 0.08 | $\rho =$ | 6.77377 |
| $\varepsilon =$ | 45 | e= | 0.5 | $\alpha =$ | 0.085 | $\rho =$ | 6.77343 |
| $\varepsilon =$ | 45 | e= | 0.5 | $\alpha =$ | 0.09 | $\rho =$ | 6.77309 |
| $\varepsilon =$ | 45 | e= | 0.5 | $\alpha =$ | 0.095 | $\rho =$ | 6.77275 |
| $\varepsilon =$ | 45 | e= | 0.5 | $\alpha =$ | 0.1 | $\rho =$ | 6.77241 |
| $\varepsilon =$ | 50 | e= | 0.05 | $\alpha =$ | 0.005 | $\rho =$ | 8.02594 |
| $\varepsilon =$ | 50 | e= | 0.05 | $\alpha =$ | 0.01 | $\rho =$ | 8.02404 |
| $\varepsilon =$ | 50 | e= | 0.05 | $\alpha =$ | 0.015 | $\rho =$ | 8.02214 |
| $\varepsilon =$ | 50 | e= | 0.05 | $\alpha =$ | 0.02 | $\rho =$ | 8.02024 |
| $\varepsilon =$ | 50 | e= | 0.05 | $\alpha =$ | 0.025 | $\rho =$ | 8.01834 |
| $\varepsilon =$ | 50 | e= | 0.05 | $\alpha =$ | 0.03 | $\rho =$ | 8.01643 |
| $\varepsilon =$ | 50 | e= | 0.05 | $\alpha =$ | 0.035 | $\rho =$ | 8.01453 |
| $\varepsilon =$ | 50 | e= | 0.05 | $\alpha =$ | 0.04 | $\rho =$ | 8.01262 |
| $\varepsilon =$ | 50 | e= | 0.05 | $\alpha =$ | 0.045 | $\rho =$ | 8.01071 |
| $\varepsilon =$ | 50 | e= | 0.05 | $\alpha =$ | 0.05 | $\rho =$ | 8.00879 |
| $\varepsilon =$ | 50 | e= | 0.05 | $\alpha =$ | 0.055 | $\rho =$ | 8.00688 |
| $\varepsilon =$ | 50 | e= | 0.05 | $\alpha =$ | 0.06 | $\rho =$ | 8.00496 |
| $\varepsilon =$ | 50 | e= | 0.05 | $\alpha =$ | 0.065 | $\rho =$ | 8.00304 |
| $\varepsilon =$ | 50 | e= | 0.05 | $\alpha =$ | 0.07 | $\rho =$ | 8.00112 |
| $\varepsilon =$ | 50 | e= | 0.05 | $\alpha =$ | 0.075 | $\rho =$ | 7.9992 |
| $\varepsilon =$ | 50 | e= | 0.05 | $\alpha =$ | 0.08 | $\rho =$ | 7.99727 |
| $\varepsilon =$ | 50 | e= | 0.05 | $\alpha =$ | 0.085 | $\rho =$ | 7.99535 |
| $\varepsilon =$ | 50 | e= | 0.05 | $\alpha =$ | 0.09 | $\rho =$ | 7.99342 |
| $\varepsilon =$ | 50 | e= | 0.05 | $\alpha =$ | 0.095 | $\rho =$ | 7.99149 |
| $\varepsilon =$ | 50 | e= | 0.05 | $\alpha =$ | 0.1 | $\rho =$ | 7.98955 |
| $\varepsilon =$ | 50 | e= | 0.1 | $\alpha =$ | 0.005 | $\rho =$ | 7.59153 |
| $\varepsilon =$ | 50 | e= | 0.1 | $\alpha =$ | 0.01 | $\rho =$ | 7.59031 |
| $\varepsilon =$ | 50 | e= | 0.1 | $\alpha =$ | 0.015 | $\rho =$ | 7.5891 |
| $\varepsilon =$ | 50 | e= | 0.1 | $\alpha =$ | 0.02 | $\rho =$ | 7.58789 |
| $\varepsilon =$ | 50 | e= | 0.1 | $\alpha =$ | 0.025 | $\rho =$ | 7.58668 |
| $\varepsilon =$ | 50 | e= | 0.1 | $\alpha =$ | 0.03 | $\rho =$ | 7.58546 |
| $\varepsilon =$ | 50 | e= | 0.1 | $\alpha =$ | 0.035 | $\rho =$ | 7.58424 |
| $\varepsilon =$ | 50 | e= | 0.1 | $\alpha =$ | 0.04 | $\rho =$ | 7.58303 |
| $\varepsilon =$ | 50 | e= | 0.1 | $\alpha =$ | 0.045 | $\rho =$ | 7.58181 |
| $\varepsilon =$ | 50 | e= | 0.1 | $\alpha =$ | 0.05 | $\rho =$ | 7.58059 |
| $\varepsilon =$ | 50 | e= | 0.1 | $\alpha =$ | 0.055 | $\rho =$ | 7.57937 |
| $\varepsilon =$ | 50 | e= | 0.1 | $\alpha =$ | 0.06 | $\rho =$ | 7.57815 |
| $\varepsilon =$ | 50 | e= | 0.1 | $\alpha =$ | 0.065 | $\rho =$ | 7.57693 |
| $\varepsilon =$ | 50 | e= | 0.1 | $\alpha =$ | 0.07 | $\rho =$ | 7.57571 |
| $\varepsilon =$ | 50 | e= | 0.1 | $\alpha =$ | 0.075 | $\rho =$ | 7.57449 |
| $\varepsilon =$ | 50 | e= | 0.1 | $\alpha =$ | 0.08 | $\rho =$ | 7.57326 |
| $\varepsilon =$ | 50 | e= | 0.1 | $\alpha =$ | 0.085 | $\rho =$ | 7.57204 |
| $\varepsilon =$ | 50 | e= | 0.1 | $\alpha =$ | 0.09 | $\rho =$ | 7.57081 |

FIG. 5KK

| | | | | | | |
|---|---|---|---|---|---|---|
| $\varepsilon=$ | 50 | $e=$ | 0.25 | $\alpha=$ | 0.07 | $\rho=$ 7.25698 |
| $\varepsilon=$ | 50 | $e=$ | 0.25 | $\alpha=$ | 0.075 | $\rho=$ 7.25638 |
| $\varepsilon=$ | 50 | $e=$ | 0.25 | $\alpha=$ | 0.08 | $\rho=$ 7.25578 |
| $\varepsilon=$ | 50 | $e=$ | 0.25 | $\alpha=$ | 0.085 | $\rho=$ 7.25518 |
| $\varepsilon=$ | 50 | $e=$ | 0.25 | $\alpha=$ | 0.09 | $\rho=$ 7.25458 |
| $\varepsilon=$ | 50 | $e=$ | 0.25 | $\alpha=$ | 0.095 | $\rho=$ 7.25398 |
| $\varepsilon=$ | 50 | $e=$ | 0.25 | $\alpha=$ | 0.1 | $\rho=$ 7.25338 |
| $\varepsilon=$ | 50 | $e=$ | 0.3 | $\alpha=$ | 0.005 | $\rho=$ 7.2238 |
| $\varepsilon=$ | 50 | $e=$ | 0.3 | $\alpha=$ | 0.01 | $\rho=$ 7.22329 |
| $\varepsilon=$ | 50 | $e=$ | 0.3 | $\alpha=$ | 0.015 | $\rho=$ 7.22278 |
| $\varepsilon=$ | 50 | $e=$ | 0.3 | $\alpha=$ | 0.02 | $\rho=$ 7.22227 |
| $\varepsilon=$ | 50 | $e=$ | 0.3 | $\alpha=$ | 0.025 | $\rho=$ 7.22176 |
| $\varepsilon=$ | 50 | $e=$ | 0.3 | $\alpha=$ | 0.03 | $\rho=$ 7.22125 |
| $\varepsilon=$ | 50 | $e=$ | 0.3 | $\alpha=$ | 0.035 | $\rho=$ 7.22074 |
| $\varepsilon=$ | 50 | $e=$ | 0.3 | $\alpha=$ | 0.04 | $\rho=$ 7.22023 |
| $\varepsilon=$ | 50 | $e=$ | 0.3 | $\alpha=$ | 0.045 | $\rho=$ 7.21972 |
| $\varepsilon=$ | 50 | $e=$ | 0.3 | $\alpha=$ | 0.05 | $\rho=$ 7.21921 |
| $\varepsilon=$ | 50 | $e=$ | 0.3 | $\alpha=$ | 0.055 | $\rho=$ 7.2187 |
| $\varepsilon=$ | 50 | $e=$ | 0.3 | $\alpha=$ | 0.06 | $\rho=$ 7.21819 |
| $\varepsilon=$ | 50 | $e=$ | 0.3 | $\alpha=$ | 0.065 | $\rho=$ 7.21768 |
| $\varepsilon=$ | 50 | $e=$ | 0.3 | $\alpha=$ | 0.07 | $\rho=$ 7.21717 |
| $\varepsilon=$ | 50 | $e=$ | 0.3 | $\alpha=$ | 0.075 | $\rho=$ 7.21666 |
| $\varepsilon=$ | 50 | $e=$ | 0.3 | $\alpha=$ | 0.08 | $\rho=$ 7.21614 |
| $\varepsilon=$ | 50 | $e=$ | 0.3 | $\alpha=$ | 0.085 | $\rho=$ 7.21563 |
| $\varepsilon=$ | 50 | $e=$ | 0.3 | $\alpha=$ | 0.09 | $\rho=$ 7.21512 |
| $\varepsilon=$ | 50 | $e=$ | 0.3 | $\alpha=$ | 0.095 | $\rho=$ 7.21461 |
| $\varepsilon=$ | 50 | $e=$ | 0.3 | $\alpha=$ | 0.1 | $\rho=$ 7.2141 |
| $\varepsilon=$ | 50 | $e=$ | 0.35 | $\alpha=$ | 0.005 | $\rho=$ 7.19387 |
| $\varepsilon=$ | 50 | $e=$ | 0.35 | $\alpha=$ | 0.01 | $\rho=$ 7.19342 |
| $\varepsilon=$ | 50 | $e=$ | 0.35 | $\alpha=$ | 0.015 | $\rho=$ 7.19298 |
| $\varepsilon=$ | 50 | $e=$ | 0.35 | $\alpha=$ | 0.02 | $\rho=$ 7.19253 |
| $\varepsilon=$ | 50 | $e=$ | 0.35 | $\alpha=$ | 0.025 | $\rho=$ 7.19209 |
| $\varepsilon=$ | 50 | $e=$ | 0.35 | $\alpha=$ | 0.03 | $\rho=$ 7.19164 |
| $\varepsilon=$ | 50 | $e=$ | 0.35 | $\alpha=$ | 0.035 | $\rho=$ 7.1912 |
| $\varepsilon=$ | 50 | $e=$ | 0.35 | $\alpha=$ | 0.04 | $\rho=$ 7.19075 |
| $\varepsilon=$ | 50 | $e=$ | 0.35 | $\alpha=$ | 0.045 | $\rho=$ 7.1903 |
| $\varepsilon=$ | 50 | $e=$ | 0.35 | $\alpha=$ | 0.05 | $\rho=$ 7.18986 |
| $\varepsilon=$ | 50 | $e=$ | 0.35 | $\alpha=$ | 0.055 | $\rho=$ 7.18941 |
| $\varepsilon=$ | 50 | $e=$ | 0.35 | $\alpha=$ | 0.06 | $\rho=$ 7.18896 |
| $\varepsilon=$ | 50 | $e=$ | 0.35 | $\alpha=$ | 0.065 | $\rho=$ 7.18852 |
| $\varepsilon=$ | 50 | $e=$ | 0.35 | $\alpha=$ | 0.07 | $\rho=$ 7.18807 |
| $\varepsilon=$ | 50 | $e=$ | 0.35 | $\alpha=$ | 0.075 | $\rho=$ 7.18762 |
| $\varepsilon=$ | 50 | $e=$ | 0.35 | $\alpha=$ | 0.08 | $\rho=$ 7.18717 |
| $\varepsilon=$ | 50 | $e=$ | 0.35 | $\alpha=$ | 0.085 | $\rho=$ 7.18673 |
| $\varepsilon=$ | 50 | $e=$ | 0.35 | $\alpha=$ | 0.09 | $\rho=$ 7.18628 |
| $\varepsilon=$ | 50 | $e=$ | 0.35 | $\alpha=$ | 0.095 | $\rho=$ 7.18583 |
| $\varepsilon=$ | 50 | $e=$ | 0.35 | $\alpha=$ | 0.1 | $\rho=$ 7.18538 |
| $\varepsilon=$ | 50 | $e=$ | 0.4 | $\alpha=$ | 0.005 | $\rho=$ 7.17102 |
| $\varepsilon=$ | 50 | $e=$ | 0.4 | $\alpha=$ | 0.01 | $\rho=$ 7.17062 |
| $\varepsilon=$ | 50 | $e=$ | 0.4 | $\alpha=$ | 0.015 | $\rho=$ 7.17022 |
| $\varepsilon=$ | 50 | $e=$ | 0.4 | $\alpha=$ | 0.02 | $\rho=$ 7.16983 |
| $\varepsilon=$ | 50 | $e=$ | 0.4 | $\alpha=$ | 0.025 | $\rho=$ 7.16943 |
| $\varepsilon=$ | 50 | $e=$ | 0.4 | $\alpha=$ | 0.03 | $\rho=$ 7.16904 |
| $\varepsilon=$ | 50 | $e=$ | 0.4 | $\alpha=$ | 0.035 | $\rho=$ 7.16864 |
| $\varepsilon=$ | 50 | $e=$ | 0.4 | $\alpha=$ | 0.04 | $\rho=$ 7.16824 |

FIG. 5LL

| | | | | | | | |
|---|---|---|---|---|---|---|---|
| $\varepsilon =$ | 50 | e= | 0.4 | $\alpha =$ | 0.045 | $\rho =$ | 7.16785 |
| $\varepsilon =$ | 50 | e= | 0.4 | $\alpha =$ | 0.05 | $\rho =$ | 7.16745 |
| $\varepsilon =$ | 50 | e= | 0.4 | $\alpha =$ | 0.055 | $\rho =$ | 7.16705 |
| $\varepsilon =$ | 50 | e= | 0.4 | $\alpha =$ | 0.06 | $\rho =$ | 7.16666 |
| $\varepsilon =$ | 50 | e= | 0.4 | $\alpha =$ | 0.065 | $\rho =$ | 7.16626 |
| $\varepsilon =$ | 50 | e= | 0.4 | $\alpha =$ | 0.07 | $\rho =$ | 7.16586 |
| $\varepsilon =$ | 50 | e= | 0.4 | $\alpha =$ | 0.075 | $\rho =$ | 7.16546 |
| $\varepsilon =$ | 50 | e= | 0.4 | $\alpha =$ | 0.08 | $\rho =$ | 7.16507 |
| $\varepsilon =$ | 50 | e= | 0.4 | $\alpha =$ | 0.085 | $\rho =$ | 7.16467 |
| $\varepsilon =$ | 50 | e= | 0.4 | $\alpha =$ | 0.09 | $\rho =$ | 7.16427 |
| $\varepsilon =$ | 50 | e= | 0.4 | $\alpha =$ | 0.095 | $\rho =$ | 7.16387 |
| $\varepsilon =$ | 50 | e= | 0.4 | $\alpha =$ | 0.1 | $\rho =$ | 7.16348 |
| $\varepsilon =$ | 50 | e= | 0.45 | $\alpha =$ | 0.005 | $\rho =$ | 7.15299 |
| $\varepsilon =$ | 50 | e= | 0.45 | $\alpha =$ | 0.01 | $\rho =$ | 7.15264 |
| $\varepsilon =$ | 50 | e= | 0.45 | $\alpha =$ | 0.015 | $\rho =$ | 7.15228 |
| $\varepsilon =$ | 50 | e= | 0.45 | $\alpha =$ | 0.02 | $\rho =$ | 7.15192 |
| $\varepsilon =$ | 50 | e= | 0.45 | $\alpha =$ | 0.025 | $\rho =$ | 7.15157 |
| $\varepsilon =$ | 50 | e= | 0.45 | $\alpha =$ | 0.03 | $\rho =$ | 7.15121 |
| $\varepsilon =$ | 50 | e= | 0.45 | $\alpha =$ | 0.035 | $\rho =$ | 7.15085 |
| $\varepsilon =$ | 50 | e= | 0.45 | $\alpha =$ | 0.04 | $\rho =$ | 7.1505 |
| $\varepsilon =$ | 50 | e= | 0.45 | $\alpha =$ | 0.045 | $\rho =$ | 7.15014 |
| $\varepsilon =$ | 50 | e= | 0.45 | $\alpha =$ | 0.05 | $\rho =$ | 7.14978 |
| $\varepsilon =$ | 50 | e= | 0.45 | $\alpha =$ | 0.055 | $\rho =$ | 7.14943 |
| $\varepsilon =$ | 50 | e= | 0.45 | $\alpha =$ | 0.06 | $\rho =$ | 7.14907 |
| $\varepsilon =$ | 50 | e= | 0.45 | $\alpha =$ | 0.065 | $\rho =$ | 7.14871 |
| $\varepsilon =$ | 50 | e= | 0.45 | $\alpha =$ | 0.07 | $\rho =$ | 7.14835 |
| $\varepsilon =$ | 50 | e= | 0.45 | $\alpha =$ | 0.075 | $\rho =$ | 7.148 |
| $\varepsilon =$ | 50 | e= | 0.45 | $\alpha =$ | 0.08 | $\rho =$ | 7.14764 |
| $\varepsilon =$ | 50 | e= | 0.45 | $\alpha =$ | 0.085 | $\rho =$ | 7.14728 |
| $\varepsilon =$ | 50 | e= | 0.45 | $\alpha =$ | 0.09 | $\rho =$ | 7.14692 |
| $\varepsilon =$ | 50 | e= | 0.45 | $\alpha =$ | 0.095 | $\rho =$ | 7.14657 |
| $\varepsilon =$ | 50 | e= | 0.45 | $\alpha =$ | 0.1 | $\rho =$ | 7.14621 |
| $\varepsilon =$ | 50 | e= | 0.5 | $\alpha =$ | 0.005 | $\rho =$ | 7.13841 |
| $\varepsilon =$ | 50 | e= | 0.5 | $\alpha =$ | 0.01 | $\rho =$ | 7.13809 |
| $\varepsilon =$ | 50 | e= | 0.5 | $\alpha =$ | 0.015 | $\rho =$ | 7.13776 |
| $\varepsilon =$ | 50 | e= | 0.5 | $\alpha =$ | 0.02 | $\rho =$ | 7.13744 |
| $\varepsilon =$ | 50 | e= | 0.5 | $\alpha =$ | 0.025 | $\rho =$ | 7.13711 |
| $\varepsilon =$ | 50 | e= | 0.5 | $\alpha =$ | 0.03 | $\rho =$ | 7.13679 |
| $\varepsilon =$ | 50 | e= | 0.5 | $\alpha =$ | 0.035 | $\rho =$ | 7.13647 |
| $\varepsilon =$ | 50 | e= | 0.5 | $\alpha =$ | 0.04 | $\rho =$ | 7.13614 |
| $\varepsilon =$ | 50 | e= | 0.5 | $\alpha =$ | 0.045 | $\rho =$ | 7.13582 |
| $\varepsilon =$ | 50 | e= | 0.5 | $\alpha =$ | 0.05 | $\rho =$ | 7.13549 |
| $\varepsilon =$ | 50 | e= | 0.5 | $\alpha =$ | 0.055 | $\rho =$ | 7.13517 |
| $\varepsilon =$ | 50 | e= | 0.5 | $\alpha =$ | 0.06 | $\rho =$ | 7.13484 |
| $\varepsilon =$ | 50 | e= | 0.5 | $\alpha =$ | 0.065 | $\rho =$ | 7.13452 |
| $\varepsilon =$ | 50 | e= | 0.5 | $\alpha =$ | 0.07 | $\rho =$ | 7.13419 |
| $\varepsilon =$ | 50 | e= | 0.5 | $\alpha =$ | 0.075 | $\rho =$ | 7.13387 |
| $\varepsilon =$ | 50 | e= | 0.5 | $\alpha =$ | 0.08 | $\rho =$ | 7.13354 |
| $\varepsilon =$ | 50 | e= | 0.5 | $\alpha =$ | 0.085 | $\rho =$ | 7.13322 |
| $\varepsilon =$ | 50 | e= | 0.5 | $\alpha =$ | 0.09 | $\rho =$ | 7.13289 |
| $\varepsilon =$ | 50 | e= | 0.5 | $\alpha =$ | 0.095 | $\rho =$ | 7.13257 |
| $\varepsilon =$ | 50 | e= | 0.5 | $\alpha =$ | 0.1 | $\rho =$ | 7.13224 |

INTERCONNECTED OPTICAL DEVICES HAVING ENHANCED RELIABILITY

FIELD OF THE INVENTION

This invention relates to optical devices and, in particular, to optical devices comprising two or more device components interconnected by optical fiber. It provides a structure for enhancing the reliability and quality of the fiber interconnection.

BACKGROUND OF THE INVENTION

A variety of devices used in optical systems comprise two or more device components interconnected by optical fiber. For example, a light source, such as a laser, may require a dedicated fiber connection to a polarizer, filter, attenuator, modulator or amplifier. In optical communication systems many applications of such devices, e.g. undersea cable, require an interconnection that is highly reliable and high in optical quality.

A typical interconnected optical device comprises a pair of device components, such as an LED and a filter, interconnected by an optical fiber. The optical fiber comprises a glass optical fiber waveguide typically covered with an outer polymer coating. In the present practice, the polymer coating has a thickness equal to the radius of the glass waveguide, i.e. if $r_0$ is the radius of the glass waveguide and $r_1$ is the radius of the coated waveguide, then the coating thickness $t=r_1-r_0$. The coated fiber is typically enclosed within a protective capillary tube extending between the device components.

The device is fabricated by bonding and/or soldering at elevated temperatures. The fiber is bonded between the device components at elevated temperature and then permitted to cool to ambient temperature.

A problem that reduces the reliability and quality of interconnected optical devices arises from the tendency of the fiber to buckle within the tube. The material of the tube typically has a higher coefficient of thermal expansion (CTE) than the glass of fiber, with the consequence that after cooling from fabrication at elevated temperature, the fiber is placed under compressive stress. This compressive stress can produce buckling of the fiber within the interior of the tube. The buckling increases the risk of fiber fracture and the induced curvature deteriorates the quality of the fiber as a waveguide. Accordingly, there is a need for interconnected optical devices of enhanced reliability and interconnection quality.

SUMMARY OF THE INVENTION

This invention is predicated on applicant's discovery that the conventional polymer coatings are often too thin to prevent buckling and subsequent bending of optical interconnection fiber, and that this buckling and bending can be eliminated by increasing the thickness of the fiber polymer coating. Applicant has further discovered that a thicker coating insufficient to prevent buckling, reduces stress should buckling occur, thereby still improving the reliability and quality of the waveguide. The optimal (minimum) polymer thickness for buckling prevention can be calculated in terms of the properties of the fiber, the coefficient of thermal expansion (contraction) of the tube materials and the thermal history of the device. Increased thicknesses less than this optimal thickness can nonetheless reduce stress should buckling occur.

BRIEF DESCRIPTION OF THE DRAWINGS

The advantages, nature and various additional features of the invention will appear more fully upon consideration of the illustrative embodiments now to be described in connection with the accompanying drawings. In the drawings:

FIG. 3 illustrates a fiber bent by a compressive displacement;

FIG. 4 is a Table of Critical Strains and Stresses; and

FIG. 5 is a Table showing the value of $\rho$ for a variety of device parameters.

It is to be understood that these drawings are for purposes of illustrating the concepts of the invention and are not to scale.

DETAILED DESCRIPTION

This disclosure is divided into two parts. Part I describes an interconnected device of enhanced reliability and quality; and Part II presents the underlying theory.

I. Enhanced Device

Figure 1:
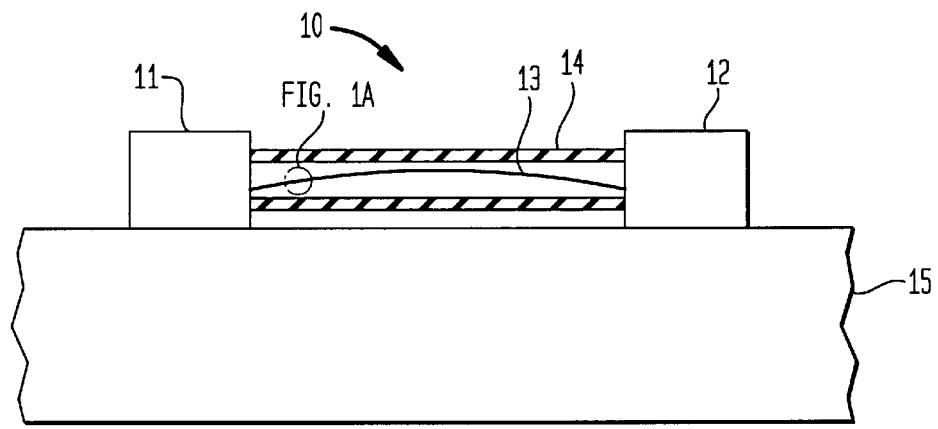
FIGS. 1 and 1A show a schematic cross section of an interconnected optical device in accordance with the invention.
Figure 1A:
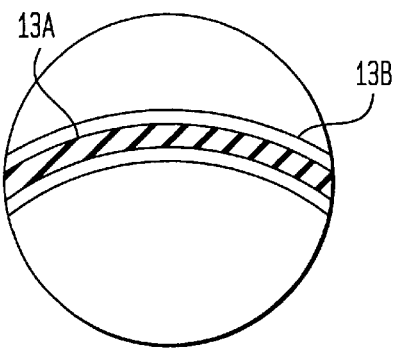

FIG. 1 illustrates an optical device 10 in accordance with the invention comprising a first and second device components 11, 12 interconnected by a polymer-coated optical fiber 13. The fiber 13 typically comprises a glass optical fiber waveguide 13A and an outer polymeric coating 13D. The fiber 13 is typically enclosed in a protective microcapillary hollow tube 14 extending between device components 11, 12. The device components 11, 12 are typically mounted on a common support substrate 15.

Device 10 is fabricated by bonding and/or soldering at elevated temperatures. The fiber 13 is bonded between device components 11, 12, and tube 14 is bonded to the components. The fiber couples the optical output of one component, e.g. 11 to the optical input of the other, e.g. 12.

Figure 2:
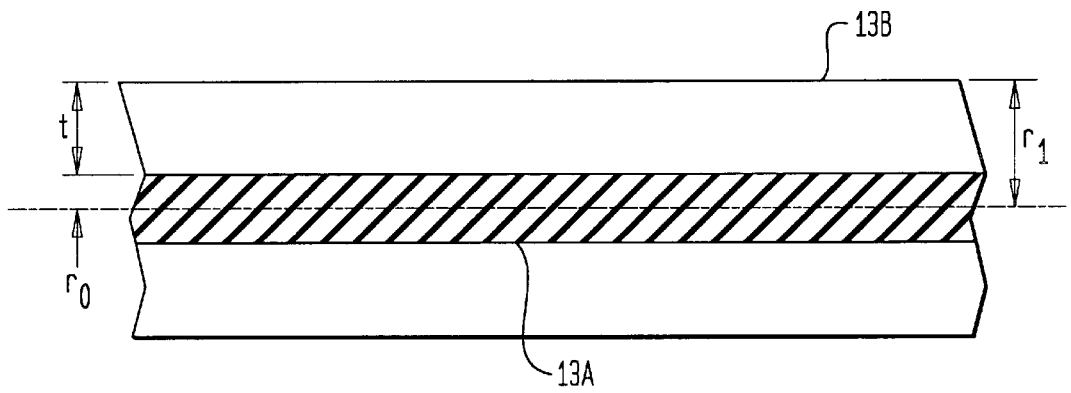
FIG. 2 is an enlarged cross section of coated fiber.

The improved device 10 is similar to conventional interconnected optical devices except that the thickness t of outer polymeric coating is larger than the thickness of conventional polymeric coatings. FIG. 2 is an enlarged cross section of fiber 13 illustrating the glass fiber radius $r_0$, the coated fiber radius $r_1$ and the polymer thickness $t=r_1-r_0$. Applicant has analyzed the conventional devices and determined that conventional polymeric coating thicknesses ($t=r_0$) are often inadequate to prevent buckling or to reduce postbuckling stress to acceptable low levels. This effect is not obvious because the Young's modulus of the coating polymer is typically very low compared to that of glass.

Applicant's analysis permits calculation of an optimal polymer thickness which is the minimum thickness that precludes buckling. This is useful because thicker coatings are more difficult to cure, and thinner coatings will not preclude buckling. In accordance with the analysis, the optimal polymer thickness is $t=r_1-r_0=r_0(\rho-1)$ where $r_0$ is the radius of the glass fiber $r_1$ is the radius of the coated fiber and $\rho=r_1/r_0$ is the radii ratio calculated by the formula:

$$\rho = \sqrt{\frac{\xi}{2}\left\{1 + \sqrt{1 + \left(\frac{2}{\xi}\right)^2\left[(\xi-1)\left(\frac{1}{e}-1\right) - \frac{\alpha_*}{e}\left(\frac{\xi}{2}-1\right)\right]}\right\}}$$

In the formula $\xi=\epsilon_c/\epsilon_0^*$ where $\epsilon_c$ is the critical strain (i.e. strain at the buckling condition) for the coated fiber and $\epsilon_0^*$ is the critical strain for the base fiber;

$e=E_1/E_0$ is the moduli ratio, where $E_1$ is the Young's modulus of the polymer coating material and $E_0$ is the Young's modulus of the glass;

$\alpha^* = \alpha \epsilon_c$ where $\alpha$ is the coefficient of nonlinearity of the glass strain-strain relationship.

As shown in the example below, for typical materials used, the required polymer thickness is greater than the conventional thickness by a factor of 2.75 ($t = 2.75\ r_0$). To prevent buckling, the polymer coating should be increased from the conventional 62.5 $\mu$m to about 172 $\mu$m.

Applicant's analysis further shows that one may obtain important benefits from increasing the polymer thickness even if the thickness is not increased to the thickness needed to preclude buckling. Suboptimal increases in polymer thickness, while not precluding buckling, still reduce the postbuckling stress on the glass waveguide and thereby enhance the quality and reliability of the fiber connection. For a significant reduction in postbuckling stress in typical applications, the thickness of a typical polymer coating should be increased by a factor in excess of about 1.25 ($t \geq 1.25\ r_0$). So for a standard 125 $\mu$m diameter coated optical fiber, the thickness of the polymer coating should be increased from the conventional 62.5 $\mu$m to a thickness of more than 78 $\mu$m. Thus thicknesses $t$ in the range $1.25\ r_0 \leq t < 2.75\ r_0$ are useful in reducing postbuckling stress.

II Underlying Theory

The analysis which follows develops a model for the evaluation of the critical (buckling) strain and the postbuckling stress in a polymerically coated silica glass fiber interconnect subjected to axial compression. This model can be used to determine the effects of the coating layer and the nonlinear stress-strain relationship in the silica material on the critical strain (displacement) and the postbuckling stress in the glass fiber. Based on the obtained data, there is sufficient incentive to employ polymer coatings thicker than the standard ones to provide larger critical strain (bring down the buckling temperature) and lower stress in the glass fiber if buckling still occurs.

A Critical Strain

Let a polymer coated optical fiber interconnect be subjected to an axial compressive displacement, $\delta_t$, which exceeds the critical (buckling) displacement, $\delta_c$, for this fiber. The critical displacement can be found from the following equation of bending of the interconnect in the postbuckling mode:

$$EIw^{IV}(x) + Tw''(x) = 0. \tag{1}$$

Here $w(x)$ is the deflection function, EI is the flexural rigidity of the coated fiber, and T is the compressive force. The origin of the coordinate x is at the left end of the interconnect (FIG. 1). The interconnect is assumed clamped at the ends.

In the analysis which follows, we take into consideration the nonlinear relationship $$\sigma = E_0\left(\varepsilon - \frac{1}{2}\alpha\varepsilon^2\right) \tag{2}$$

between the stress, $\delta$, and the strain, $\epsilon$, in the silica material, subjected to compression. In the formula (2), $E_0$ is Young's modulus of the silica material at low strains, and $\alpha$ is the parameter of nonlinearity. Typically, $E_0 = 10.5 \times 10^6$ psi $= 7384$ kg/mm$^2$, and $\alpha = 6$. From (2) the following expression for Young's modulus at finite strain level can be obtained:

$$\tilde{E}_0 = \frac{d\sigma}{d\varepsilon} = E_0(1 - \alpha\varepsilon). \tag{3}$$

The formulas (2) and (3) lead to the following expressions for the flexural rigidity, EI, of the coated fiber and the total compressive force, T:

$$EI = \frac{\pi}{4}E_0(1-\alpha\varepsilon)r_0^4 + \frac{\pi}{4}E_1(r_1^4 - r_0^4) = \frac{\pi}{4}E_0 r_0^4[1 + e(\rho^4 - 1) - \alpha\varepsilon], \tag{4}$$

$$T = \pi E_0\left(\varepsilon - \frac{1}{2}\alpha\varepsilon^2\right)r_0^2 + \pi E_1(r_1^2 - r_0^2) = \pi E_0 r_0^2 \varepsilon\left[1 + e(\rho^4 - 1) - \frac{1}{2}\alpha\varepsilon\right]. \tag{5}$$

Here $r_0$ is the radius of the glass fiber, $r_1$ is the outer radius of its coating, and $$\rho = \frac{r_1}{r_0}, \tag{6}$$

$$e = \frac{E_1}{E_0}$$

are the radii ratio and Young's moduli ratio, respectively.

The equation (1) can be written as $$w^{IV}(x) + k^2 w''(x) = 0, \tag{7}$$

where the eigenvalue, k is related to the induced strain, $\epsilon$, as follows:

$$k = \sqrt{\frac{T}{EI}} = \frac{2}{r_0}\sqrt{\varepsilon 1 + e(\rho^2 - 1) - \frac{\frac{1}{2}\alpha\varepsilon}{1 + e(\rho^4 - 1) - \alpha\varepsilon}}. \tag{8}$$

We assume that the postbuckling curvature of the fiber is small, and therefore the shift (in the radial direction) in the neutral axis of the buckled fiber is small as well. Therefore the flexural rigidity, EI, and, hence, the k value, do not change along the interconnect and can be considered constant (although strain dependent).

The solution to the equation (7) can be sought in the form:

$$w(x) = C_0 + C_1 kx + C_2\cos kx + C_3\sin kx, \tag{9}$$

where $C_0$, $C_1$, $C_2$ and $C_3$ are constants of integration. The boundary conditions $$w(0) = 0, w'(0) = 0$$

at the origin (x=0) yield: $C_2 = -C_0$, $C_3 = -C_1$, and therefore $$w(x) = C_0(1 - \cos kx) + C_1(kx - \sin kx). \tag{10}$$

The conditions $$w(l) = 0, w'(l) = 0$$

at the right end (x=l) of the interconnect result in the equations:

$$\begin{aligned}(1 - \cos u)C_0 + (u - \sin u)C_1 &= 0 \\ (\sin u)C_0 + (1 - \cos u)C_1 &= 0\end{aligned}, \tag{11}$$

where $$u = kl = l\sqrt{\frac{T}{EI}} = 2\frac{l}{r_0}\sqrt{\varepsilon 1 + e(\rho^2 - 1) - \frac{\frac{1}{2}\alpha\varepsilon}{1 + e(\rho^4 - 1) - \alpha\varepsilon}} \quad (12)$$

is the parameter of the compressive force, T. In order that at least one of the constants $C_0$ and $C_1$ be nonzero, the determinant of the system of the equations (11) should be equal to zero. This leads to the following transcendental equation for the parameter u:

$$2(1-\cos u) - u\sin u = 0$$

The lowest nonzero root of this equation is $$u = 2\pi. \quad (13)$$

With this u value, the second equation in (11) is fulfilled for any $C_0$ and $C_1$ values, and the first equation yields: $2\pi C_1 = 0$. Hence, $C_1 = 0$.

From (12) and (13) we find:

$$k = \frac{2\pi}{l}, \quad (14)$$

so that $$\varepsilon_0^* = \left(\frac{\pi r_0}{l}\right)^2 = \varepsilon_c \frac{1 + e(\rho^2 - 1) - \frac{1}{2}\alpha\varepsilon_c}{1 + e(\rho^4 - 1) - \alpha\varepsilon_c}. \quad (15)$$

Here $\varepsilon_0^*$ is the critical strain for a bare interconnect, assuming linear stress-strain relationship in the silica material, and $\varepsilon = \varepsilon_c$ is the critical strain in a coated interconnect, with consideration of the nonlinear stress-strain relationship. The solution (10), with the formula (14) for the k value and with $C_1 = 0$, results in the following formula for the elastic curve of the buckled interconnect:

$$w(x) = C_0\left(1 - \cos 2\pi \frac{x}{l}\right). \quad (16)$$

The expression (15) results in the following equation for the critical strain, $\varepsilon_c$:

$$\varepsilon_c^2 - 2\frac{1 + \alpha_A \varepsilon_0^*}{\alpha_A}\varepsilon_c + 2\frac{\varepsilon_0^*}{\alpha_I} = 0, \quad (17)$$

where $$\alpha_A = \frac{\alpha}{1 + e(\rho^2 - 1)}, \quad (18)$$

$$\alpha_I = \frac{\alpha}{1 + e(\rho^4 - 1)}$$

are the parameters of nonlinearity with respect to the axial and bending deformations, respectively. The solution to the equation (17) is $$\varepsilon_c = \frac{1}{\alpha_A}\left(1 - \sqrt{1 - 2\frac{\varepsilon_0^*}{\alpha_I}\bar{\alpha}_A^2}\right), \quad (19)$$

where the following notation is used:

$$\bar{\alpha}_A = \frac{\alpha_A}{1 + \alpha_A \varepsilon_0^*}. \quad (20)$$

When the parameter $\alpha$ of nonlinearity is small, the second term under the square root in (19) is small as well, and the formula (19) results in the following expression for the linear critical strain in a coated fiber (i.e. for the strain obtained assuming linear stress-strain relationship in the silica material):

$$\varepsilon_c = \varepsilon^* \cong \frac{\alpha_A}{\alpha_I}\varepsilon_0^* = \eta\varepsilon_0^*. \quad (21)$$

Here the factor $$\eta = \frac{\alpha_A}{\alpha_I} = \frac{1 + e(\rho^4 - 1)}{1 + e(\rho^2 - 1)} \quad (22)$$

considers the effect of the coating material on the linear critical strain, $\varepsilon_c = \varepsilon^*$. With the equation (21) for this strain, the formula (19) for the nonlinear critical strain can be written as follows:

$$\varepsilon_c = \frac{1 - \sqrt{1 - 2\bar{\alpha}_A \varepsilon^*}}{\bar{\alpha}_A}. \quad (23)$$

Clearly, the strain $\varepsilon_c$ trends to $\varepsilon^*$ where the parameter $\bar{\alpha}_A$ trends to zero.

The compressive stress in the glass fiber at the buckling condition can be found, for the determined strain, $\varepsilon_c$, on the basis of the formula (2). This results in the formula $$\sigma_c = E_0\left(\varepsilon_c - \frac{1}{2}\alpha\varepsilon_c^2\right). \quad (24)$$

B. Postbuckling Stress

FIG. 3 illustrates a fiber 13 of span l bent to a maximum displacement $W_0$ by a compressive displacement $\delta_r$. The lengths of the buckled interconnect can be found from (16), assuming small deflections, as follows:

$$s = \int_0^l \sqrt{1 + ([w'(x)])^2} \cong \int_0^l \left(1 + \frac{1}{2}[w'(x)]^2\right)dx = \quad (25)$$

$$l + \frac{1}{2}C_0^2\left(\frac{2\pi}{l}\right)^2 \frac{l}{2} = l + \frac{\pi^2 C_0^2}{l}.$$

The condition of the compatibility of displacements can be written as $$s + \delta_c = l + \delta_r. \quad (26)$$

This condition indicates that the length, $s + \delta_c$, of the interconnect, if it experiences compression, should be equal to its span, l, plus the externally imposed displacement, $\delta_r$. Considering (25), with $67_c = \varepsilon_c l$, we obtain:

$$C_0 = \frac{l}{\pi}\sqrt{\varepsilon_t - \varepsilon_c}, \quad (27)$$

where $$\varepsilon_t = \frac{\delta_t}{l} \quad (28)$$

is the imposed strain. If the critical strain, $\varepsilon_c$, exceeds the actual strain, $\varepsilon_t$, no buckling is possible ($C_0=0$).

The maximum deflection of the buckled fiber can be found from (16):

$$w_0 = w\left(\frac{l}{2}\right) = 2C_0 = \frac{2l}{\pi}\sqrt{\varepsilon_t - \varepsilon_c}, \quad (29)$$

and the fiber curvature can be evaluated from (16) by differentiation:

$$\kappa(x) = w''(x) = C_0\left(\frac{2\pi}{l}\right)^2 \cos\frac{2\pi x}{l}. \quad (30)$$

The maximum curvature is $$\kappa_{max} = \kappa(0) = C_0\left(\frac{2\pi}{l}\right)^2 = \frac{4\pi}{l}\sqrt{\varepsilon_t - \varepsilon_c} = 2\left(\frac{\pi}{l}\right)^2 w_0. \quad (31)$$

Then the bending stress in the glass fiber is $$\sigma_b = E_0\left(\varepsilon_b + \frac{1}{2}\alpha\varepsilon_b^2\right), \quad (32)$$

where the bending strain, $\varepsilon_b$, is expressed as follows:

$$\varepsilon_b = r_0 \kappa_{max} = 4\pi\frac{r_0}{l}\sqrt{\varepsilon_t - \varepsilon_c} = 2\pi^2\frac{r_0 w_0}{l^2}. \quad (33)$$

The total stress, caused by the combined action of bending and compression, can be found from (24) and (33):

$$\sigma_{tot.} = \sigma_b - \sigma_c = E_0(\varepsilon_b - \varepsilon_c)\left[1 - \frac{1}{2}\alpha(\varepsilon_b + \varepsilon_c)\right]. \quad (34)$$

C. Numerical Examples

Let a $l$=5.00 mm long polymerically coated ($E_1$=0.525× $10^6$ psi, $r_1$=0.125 mm) glass fiber interconnect ($E_0$=10.5×$10^6$ psi, $r_0$=0.0625 mm) be subjected to a compressive displacement of $\delta_t$=50.0 μm (this can be due to the glass fiber mismatch with the material of the enclosure or can occur because of the deformations caused by laser welding). The formulas (6) yield: $\rho=r_1/r_0=2$, $e=E_1/E_0=0.05$. The linear critical strain for a bare interconnect, defined by the formula (15), is $\varepsilon_0^*$=1.5421×$10^{-3}$, and the corresponding displacement is $\delta_0^*=\varepsilon_0^*l$=7.7105 μm. The factor η, considering the effect of the coating material on the linear critical strain, can be evaluated by the formula (22): η=1.5217. Then the formula (21) predicts, that the linear critical strain for a coated interconnect, is $\varepsilon^*=\eta\varepsilon_0^*$=2.3466×$10^{-3}$. The corresponding displacement is $\delta^*=\varepsilon^*l$=11.7330 μm. With a α=6, the first formula in (18) yields: $\alpha_A$=5.2174, and the formula (20) results in the following $\overline{\alpha}_A$ value: $\overline{\alpha}_A$=5.1758. Then from (23) we find that the nonlinear critical strain, $\varepsilon_c$, for a coated fiber, i.e. the strain evaluated with consideration of the nonlinear behavior of the silica material, is $\varepsilon_c$=2.3610× $10^{-3}$. This corresponds to the compressive displacement of $\delta_c=\varepsilon_c l$=11.8050 μm. The calculated data are shown in the second column of Table 1 (FIG. 4). Thus, the consideration of the nonlinear stress-strain relationship resulted, for a coated interconnect, in a somewhat larger critical displacement. This should be attributed to the fact that nonlinearity has a larger effect on the axial rigidity, EA (the decrease in this rigidity results in a larger critical strain), than on the flexural rigidity, EI (the decrease in this rigidity leads to a smaller critical strain).

If a bare fiber were employed ($\alpha_A=\alpha$, η=1), the formulas (20), (21) and (23) would yield: $\overline{\alpha}_A$=5.9450, $\varepsilon^*=\varepsilon_0^*$= 1.5421×$10^{-3}$, and $\varepsilon_c$=1.5492×$10^{-3}$. The corresponding critical displacement would be $\delta_c$=7.7460 μm. The effect of the silica material nonlinearity would have led in this case to a $$\frac{7.7460 - 7.7106}{7.7106} 100\% = 0.459\%$$

increase in the critical displacement, while, for a coated interconnect, it resulted in a $$\frac{11.8055 - 11.7334}{11.7334} 100\% = 0.614\%$$

increase in this displacement. Therefore we conclude, that for a sufficiently long ($l$=5.00 mm) interconnect, the non-linear stress-strain relationship of the silica material need not be considered, moreover, that the linear approach is conservative, i.e. results in a small underestimation of the critical strain (displacement). The result, obtained on the basis of a linear approach, is more accurate for a bare, than for a polymerically coated fiber. The compressive stress in the glass fiber interconnect at the buckling condition can be found, on the basis of the formula (24), with the critical strain of $\varepsilon_c$=2.3610×$10^{-3}$, as $\sigma_c$=24.610 kpsi. The calculated data for the bare fiber are shown in the first column of FIG. 4.

FIG. 4 shows also the data for the case of a very thick polymeric coating $$\left(\rho = \frac{r_1}{r_0} = 4\right),$$

as well as for a very short interconnect ($l$=2.00 mm). As evident from these data, polymeric coating results in a significant increase in the critical strain. This data shows also, that there is an incentive for the application of thick polymeric coating for higher critical strains. As far as the consideration of the nonlinear behavior of the silica material is concerned, its effect is relatively small and does not have to be considered, moreover that the linear approach is conservative, i.e. results in overestimation of the critical strains (displacements).

Whatever the approach, in the example in question, the critical displacement is smaller than the actual displacement $\delta_t$=50 μm, so that the fiber is expected to buckle. With the strain of $$\varepsilon_t = \frac{\delta_t}{l} = 10^{-2},$$

the formula (29) predicts that the maximum deflection of the buckled fiber is $w_0$=278.2 μm. Its maximum curvature, as predicted by (31), is $\kappa_{max}=0.2197$ mm$^{-1}$, and the bending strain, given by (39), is $\epsilon_b=13.629\times10^{-3}$. Then the formula (32) yields: $\sigma_b=150.092$ kpsi. The total (tensile) stress in the glass fiber is $\sigma_{tot.}=150.092-24.615=125.477$ kpsi=88.2 kg/mm$^2$. This stress is rather large and typically cannot be permitted from the standpoint of long-term reliability of the fiber.

Coated optical fiber interconnects are characterized by considerably larger critical strains (displacements) than bare ones, and the increase in the thickness of the polymeric coating leads to a significant increase in the elastic stability of the interconnect. As to the nonlinear stress-strain relationship in the silica material, its effect is relatively small, and should be accounted for only for very short interconnects and for interconnects with very thick coatings.

D. Thickness to Preclude Buckling

From the eq. (15) we obtain the following equation for the ratio $$\rho = \frac{r_1}{r_0}$$

of the outer radius, $r_1$, of the polymer coating to its inner radius (fiber radius), $r_o$:

$$\rho^4 - \frac{\varepsilon_c}{\varepsilon_o^*}\rho^2 + \frac{1}{e}\left[1 - \frac{\varepsilon_c}{\varepsilon_0^*} - \alpha\varepsilon_c\left(1 - \frac{\varepsilon_c}{2\varepsilon_o^*}\right)\right] = 0 \quad (35)$$

In this equation, $\epsilon_t=\Delta\alpha\Delta T$ is the actual (expected) thermally induced strain ($\Delta\alpha$ is the difference in the CTE of the enclosure material and silica, and $\Delta T$ is the change in temperature from the manufacturing temperature to the operating ambient), $$\varepsilon_o^* = \left(\frac{\pi r_o}{l}\right)^2$$

is the linear buckling strain for a bare fiber, $r_s$ is the fiber radius, l is its length (span), $$e = \frac{E_1}{E_0}$$

is the ratio of the Young's modulus, $E_1$, of the polymeric material, to the Young's modulus, $E_0$ (typically, $E_0=10.5\times10^6$ psi), of the silica fiber, and $\alpha$(typically, $\alpha=6$) is the coefficient of nonlinearity of the strain-strain relationship. From (35) we have:

$$\rho^2 = \frac{\varepsilon_c}{2\varepsilon_0^*} + \sqrt{\left(\frac{\varepsilon_c}{2\varepsilon_0^*}\right)^2 - \frac{1}{e}\left[1 - \frac{\varepsilon_c}{\varepsilon_0^*} - \alpha\varepsilon_c\left(1 - \frac{\varepsilon_c}{2\varepsilon_0^*}\right)\right]} \quad (36)$$

In a typical application, l=5.00 mm, $E_1=5.25\times10^6$ psi, and the expected displacement in compression, because of the thermal contraction mismatch, is $\delta_t=50.0$ psi. Then $\epsilon_t=$ $$\Delta\alpha\Delta T = \frac{\delta_t}{l} = 0.01.$$

With $E_0=10.5\times10^6$ psi, the Young's modulus ratio is $$e = \frac{E_1}{E_0} = 6.05.$$

The ratio of the thermally induced ("external") strain $\epsilon_0^*$, to the linear strain, $\epsilon_0$, for the case of a bare fiber, is $$\frac{\varepsilon_c}{\varepsilon_0^*} = \varepsilon_c\left(\frac{1}{\pi r_0}\right)^2 = 0.01\left(\frac{5}{\pi\times 0.0625}\right)^2 = 6.4846.$$

Then the formula (36) yields: $\rho^2=14.0827$

Then a $\delta=3.7527$, and $r_1=0.2345$ mm. Hence, the required thickness t of the polymer coating is $t=r_1-r_0=0.1720$ mm. The thickness of a typical coating $$\left(\frac{r_1}{r_0} = 2\right)$$

is only $$t=r_1-r_0=r_0(\rho-1)=r_0=0.0625 \text{ mm.}$$

Thus, the thickness of the coating should be made larger than the standard thickness by a factor of 2.75 to avoid buckling.

More generally, the critical strain (i.e. strain leading to buckling) for a coated optical fiber interconnect subjected to compression can be evaluated as:

$$\varepsilon_c = \frac{1}{\alpha_A}\left(1 - \sqrt{1 - 2\overline{\alpha}\varepsilon_0^*}\right), \quad (37)$$

where $$\varepsilon_0^* = \left(\frac{\pi r_0}{l}\right)^2 \quad (38)$$

is the critical strain for a bare optical fiber interconnect, evaluated without considering the nonlinear stress-strain relationship in the silica (glass) material, $r_0$ is the radius of the glass fiber (typically, $r_0=0.0625$ mm), l is the length ("span") of the interconnect, $$\alpha_A = \frac{\alpha}{1 + e(\rho^2 - 1)} \quad (39)$$

is the parameter of nonlinearity with respect to the axial deformations, a is the experimental coefficient of nonlinearity (typically, $\alpha=6$), $$e = \frac{E_1}{E_0}, \rho = \frac{r_1}{r_0} \quad (40)$$

are Young's moduli and radii ratios, respectively. $E_0$ is Young's modulus of the glass material for small strains (typically, $E_0=10.5\times10^6$ psi), $E_1$ is Young's modulus of the coating material (This modulus should be determined experimentally. If experimental data for the given coating material are not available, one can tentatively assume e≅0.05) $r_1$ is the outer radius of the coating layer.

$$\overline{\alpha} = \frac{\alpha_A \eta}{(1 + \alpha_A \varepsilon_0^*)^2} \quad (41)$$

is dimensionless parameter of the nonlinearity, and $$\eta = \frac{1 + e(\rho^6 - 1)}{1 + e(\rho^2 - 1)} \quad (42)$$

is the factor considering the effect of the coating layer on the critical strain $$\epsilon^* = \eta \epsilon_0^* \quad (43)$$

for a coated fiber assuming linear stress-strain relationship in the silica material. Indeed, for very small $\alpha$ values both $\alpha_A$ and $\overline{\alpha}$ are small, and the formula (37) yields;

$$\varepsilon_c \cong \frac{\overline{\alpha}}{\alpha_A} \varepsilon_0^* = \frac{\eta \varepsilon_0^*}{(1 + \alpha_A \varepsilon_0^*)^2} \cong \eta \varepsilon_0^*$$

The above formulas enable one to evaluate the critical strain, $\epsilon_c$, for the given Young's moduli; ratio, e, radii ratio, $\rho$, radius-to-length ratio, $$\frac{r_0}{l},$$

and parameter of nonliniarity, $\alpha$. The calculations can be carried out in the following sequence:
1. For the given e and $\rho$ ratios, evaluate the factor $\eta$, that considers the effect of the coating layer on the linear critical strain, on the basis of the formula (42).
2. For the given $r_0/l$ ratio, evaluate the linear critical strain, $\epsilon_0^*$, for a bare interconnect, using the formula (38), and the linear strain, $\epsilon^*$, for a coated interconnect, using the formula (43).
3. Using the experimental $\alpha$ value, evaluate the parameters of nonlinearity $\alpha_A$ and $\overline{\alpha}$, using the formulas (39) and (41), respectively. Evaluate the critical strain, $\epsilon_c$, on the basis of the formula (37) and compare it with the actual (expected) compressive strain, $\epsilon_t$. Clearly, if $\epsilon_c > \epsilon_t$, no buckling will take place, otherwise a thicker coating could be considered, and the entire calculation should be repeated for a larger $\rho$ value, so that the condition $\epsilon_c > \epsilon_t$ of elastic stability is fulfilled.

EXAMPLE

Consider for instance, e=0.05, $\rho$=2.0 (conventional coated fiber), $r_0/l$=0.0125 contraction ($r_o$=0.0625mm, l=5 mm), $\alpha$=6, and the expected external strain, say, because of the thermal contraction mismatch between the coated interconnect and its enclosure, is $\epsilon_t$=0.0050. The formula (42) yields: $\eta$=1.0869565. From (38) and (43) we find: $\epsilon_o^*$=0.00154213; $\epsilon^*$=0.00167622. From (39) and (41) we obtain: $\alpha_A$=5.217391; $\overline{\alpha}$=5.580909; and the formula (37) yields: $\epsilon_c$=00.00165674. Thus, in this example, the coating layer resulted in a 8.7% increase in the critical strain, and the nonlinear stress-strain relationship in the silica material led to only 1.2% decrease in this strain, so that the overall effect of the coating and the nonlinearity is about 7.4%. The calculated critical strain is, however, below the expected external strain, and therefore buckling will occur.

In order to avoid buckling, let us consider a thicker coating layer of, say, $\rho$=3($r_1$=0.1875 mm). Then we obtain: $\eta$=3.5714286, $\epsilon^*$=0.00550761, $\alpha_A$=4.285714, $\overline{\alpha}$=15.105789, $\epsilon_c$=0.00550035. In this case, the coating resulted in a 3.57 fold increase in the critical strain, and the nonlinearity brought it down by only 0.13%. The obtained value of the critical strain is somewhat higher than the expected external strain $\epsilon_t$=0.0050, so that a 0.125 mm thick coating can be employed to avoid buckling.

The problem examined above can be formulated in a different way. What is the required thickness of the coating layer that would result in a critical strain, $\epsilon_c$ which would be equal to the expected external strain, $\epsilon_t$? The answer is given by the formula:

$$\rho^2 \frac{\varepsilon_c}{2\varepsilon_0^*} \left\{ 1 + \sqrt{1 + \left(\frac{2\varepsilon_0^*}{\varepsilon_c}\right)^2 \left[\left(\frac{\varepsilon_c}{\varepsilon_0^*} - 1\right)\left(\frac{1}{e} - 1\right) - \frac{\alpha}{e}\varepsilon_c\left(\frac{\varepsilon_c}{2\varepsilon_0^*}\right)\right]} \right\} \quad (44)$$

Indeed, the input data $\epsilon_0^*$=0.00154213, $\epsilon_c$=0.00550035 ($\epsilon_c/\epsilon_0^*$3.566723), $\alpha$=6 e=0.05, yields: $\rho$=3.0. The $\rho$ value calculated for different $\xi=\epsilon_c/\epsilon_0^*$ ratios, e ratios and $\alpha^*=\alpha\epsilon_c$ values, i.e. by the formula $$\rho = \sqrt{\frac{\xi}{2}\left\{1 + \sqrt{1 + \left(\frac{2}{\xi}\right)^2\left[(\xi-1)\left(\frac{1}{e}-1\right) - \frac{\alpha_*}{e}\left(\frac{\xi}{2}-1\right)\right]}\right\}} \quad (45)$$

are given in Table 2 (FIG. 5).

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed is:
1. In a fiber interconnected optical device comprising first and second optical device components, a hollow tube attached to and extending between the first and second components, and a length of optical fiber disposed within the hollow tube and optically coupling the first and second components, the optical fiber comprising a polymer coated glass fiber with a coated fiber radius $r_1$ and a glass fiber radius $r_0$ and the optical fiber subject to an expected external strain $\epsilon_t$ tending to buckle the fiber;
the improvement wherein the thickness of the polymer coating t=$r_1$-$r_0$ is chosen to result in a critical strain $\epsilon_c \geq \epsilon_t$; and
wherein t=$r_0$ ($\rho$-1) where $r_0$ is the radius of the glass fiber and $\rho$=$r_1/r_0$ is:

$$\rho = \sqrt{\frac{\xi}{2}\left\{\left\{1 + \sqrt{1 + \left(\frac{2}{\xi}\right)^2\left[(\xi-1)\left(\frac{1}{e}-1\right) - \frac{\alpha_*}{e}\left(\frac{\xi}{2}-1\right)\right]}\right\}\right\}}$$

in which $\xi=\epsilon_c/\epsilon_0^*$ where $\epsilon_c$ is the critical strain for the coated fiber and $\epsilon_0^*$ is the critical strain for the base fiber;
e=$E_1/E_0$ where $E_1$ is the Young's modulus of the polymer coating material and $E_0$ is the Young's modulus of the glass;
$\alpha^*=\alpha\epsilon_c$ where $\alpha$ is the coefficient of nonlinearity of the glass strain-strain relationship.
2. The improved device of claim 1 wherein $\epsilon_c=\epsilon_t$.
3. The improved device of claim 1 wherein t$\geq$2.75$r_0$.

4. The improved device of claim 1 wherein the first and second optical device components are attached to a common substrate.

5. In a fiber interconnected optical device comprising first and second optical device components, a hollow tube attached to and extending between the first and second components, and a length of optical fiber disposed within the hollow tube and optically coupling the first and second components, the optical fiber comprising a polymer coated glass fiber with a glass fiber radius $r_0$, the improvement comprising providing the polymer coating with a thickness $t \geq 1.25\ r_0$.

6. The improved device of claim 5 wherein $2.75\ r_0 > t \geq 1.25\ r_0$.

7. The improved device of claim 5 wherein the first and second optical device components are attached to a common substrate.

* * * * *